US012026710B2

(12) United States Patent
Chan et al.

(10) Patent No.: US 12,026,710 B2
(45) Date of Patent: Jul. 2, 2024

(54) CONSTRAINTS ON OUTPUTS OF AN UNLOCKING TRANSACTION IN A BLOCKCHAIN

(71) Applicant: nChain Licensing AG, Zug (CH)

(72) Inventors: Ying Chan, Cambridge (GB); Dean Kramer, London (GB)

(73) Assignee: nChain Licensing AG, Zug (CH)

( * ) Notice: Subject to any disclaimer, the term of this patent is extended or adjusted under 35 U.S.C. 154(b) by 696 days.

(21) Appl. No.: 16/642,842

(22) PCT Filed: Aug. 24, 2018

(86) PCT No.: PCT/IB2018/056432
§ 371 (c)(1),
(2) Date: Feb. 27, 2020

(87) PCT Pub. No.: WO2019/043538
PCT Pub. Date: Mar. 7, 2019

(65) Prior Publication Data
US 2020/0202350 A1 Jun. 25, 2020

(30) Foreign Application Priority Data

Aug. 29, 2017 (GB) ..................... 1713790
Aug. 29, 2017 (GB) ..................... 1713794
Aug. 29, 2017 (GB) ..................... 1713805

(51) Int. Cl.
G06Q 20/40 (2012.01)
G06F 16/23 (2019.01)
(Continued)

(52) U.S. Cl.
CPC ....... *G06Q 20/401* (2013.01); *G06F 16/2365* (2019.01); *G06F 16/2379* (2019.01);
(Continued)

(58) Field of Classification Search
USPC ....................................... 705/67
See application file for complete search history.

(56) References Cited

U.S. PATENT DOCUMENTS 10,833,843 B1  11/2020 Vijayvergia et al.
11,196,566 B2  12/2021 Middleton et al.
(Continued)

FOREIGN PATENT DOCUMENTS

CN  105893042 A  8/2016
CN  106940854 A  7/2017
(Continued)

OTHER PUBLICATIONS

Clack, Christopher D et al. "Smart Contract Templates: essential requirements and design options," 2016, arXiv:1612.04496 [cs.CY], 2016, https://doi.org/10.48550/arXiv.1612.04496 (Year: 2016).*
(Continued)

*Primary Examiner* — Jacob C. Coppola
*Assistant Examiner* — Eduardo Castilho
(74) *Attorney, Agent, or Firm* — Davis Wright Tremaine LLP

(57) ABSTRACT

Techniques for implementing trustless deterministic state machines using a blockchain infrastructure and running state machines concurrently over one or more transactions are described. An initial transaction is created to include at least one initial locking script that includes a first set of constraints, a second set of constraints, and at least one redeemable value. An unlocking blockchain transaction is also created with an input comprising an unlocking script and respective transaction outputs for a first locking script and a second locking script. Upon processing the initial locking script and the unlocking script, the first set of constraints and the second set of constraints are determined. Next, the first and second locking scripts are verified to ensure that they
(Continued)

satisfy the first and second sets of constraints. Finally, the initial transaction is caused to be validated at a node of a blockchain network.

20 Claims, 37 Drawing Sheets

(51) Int. Cl.
    *G06Q 10/10*     (2023.01)
    *G06Q 20/02*     (2012.01)
    *G06Q 20/06*     (2012.01)
    *G06Q 20/36*     (2012.01)
    *H04L 9/00*     (2022.01)
    *H04L 9/06*     (2006.01)

(52) U.S. Cl.
    CPC ............. *G06Q 10/10* (2013.01); *G06Q 20/02* (2013.01); *G06Q 20/065* (2013.01); *G06Q 20/36* (2013.01); *H04L 9/0643* (2013.01); *G06Q 2220/00* (2013.01); *H04L 9/50* (2022.05)

(56) References Cited

U.S. PATENT DOCUMENTS

| | | | |
|---|---|---|---|
| 2016/0283939 A1* | 9/2016 | Finlow-Bates | G06Q 20/405 |
| 2016/0292672 A1 | 10/2016 | Fay et al. | |
| 2016/0330034 A1 | 11/2016 | Back et al. | |
| 2017/0085545 A1 | 3/2017 | Lohe et al. | |
| 2017/0091750 A1 | 3/2017 | Maim | |
| 2017/0132621 A1* | 5/2017 | Miller | G06Q 20/065 |
| 2017/0187535 A1* | 6/2017 | Middleton | H04L 9/3247 |
| 2017/0228731 A1 | 8/2017 | Sheng et al. | |
| 2017/0287090 A1 | 10/2017 | Hunn et al. | |
| 2017/0300872 A1 | 10/2017 | Brown et al. | |
| 2017/0345011 A1 | 11/2017 | Salami et al. | |
| 2018/0005186 A1 | 1/2018 | Hunn | |
| 2018/0096360 A1* | 4/2018 | Christidis | G06Q 20/02 |
| 2018/0123779 A1 | 5/2018 | Zhang | |
| 2018/0165758 A1* | 6/2018 | Saxena | G06Q 20/385 |
| 2018/0241546 A1* | 8/2018 | Leng | G06Q 20/38215 |
| 2018/0253702 A1 | 9/2018 | Dowding | |
| 2018/0260909 A1* | 9/2018 | Li | G06Q 20/38215 |
| 2018/0300382 A1* | 10/2018 | Madisetti | G06Q 20/389 |
| 2019/0019183 A1 | 1/2019 | Karame et al. | |
| 2021/0211468 A1 | 7/2021 | Griffin et al. | |

FOREIGN PATENT DOCUMENTS

| | | |
|---|---|---|
| CN | 107203368 A | 9/2017 |
| RU | 2015146675 A | 5/2017 |
| WO | 2017027484 A1 | 2/2017 |
| WO | 2017122187 A2 | 7/2017 |
| WO | 2017173399 A1 | 10/2017 |

OTHER PUBLICATIONS

V. Scoca, R. B. Uriarte and R. De Nicola, "Smart Contract Negotiation in Cloud Computing," 2017 IEEE 10th International Conference on Cloud Computing (Cloud), 2017, pp. 592-599, doi: 10.1109/CLOUD.2017.81. (Year: 2017).*
K. Christidis and M. Devetsikiotis, "Blockchains and Smart Contracts for the Internet of Things," in IEEE Access, vol. 4, pp. 2292-2303, 2016, doi: 10.1109/ACCESS.2016.2566339. (Year: 2016).*
Antonopolous, "Mastering Bitcoin," pp. 132-138, 2017, 2nd Edition, O'Reilly (Year: 2017).*
Christidis, K. et al., "Blockchains and Smart Contracts for the Internet of Things", IEEE Access, vol. 4. 2016 pp. 2292-2303.
Anonymous, "Smart Contracts/EVM FAQ Counterparty," retrieved from https://web.archive.org/web/20170719092538/https://counterparty.io/docs/faq-smartcontracts/, Jul. 19, 2017, 7 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.
Delgado-Segura et al., "Bitcoin Private Key Locked Transactions," Cryptology ePrint Archive: Report 2016/1184, Dec. 30, 2016, 8 pages.
International Search Report and Written Opinion dated Nov. 15, 2018, Patent Application No. PCT/IB2018/056431, 12 pages.
International Search Report and Written Opinion dated Nov. 15, 2018, Patent Application No. PCT/IB2018/056432, 12 pages.
International Search Report and Written Opinion dated Oct. 26, 2018, Patent Application No. PCT/IB2018/056430, 13 pages.
Möser et al., "Bitcoin Covenants," Medical Image Computing and Computer-Assisted Intervention, Aug. 31, 2016, 16 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
UK Commercial Search Report dated Jan. 19, 2018, Patent Application No. GB1713790.2, 7 pages.
UK Commercial Search Report dated Jan. 19, 2018, Patent Application No. GB1713794.4, 7 pages.
UK Commercial Search Report dated Jan. 19, 2018, Patent Application No. GB1713805.8, 7 pages.
UK IPO Search Report dated Feb. 28, 2018, Patent Application No. GB1713794.4, 8 pages.
UK IPO Search Report dated Jan. 23, 2018, Patent Application No. GB1713805.8, 6 pages.
Wu et al., "A Cloudlet-based Multi-lateral Resource Exchange Framework for Mobile Users," IEEE Conference on Computer Communications (INFOCOM), Apr. 26, 2015, 9 pages.

* cited by examiner

OP_GENSIG Script 500

Input

<SIGHASH Byte><m><a><k>

Output (1) ```
// K = k x G
OP_DUP OP_TOALTSTACK <PubK G> OP_ECPMULT
```

(2) ```
// r = x mod n
OP_ ECPX <N> OP_BIGMOD OP_DUP OP_TOALTSTACK
```

(3) ```
// k-1(r x d + m) mod n
<N> OP_BIGMODMUL <N> OP_BIGMODADD OP_FROMALTSTACK OP_SWAP
OP_FROMALTSTACK <N> OP_BIGMODINVERSE <N> OP_BIGMODMUL
```

(4) ```
// DER encode (r,s) and append SIGHASH Type
OP_DERENCODE OP_SWAP OP_CAT
```

FIG. 5

OP_PREVTXINJECTION Script 600

Input

```
<Serialized Previous Tx (for Tx ID X)>
<SIGHASH Type>
<Serialized Set of Unlocking Tx Fields>
```

Output

```
<X>

// OP_PREVTXINJECTION Below
// Push <X> to Alt Stack
OP_TOALTSTACK

// Causes Injection of Unlocking Tx (consumes SIGHASH Type)
OP_SWAP OP_OVER OP_SPENDINGTXINJECTION OP_VERIFY // Extract Tx ID <X> from Unlocking Tx
OP_FROMALTSTACK OP_EXTRACTTXID // Create Tx ID from Serialized Previous Tx
OP_SWAP OP_HASH256

// Check the Tx IDs are the same
OP_EQUAL
```

FIG. 6

OP_SELFTXINJECTION Script 700

Input

```
<Serialized Previous Tx (for input being signed)>
<SIGHASH Type>
<Serialized Set of Unlocking Tx Fields>
```

Output

```
// Save a copy of SIGHASH Type
OP_OVER OP_TOALTSTACK

// Only 1 Tx ID, which corresponds to Prev Tx of
// this Locking Script
<0> OP_PREVTXINJECTION OP_VERIFY // Make sure SIGHASH Type is SIGHASH_X | ANYONECANPAY
OP_FROMALTSTACK <SIGHASH_ANYONECANPAY> OP_AND OP_OVER
<SIGHASH_ANYONECANPAY> OP_AND
```

FIG. 7

OP_SPENDINGTXINJECTION Script 800

Input

```
<SIGHASH Type>
<Serialized Set of Unlocking Tx Fields>
```

Output

```
// Double SHA256 the Message
OP_HASH256

// Generate a Signature using SIGHASH Type, Message,
// Private Key and k
<a><k> OP_GENSIG // Perform Signature Verification
<PubK A> OP_CHECKSIG
```

Trustless Deterministic State Machine Script 2400

Input/Unlocking Script

```
<External Sig'><External Data>
<Serialized Previous Serialized Tx>
<SIGHASH Type>
<Serialized Set of Unlocking Tx Fields>
```

Output/Locking Script

```
<Script to Check Termination Condition>

// If not terminated
OP_NOTIF

// Check Self-replicating Smart Contract
// Extract Locking Script from Unlocking Transaction
<Script to Extract Locking Script>

// Extract Locking Script from Previous Transaction
<Script to Extract Locking Script>

// Check the Locking Scripts are the same
OP_EQUALVERIFY

// Extract Current State
<Script to Extract Data from Serialized Previous Tx>

// Read Input
<Script to Read Input from unlocking script>

// Verify State-transition matrix constraint
<Script to Determine State Transition>
<Script to Verify Constraint on Unlocking Tx>
OP_VERIFY
OP_ENDIF // Check that Previous Tx, SIGHASH Type, and Unlocking Tx
// have been injected
OP_SELFTXINJECTION
```

FIG. 24

Forking/Cloning Process State Machine Script 2900

```
1. Cause injection of Previous Tx, Unlocking Tx, and Input (optional)

2. Check Termination Condition
     2a. If true, goto step 6

3. Extract Previous Tx Locking Script

4. Extract Previous Tx Current State

5. Loop through set of Outputs in Unlocking Tx
     5a. Extract Locking Script from Output 5b. Check Transition Matrix in Previous Tx Locking Script ==
Transition Matrix in Locking Script
           5bi. If false, script fails 5c. Determine Next State from Current State, Transition Matrix, Input
(optional), and Output Index 5d. Check Next State == Next State in Output
           5di. If false, script fails 6. Script passes (optionally, other constraints can be checked here)
```

FIG. 29

Forcing New Smart Contract Spawning in a Unlocking Transaction Script 3100

```
1. Cause injection of Previous Tx, Unlocking Tx, and Input (optional)

2. Check Termination Condition
      2a. If true, goto step 12

3. Extract Previous Tx Locking Script

4. Extract Unlocking Tx Locking Script 1 (Input 1. State Machine)

5. Check Transition Matrix in Previous Tx Locking Script == Transition
Matrix in Unlocking Tx Locking Script 1
      5a. If false, script fails 6. Extract Current State from Previous Tx Locking Script 7. Determine Next State from Current State, Transition Matrix and Input
(optional)

8. Check Next State == Next State in Unlockding Tx Locking Script 1
      8a. If false, script fails 9. Extract Unlocking Tx Locking Script 2 (Input 2. New Smart Contract)

10. Determine Constraints on New Smart Contract

11. Check Constraints on New Smart Contract
      11a. If false, script fails.

12. Script passes (optionally, other constraints can be checked here)
```

FIG. 31

Merging Process Script - Weak Dependency 3300

```
===================================
Merge State Machines - Weak Dependency (Case of multiple state machines that
so happen to have the same next state for the same output)
===================================

1. Cause injection of Previous Tx, Unlocking Tx, and Input (optional)

2. Check Termination Condition
      2a. If true, goto step 9

3. Extract Previous Tx Locking Script

4. Extract Unlocking Tx Locking Script

5. Check Transition Matrix in Previous Tx Locking Script == Transition
Matrix in Unlocking Tx Locking Script
      5a. If false, script fails 6. Extract Previous Tx Current State 7. Determine Next State from Current State, Transition Matrix and Input
(optional)

8. Check Next State == Next State in Unlocking Tx Locking Script
      8a. If false, script fails 9. Script passes (optionally, other constraints can be checked here)
```

FIG. 33

Merging Process Script – Strong Dependency 3400

```
================================
Merge State Machines - Strong Dependency (Cases of different statemachine)
================================

1. Cause injection of Previous Txs, Unlocking Tx, and Input (optional)

2. Check Termination Condition
      2a. If true, goto step 7

3. Extract Unlocking Tx Locking Script

4. Loop through set of Input Indexes in Unlocking Tx

4a. Extract Previous Tx Locking Script (Corresponding Input)

4b. Check Transition Matrix in Previous Tx Locking Script ==
Transition Matrix in Unlocking Tx Locking Script
            4bi. If false, script fails 4c. Extract Previous Tx Current State and append to list of Current
States 5. Determine Next State from Current States, Transition Matrix and Input
(optional)

6. Check Next State == Next State in Unlocking Tx Locking Script
      6a. If false, script fails 7. Script passes (optionally, other constraints can be checked here)
```

FIG. 34

Parallel Execution/Barrier Process Script 3600

```
1. Cause injection of Previous Txs, Unlocking Tx, and Input (optional)

2. Check Termination Condition
      2a. If true, goto step 5

3. Loop through set of Output/Input Index Pairs in Unlocking Tx

3a. Extract Unlocking Tx Locking Script (Corresponding Output)

3b. Extract Previous Tx Locking Script (Corresponding Input)

3c. Check Transition Matrix in Unlocking Tx Locking Script ==
Transition Matrix in Previous Tx Locking Script
            3ci. If false, script fails 3d. Extract Previous Tx Current State and append to list of Current
States 4. Loop through set of Output Indexes in Unlocking Tx 4a. Extract Unlocking Tx Locking Script (Corresponding Output)

4b. Determine Next State from Current States, Transition Matrix, Input
(optional), and Output Index 4c. Check Next State == Next State in Unlocking Tx Locking Script
            4ci. If false, script fails 5. Script passes (optionally, other constraints can be checked here)
```

FIG. 36

CONSTRAINTS ON OUTPUTS OF AN UNLOCKING TRANSACTION IN A BLOCKCHAIN

FIELD OF INVENTION

This invention relates generally to a computer-implemented method of processing blockchain transactions, and more particularly to implementing a state machine within the structure of blockchain transaction processing, including a trustless, deterministic, and concurrent state machine. This invention further utilises cryptographic and mathematical techniques to enforce security in relation to electronic transfers conducted over a blockchain network. The invention is particularly suited to, but not limited to, use in methods and apparatus that process and transact in smart contract transactions and implement state machines using such smart contract transactions.

BACKGROUND OF INVENTION

In this document, the term "blockchain" may refer to any of several types of electronic, computer-based, distributed ledgers. These include consensus-based blockchain and transaction-chain technologies, permissioned and un-permissioned ledgers, shared ledgers, and variations thereof. The most widely known application of blockchain technology is the Bitcoin ledger, although other blockchain implementations have been proposed and developed. While the example of "Bitcoin" may be referred to as a useful application of the technology described herein for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques described within the present disclosure would provide advantages to utilising blockchain implementations that have limitations similar to Bitcoin regarding what constraints can be encoded within transactions, regardless whether an exchange of cryptocurrency occurs.

A blockchain is a peer-to-peer, electronic ledger that is implemented as a computer-based, decentralised, distributed system made up of blocks, which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. A blockchain system or blockchain network may comprise a plurality of blockchain nodes and a set of operations. A blockchain node might be configured to perform some or all of the operations in the set of operations. Various blockchain nodes might be implemented as computer hardware, computer software, or a combination of both, operated by a node operator, wherein node operators can be independent and unrelated to other node operators. Blockchain nodes might each maintain a copy of the blockchain ledger, or some portion of it. The set of operations might include creating transactions, propagating transactions, reading the blockchain ledger, evaluating the blockchain ledger, generating (mining) new block for proposed addition to the blockchain ledger, communicating with other blockchain nodes, and providing wallet functions for a user to manage blockchain assets.

The blockchain ledger may be decentralised, in that there is no single blockchain node or entity that decides when the ledger gets modified. Instead, the blockchain nodes each may be programmed with knowledge of rules of the blockchain protocol and may verify the blockchain ledger and that the actions of other blockchain nodes are consistent with those rules. The term "blockchain" may refer to the fact that a blockchain ledger comprises a series of chained blocks, each representable as a data structure in computer memory, readable by a computer process and transmittable as a data transmission. A block may comprise one or more transactions, also representable as data structures in computer memory, readable by a computer process and transmittable as a data transmission. The blocks may be chained, in that each new block that is officially added to the blockchain contains immutable references to an immediately previous block, which may contain immutable references to its immediate prior block, and so on.

One of the rules of the blockchain protocol may be that once a block is added to the blockchain, it cannot be changed; i.e., it is immutable, and the only modification possible of the blockchain ledger may be the addition of a new block. Since blockchain nodes may be programmed with that as a rule, they would not modify blocks in their copy of the blockchain ledger, but only add blocks, and even then, only add blocks after running a verification process on the proposed block to ensure it complies with the blockchain protocol. Since such blocks would be immutable once added to the ledger, transactions in a block may also be immutable.

When a blockchain node creates a transaction, it may create a data object that contains the details of the transaction and may propagate that to other blockchain nodes that it can connect to, in a peer-to-peer fashion typically. Some blockchain nodes operate as "miners" and collect one or more transactions, form a data structure corresponding to a block, perform some computations to validate the transactions that are put into the block, solve a puzzle, place the solution to the puzzle into the data structure and attempt to propagate the block to other blockchain nodes. The puzzle might be in the form of a nontrivial computation that is specific to the data of the transactions and the present state of the blockchain ledger, such as the number of blocks in the ledger and data from the last block added.

By having the puzzle be dependent on the transactions, a rogue blockchain node may be unable to propagate a block that was made up ahead of time. By having a nontrivial puzzle to solve, a rogue blockchain node may be unable to simply inject blocks into the blockchain network, but may require that a blockchain node do some significant computational task to prove that it put in the effort (in effect, showing a solution to a hard problem is a "proof-of-work"). Preferably, in a blockchain protocol, the proof-of-work is nontrivial, but verification that the puzzle was solved and the work was done is easy. That means that the other blockchain nodes would not necessarily have to trust the blockchain node that is proposing the new block to add to the ledger. If verified by another blockchain node, that blockchain node may add the new block to the end of its copy of the blockchain ledger and propagate the new block to other blockchain nodes. As other blockchain nodes perform the same verification, they may also conclude that the block is valid and should be added to the blockchain ledger, so they may add it to their copy of the blockchain ledger. If a blockchain node determines that the proposed new block is not valid, it may not add it to its copy of the blockchain ledger and may not propagate it. Because validity in the blockchain is consensus-based, a transaction may be considered valid if a majority of nodes agree that a transaction is valid.

A blockchain system may operate such that node owners and operators do not necessarily trust other node owners and operators. Instead, the protocols may make it computationally infeasible to perform certain operations that are not permitted by the protocol, such as modifying earlier blocks, proposing a new block without a corresponding proof-of-work, or including invalid transactions. Specific trust may not be needed when it is computationally infeasible to perform an operation that is not allowed by the blockchain protocol in a manner that would go unnoticed by other nodes.

In order for a transaction to be included in a block that gets written to the blockchain, (1) the mining blockchain node would verify the transaction, (2) the mining blockchain node would attempt to propagate a block that contained that transaction, and (3) the other nodes would verify the validity of the block and validity of the transactions in that block. As the mining blockchain node would be programmed or configured with those rules in mind, the mining blockchain node would not likely include into a block a transaction that failed to verify, as such a block would not be accepted by other nodes and the mining node would obtain no benefit. One such benefit of mining for some blockchain systems is that if a block is accepted, the block is allowed to include a "distribution" transaction, wherein a specified amount of value is allocated to the operator of that node without the need for a corresponding reduction of value from some other entity. In this manner, successful miners may be compensated by value created with the block. In addition, as explained below, transactions can include transaction fees, which would also go to the miner controlling the mining blockchain node and which also require that the transaction be verifiable as valid in order for that miner to see any compensation.

A transaction in a blockchain network contains various data elements, such as a transaction value, a transaction time, and/or other data elements. In a decentralised, distributed ledger system, the ledger is public, so anyone can view the ledger and see transactions. In a blockchain ledger, there may be a genesis transaction that starts the blockchain and ascribes some unit of value to that genesis transaction. In examples herein, for explanatory purposes, the unit of value is a cryptocurrency, but other variations are possible.

A transaction other than the genesis transaction and distribution transactions involves "unlocking" the value of one or more existing transactions on the blockchain ledger, and when such a transaction is added to the blockchain ledger, it in turn can be transferred. Each untransferred transaction specifies, in a public manner, the requirements needed in order to unlock the value of that transaction. A simple requirement might be "You must first prove that you are Alice, and then you can unlock this". Alice might then create a new transaction that "unlocks" that transaction's value, where Alice's new transaction proves that it came from Alice and has a pointer to that previous transaction. For distribution transactions, there is a transaction value but the distribution transaction does not "unlock" a previous transaction. Of course, for Alice's transaction to be accepted by the blockchain network, it cannot refer to an already transferred transaction and must actually prove that Alice created it.

By the blockchain protocol and thus by agreement of the blockchain nodes, a transaction is not valid if it points to a previous transaction output that has already been transferred; i.e., for which the ledger contains a valid existing transaction input that points to that previous transaction output. To prevent any interloper from creating a new transaction input that "unlocks" the value represented by a previous UTXO, each transaction output includes data representing requirements imposed on any claimant who would create such a transaction and since UTXOs may be immutable, that data cannot be altered. Of course, transferred transactions may also be immutable.

In the example above, Alice might have created the unlocking transaction so that the value in the previous transaction that she alone had the ability to unlock could be transferred to Bob, i.e., so that there would now be a new untransferred transaction that only Bob had the ability to unlock and thereby unlock. Alice's created unlocking transaction might include data corresponding to the following requirement: "Anyone is free to point to this transaction—and thereby unlock all of its value—if they can supply sufficient information to prove that they know Bob's private key". Assuming Bob is careful, Bob would be the only person able to create a valid transaction that unlocks that transaction. In effect, Bob owns that value and is the only one who could unlock that value. Note that this does not require that Bob trust any of the operators of blockchain nodes or trust any other party who has the ability to create transactions. All Bob needs to trust is that a rogue party cannot entirely take over a majority of the blockchain nodes.

In a specific case, one transaction entirely unlocks exactly one previous untransferred transaction and that one transaction can be entirely transferred by a later transaction or not at all. In the general case, a transaction has one or more inputs and one or more outputs, where each input references an output of a previous transaction (and that output has a redeemable value), and each output has a redeemable value (that remains untransferred until it is transferred/referenced by an input of a future transaction). An output of a transaction is the redeemable unit of the transaction in that it is transferred entirely or not at all. In some examples described herein, a transaction is referred to as being "transferred", and it should be understood that where a transaction has multiple transaction outputs, the description might cover cases where fewer than all of the transaction's outputs may be transferred. A description referring to "unlocking a transaction" as opposed to unlocking a transaction output can cover the case where the output of a transaction having only one output is being transferred.

Where a transaction can have multiple outputs, different transaction outputs of that transaction can be transferred at different times. When the transaction is created, its outputs may be considered untransferred. Each output is transferred by an input of a later transaction or remains untransferred. If a transaction has an input that attempts to unlock an output of a previous transaction after the output of the previous transaction has already been transferred, blockchain nodes would reject that as being an invalid transaction.

In the case where a party, Alice, controls an UTXO valued at X and wants to unlock only a part, Y, of that transaction output, Alice can specify a new transaction that has multiple outputs, one that is a transaction output with value Y that can only be transferred by Bob, and one that is a transaction output with value X-Y that can only be transferred by Alice. In effect, the original transaction output is entirely transferred, but there is a new transaction output "making change" for Alice's transaction.

The number of inputs to a transaction and the number of outputs of that transaction need not be the same. However, in order to be a valid transaction, the sum of the values specified in the outputs of a present transaction should not exceed the sum of the values of the previous transaction outputs that may be transferred by the inputs of the present transaction, and in some cases will be less, with some exceptions. For the genesis transaction and distribution transactions, the sum of the values of the outputs can be greater than the sum of the values of the inputs, or there need not be any inputs at all, but for regular transactions, the transaction would be invalid if the sum of the values of its outputs exceeded the sum of the values of its inputs. For some transactions, the sum of the values of its outputs can be less than the sum of the values of its inputs, in which case, the successful miner adds a transaction fee transaction for the difference, thus balancing and creating a reason for the miner to process the transaction. In the Bitcoin protocol, this is a Coinbase transaction that is added to a block and has redeemable outputs equal to the sum of the transaction fees of all of the other transactions included in a Bitcoin block (i.e., the sum of the differences of all the inputs and outputs of all the included transactions), plus the distribution for creating a new block.

Each output of a transaction includes the constraints that must be met in order to unlock that output's value. In some blockchain protocols, the constraints are embedded in a "locking script" that specifies data and script commands that define what those constraints are. The locking script acts as an encumbrance on the value represented in a transaction output, in that another actor cannot "unlock" the value represented in a transaction output unless they can "unlock" the locking script of that transaction output.

Each input to an unlocking transaction unlocks an output of a previous transaction. An "unlocking script" of the unlocking transaction input determines whether that unlocking transaction unlocks that output of the previous transaction. Thus, a valid transaction specifies at least one input, and each input of a valid unlocking transaction includes a pointer to a previous transaction output (the one being transferred) and an unlocking script that "unlocks" the locking script. A blockchain node that operates according to the corresponding blockchain protocol may execute the locking script and the unlocking script together to verify the transaction input. In a particular system, the scripts are stack-based and a verifying blockchain node may start with an empty stack, execute the unlocking script, which may leave data objects on the stack, then execute the locking script, which may use data objects on the stack.

When the verifying blockchain node combines the locking script and the unlocking script and executes the combination, the result after execution may either be "TRUE" or "FALSE". In some cases, execution of the scripts ends with a FALSE result before the script is completely executed. For example, suppose that for a given script execution, there are two values that are always equal in a valid script execution regardless of what else happens in the script. If partway through execution of that script, a comparison is done between those two values and they are not equal, execution of the script can stop right after that comparison and return a FALSE result. The rest of the script need not be executed.

If the verifying blockchain node combines the locking script and the unlocking script, executes the combination, and the result is TRUE (i.e., the unlocking script contains everything necessary to unlock the transaction output), then the verifying blockchain node would verify the transaction to be valid (assuming other requirements are met, such as a proper timestamp, proper formatting, not pointing to an already transferred transaction output, etc.). If the verifying blockchain node verifies the transaction to be valid, it may propagate it. Other blockchain nodes may do the same computation to conclude that the transaction is valid. In this manner, valid transactions that have inputs that point only to UTXOs and have unlocking scripts that unlock those UTXOs may propagate and eventually become part of a block that eventually becomes part of the ledger.

On the other hand, if a rogue node tries to propagate an invalid transaction, other nodes may find it invalid and not propagate it.

Once a transaction is valid and accepted into the blockchain, its contents cannot be changed. That means that the locking script is fixed at the time of creation of the transaction. The unlocking script, however, is not necessarily fixed at that time, as the unlocking script is contained within a later unlocking transaction and need not be created until the later unlocking transaction is created.

In the typical case, the unlocking script that verifies cannot just be created by anyone, but only by a party that is authorised to unlock the previous transaction output. As in the example above, the locking script might be "Anyone is free to point to this transaction output—and thereby unlock all of its stated value—if they can supply sufficient information to prove that they know Bob's private key", and the unlocking script might be of the form "Bob has signed the transaction with his private key and here is the result: ABCCC". Then the verifying blockchain node may process those two statements and reach a conclusion of TRUE or FALSE. This process works well when it is easy to verify that ABCCC is a valid signature, it is easy for Bob (or someone else with knowledge of Bob's private key) to generate such a signature, and very difficult for someone else to generate a valid signature without knowing Bob's private key. As a result, value can be transferred in a trustless system. The originator of the transaction that Bob is about to unlock need not trust the system or trust Bob, as it is cryptographically difficult to form a valid and verifiable result that would be accepted by a consensus of the blockchain nodes without first knowing Bob's private key.

A blockchain node can easily verify that Bob signed the transaction and verify that the signature is the only requirement of the locking script. Of course, there might be rogue nodes that do not verify where other nodes do verify and could verify where other nodes do not verify, but as long as the rogue nodes cannot overpower the well-behaved nodes on the blockchain network, the rogue nodes would be unable to push through invalid transactions or stop valid transactions from being propagated or mined.

If a node is executing unlocking script(s) of a transactions input(s) and the corresponding locking script(s) of previous transaction input(s) and evaluates each of them to TRUE, and other validation conditions, if applicable, are met, the transaction is valid as far as that node is concerned. That node would then propagate the validated transaction to other network nodes, whereupon a miner node can choose to include the transaction in a block. Thus, in order for a transaction to be written to the blockchain, it must (1) be validated by a node that receives the transaction, (2) be relayed (but only if the transaction is validated) to the other nodes in the network, (3) be added to a new block built by a miner, (4) be propagated as part of the proposed block, and (5) have that proposed block accepted as an addition to the public ledger of past transactions by consensus of the nodes.

The transaction may be considered to be confirmed when a sufficient number of blocks are added to the blockchain to make the transaction practically irreversible. Since a transaction is immutable, the blockchain protocol can block unilateral reversals of a transaction. Of course, if Alice transfers value X to Bob and Alice wants that value X back, she can get it if Bob agrees, in which case the Alice-to-Bob-for-X transaction is not reversed or cancelled, but there is a new transaction that Bob initiates, the Bob-to-Alice-for-X transaction.

Once a transaction is included in a block, the transaction is considered immutable, and once a block is committed to the blockchain, the block is considered immutable. There may be short periods of time where forks in the blockchain exist and there is some ability to roll back the blockchain, but generally, the more time that passes, the less likely any rolling back would be possible. Herein, unless otherwise indicated, it is assumed that transactions and blocks are immutable after being fully committed to the blockchain.

One method of ensuring immutability is through the use of cryptographic techniques. For example, there are cryptographic operations, such as hashes and digital signatures, that take as their input some data sequence and provide an output data sequence that corresponds in some way to that input data sequence. The operations may be such that, for a given cryptographic output (e.g., a hash or digital signature) that was generated from a given cryptographic input (e.g., a transaction or block), it is computationally infeasible or impossible using available computing resources to find a different cryptographic input that results in the same cryptographic output. Consequently, a verifier can assume that if a cryptographic input is consistent with a cryptographic output, it is the cryptographic input that was used to generate the cryptographic output and not some other modified cryptographic input.

In a blockchain network, where each node is not required to trust each other node, transactions may be so verified and blocks may be so verified, and unverifiable transactions and blocks may be ignored and unused, the transactions and blocks may be deemed to be effectively immutable and this might be a consequence of an assumption that if a hash or a digital signatures corresponds correctly to a transaction or a block, the transaction or block has not been modified from its original.

Some blockchain nodes may store the entire ledger, whereas others might store only the unspent transaction outputs (UTXOs; e.g., for the Bitcoin ledger). The UTXOs correspond to the value that is redeemable, and preferably, each UTXO has a locking script for which a verifiable unlocking script cannot be easily generated by anyone other than the "owner" of that value. Of course, that is not a requirement, but it would be expected that any UTXO for which a verifiable unlocking script can be easily generated by anyone may quickly be transferred in a transaction that transfers its value to another UTXO that is only redeemable by the person who first notices it. As a result, the blockchain can be used to transfer control of a cryptocurrency value, and more generally, a digital asset from one participant in the blockchain system to another participant in the blockchain system and records of transactions, comprising transferred transaction outputs and UTXO, may be recorded in a public, immutable ledger, making it easy to verify flows of digital assets and prevent double unlocking of those digital assets.

In embodiments, a "digital asset" refers to binary data that is associated with a right to use. Examples of digital assets include Bitcoin, ether, and Litecoins. As used herein, a "digital asset" may refer to one or more digital assets. For example, a transaction may have multiple inputs and each of those inputs may represent different digital assets. A digital asset whose control is transferred may be, in this example, a collection of multiple digital assets, the collection itself being a digital asset. Similarly, a transaction may subdivide and/or combine those multiple inputs to produce one or more outputs so that, for example, the number of inputs and the number of outputs may be different.

In an embodiment, a cryptocurrency is a token-based cryptocurrency where each token represents a share of an asset (e.g., a share of a company) and a single transaction involves multiple types of tokens (e.g., involves shares in one or more different companies). In some embodiments, such as with Bitcoin, the digital asset is untokenized so that, for instance, there is no identifier of the digital asset identified in the blockchain, but rather control of the digital asset is demonstrated through the ability to generate a valid transaction that becomes recorded on the blockchain. Note, however, that some blockchain implementations may use tokenized digital assets so that, for example, digital assets may be specifically identifiable using information recorded on the blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets.

Transactions contain locking scripts and unlocking scripts, which can form computational objects. Once committed to the blockchain, the transactions may become immutable, and that feature may have uses beyond just the immutable transfer of control over digital assets in the form of cryptocurrency. In addition to transferring value, immutable transactions can be used to implement other operations, such as notary recording of events, implementation of smart contracts wherein rights and obligations of parties may be encoded in the transactions and transfer value according to the terms of the smart contract according to the blockchain protocol.

On the Bitcoin platform, the scripts are written using a stack-based scripting language, but other approaches might be used instead. In some examples, "stack-based scripting language" refers to a programming language that supports various stack-based or stack-oriented execution models and operations. When executing instructions of a stack-based scripting language, a processor (such as a part of a blockchain node) stores data on a first-in, last-out data structure called a stack. The processor can push values onto the top of the stack or pop values from the top of the stack. Various operations performed to the stack can result in pushing or popping one or more of the values from the top of the stack, performing operations thereon, changing the order of elements on the stack (which might be equivalent to two pop operations and two pushes with the first push being the first item popped). For example, an OP_EQUAL operation might pop the top two items from the stack, compare them, and push a result (e.g., 1 if equal or 0 if unequal) to the top of the stack. Other operations performed to the stack, such as OP_PICK, may allow items to be selected from positions other than the top of the stack. In some scripting languages employed by some of the present embodiments, there may be at least two stacks: a main stack and an alternate stack. Some operations of the scripting language can move items from the top of one stack to the top of another stack. For example, executing an OP_TOALTSTACK operation causes the processor to move a value from the top of the main stack to the top of the alternate stack. It should be noted that a stack-based scripting language, in some cases, may not be limited solely to operation in a strictly last-in-first-out (LIFO) manner. For example, a stack-based scripting language may support operations that copies or moves the n-th item in the stack to the top (e.g., OP_PICK and OP_ROLL respectively, in Bitcoin). Scripts written in a stack-based scripting language may be pushed onto a logical stack that can be implemented using any suitable data structure such as a vector, list, or stack.

With the scripts that are included in a transaction, a smart contract can be implemented wherein the terms of the contract are encoded into the scripts. An example might be of the form "If Bob has paid Carol X and Dave has granted permission for the transaction, Alice will pay Bob half of X", and that can be encoded as part of a locking script that would only evaluate to TRUE if (among other conditions) there is a prior transaction where Bob paid Carol and a prior transaction where Dave encoded his permission. As used herein, "prior transaction" might refer to any transaction that has already been added to the blockchain, not necessarily the previous transaction that has an output that an unlocking transaction unlocks. In effect, a smart contract can represent a machine-executable program that comprises rules that define inputs in order to produce results, which can then cause actions to be performed dependent upon those results.

In addition to the transfer of values, transactions might also transfer other objects of value or possessory interests. For example, a transaction might transfer some nominal cryptocurrency value but also include data corresponding to the assertion that "whoever is able to unlock this transaction is also the rightful owner of the house and land at 123 Marley Circle". The possessory interest might be obscured in the public record, to the same effect. For example, the transaction might include data corresponding to the assertion that "whoever is able to unlock this transaction is also the rightful owner of that certain property held in trust under trust number 12345 held at Central Bank of Trust". Herein, this is referred to as a token, which represents and effects transfer of real-world entities via the blockchain. A potentially sensitive or secret item can be represented by the token which has no discernible meaning or value. The token thus may serve as an identifier that allows the real-world item to be referenced from the blockchain.

In some embodiments, interaction with specific entities are encoded at specific steps in the smart contract, and the smart contract can otherwise be automatically self-executing and self-enforced. In some examples, automatic execution refers to execution of the smart contract that is performed to enable transfer of the UTXO. Note that, in such examples, the "any entity" that is able to unlock the UTXO refers to an entity that is able to create the unlocking script without being required to prove knowledge of some secret. In other words, the unlocking transaction can be validated without verifying that the source of the data has access to a cryptographic secret (e.g., private asymmetric key, symmetric key, etc.). Also, in such examples, self-enforcement occurs as a consequence of validation nodes of the blockchain network validating an unlocking transaction according to the constraints of the smart contract. In some examples, "unlocking" an UTXO refers to creating an unlocking transaction output that references the UTXO and executes as valid. A side effect of unlocking such a transaction output is that the blockchain network may process a locking script and an unlocking script to validate a new transaction, the unlocking transaction. If valid, that previous transaction output is considered transferred. By including certain value in a transaction output and making it so that anyone can unlock that output, there is a reason for parties to create such unlocking transactions, and thus is it likely that steps of the smart contract will be performed, if not by participants in the smart contract, then by others operating blockchain nodes.

The scripts that form the locking script and unlocking script that are recorded as part of a transaction may be immutable, and so the locking script cannot normally be modified or reference portions of future transactions, as those may be unknown at the time the transaction is fixed. An unlocking script of a transaction input can refer to portions of the previous transaction output pointed to by the transaction input or prior transactions in the blockchain other than the previous transaction. This may limit how a transaction can be used.

It is desirable to provide additional functionality and improved methods and systems for using blockchain technology in one or more of these aspects. Thus, in accordance with the present invention, there is provided a system and/or method as defined in the appended claims.

SUMMARY

In various embodiments of a computer-implemented method, the method comprises: determining a first set of constraints on a first spending transaction output; determining a second set of constraints on a second spending transaction output; creating an initial transaction to include: at least one initial locking script that includes the first set of constraints and the second set of constraints; and at least one spendable value, wherein spending the at least one spendable value is contingent upon: the first set of constraints being satisfied, at least in part, by validating that a spending transaction includes the first spending transaction output; and the second set of constraints being satisfied, at least in part, by validating that the spending transaction includes the second spending transaction output; and causing the initial transaction to be validated at a node of a blockchain network.

A locking script in the first spending transaction output may be a duplicate of a locking script in the second spending transaction output.

A locking script in the first spending transaction output may be different from a locking script in the second spending transaction output.

The locking script in the first spending transaction output may include at least a portion of the at least one initial locking script.

Execution of the at least one locking initial script may select the at least a portion from a plurality of portions of the at least one initial locking script.

Execution of an unlocking script of the spending transaction may result in the at least one initial locking script receiving data that corresponds to one of the first spending transaction output or the second spending transaction output.

The data may have an index value. On a condition that the index value is a first index value, execution of the at least one initial locking script may determine whether the first set of constraints is satisfied. On a condition that the index value is a second index value, execution of the at least one initial locking script may determine whether the second set of constraints is satisfied.

The data may include a new locking script. As a result of receiving the data, the first spending transaction output may be constrained to include the new locking script.

The at least one initial locking script may include a constraint of a source of the data.

The method may further comprise determining a spendable value for the first spending transaction output.

The initial transaction may encode a contract having a plurality of states.

The spending transaction may include a plurality of input values corresponding to the plurality of states.

The first set of constraints may constrain the first spending transaction output to have a first state. The second set of constraints constrains the second spending transaction output to have a second state.

It is further desirable to provide a computer-implemented method that comprises determining a spending transaction constraint that constrains a spending transaction to include a spending transaction input that references a previous transaction output; creating a spendable transaction that includes: a spendable transaction output that includes a spendable amount; and a spendable transaction locking script that includes the spending transaction constraint, wherein spending the spendable amount is contingent upon execution of at least one unlocking script of the spending transaction satisfying the spending transaction constraint; and causing the spendable transaction to be validated at a node of a blockchain network.

The spending transaction constraint may further constrain the spending transaction input to include a particular hash value.

The particular hash value may encode an identifier that references the previous transaction output.

The spending transaction constraint may further constrain a locking script of the spending transaction to include a set of script elements duplicated from the spendable transaction locking script.

The spendable transaction may encode a contract having a plurality of states.

The method may further comprise determining a spendable value for an output of the spending transaction.

The spending transaction constraint may include a particular locking script element from the previous transaction output. As a result of the spending transaction input including the particular locking script element, the execution of the at least one unlocking script may satisfy the spending transaction constraint.

The particular locking script element may encode a cryptographic key of a particular entity.

The spending transaction constraint may be a first spending transaction constraint; and the method may further comprise: determining a second spending transaction constraint to further constrain the spending transaction; and creating a second spendable transaction that includes: a second spendable amount; and a second spendable transaction locking script that includes the second spending transaction constraint, wherein spending the second spendable amount may be further contingent upon execution of the at least one unlocking script satisfying the second spending transaction constraint.

The spendable transaction locking script may be a first spendable transaction locking script, and the at least one unlocking script may include a first unlocking script and a second unlocking script. The first spending transaction constraint may constrain the first unlocking script to include at least a portion of the first spendable transaction locking script. The second spending transaction constraint may constrain the second unlocking script to include at least a portion of the second spendable transaction locking script.

The at least a portion of the first spendable transaction locking script may include a cryptographic key associated with a first entity. The at least a portion of the second spendable transaction locking script may include a cryptographic key associated with a second entity different from the first entity.

The spending transaction constraint may further constrain the spending transaction to constrain an output of spending transaction.

The spending transaction constraints may encode another contract distinct from the contract. Spending the spendable amount may be contingent upon the other contract being implemented in the output of the spending transaction.

It is further desirable to provide a computer-implemented method that comprises creating a blockchain transaction that encodes: a state machine in a first state and having a set of permissible state transitions; and a set of script elements to be executed to cause a spending transaction to: encode the state machine in compliance with the set of permissible state transitions; and comply with a restriction on an input to the spending transaction or comply a restriction on an output of the spending transaction; and causing the blockchain transaction to be validated by a node in a blockchain network.

The set of permissible state transitions may comprise state transitions that can be implemented independently and concurrently in distinct blockchain transactions.

The set of script elements may cause the spending transaction to comply with the restriction on the output of the spending transaction. The restriction on the output may require: a first output of the spending transaction to indicate a state corresponding to the first output in compliance with the set of permissible state transitions; and a second output of the spending transaction to indicate a state corresponding to the second output in compliance with the set of permissible state transitions.

The state corresponding to the first output and the state corresponding to the second output may be the same.

The state corresponding to the first output and the state corresponding to the second output may be different states.

The set of script elements may cause the spending transaction to comply with the restriction on the input of the spending transaction. The restriction on the input may require input to the spending transaction to indicate another state machine encoded in another blockchain transaction.

The restriction on the input may require the input to reference the state machine in the first state and to reference the other state machine in another state different from the first state.

A first transition from the first state to a second state may be within the set of permissible state transitions. A second transition from the other state to the second state may be within the set of permissible state transitions.

The set of script elements may cause the spending transaction to comply with the restriction on the input of the spending transaction. The restriction on the input may state a set of conditions for advancing the state machine. The set of conditions for advancing the state machine may be dependent on a state of another state machine.

The other state machine may be encoded in another blockchain transaction. The other transaction may encode a set of conditions for advancing the other state machine. The set of other conditions for advancing the other state machine may depend on a state of the state machine.

The set of script elements may cause the spending transaction to comply with the restriction on the output of the spending transaction. The restriction on the output may require the spending transaction to incorporate a set of elements of a smart contract into the output.

The set of elements of the smart contract may be obtained from another blockchain transaction.

The set of script elements may cause the spending transaction to comply with both the restriction on the input of the spending transaction and the restriction on the output of the spending transaction.

It is further desirable to provide a computer-implemented method that comprises creating, at a node in a blockchain network, a blockchain transaction having a transaction output that can be spent by a first spending transaction input of a first spending transaction, inserting, into the blockchain transaction, a first set of script elements that would constrain the first spending transaction to include a first set of spending transaction script elements that correspond to operations of a state machine, and inserting, into the blockchain transaction, a second set of script elements that would constrain a second set of spending transaction script elements that correspond to permitted state machine state transitions that include states that can be implemented using distinct blockchain transactions that can be concurrently but independently processed by the blockchain network. The blockchain transaction can include a first output having a first locking script, and a first transaction output value can include a second output having a second locking script and a second transaction output value, wherein the first set of script elements are part of the first locking script.

The spending transaction can include an unlocking script that, when executed by a transaction verifier with a previous transaction output locking script, will meet a predetermined verification test and will cause the node to at least store values representative of fields of the spending transaction in memory accessible to the transaction verifier when executing the previous transaction output locking script, inserting, into the spending transaction, a first set of script elements, wherein the first set of script elements form a part of a spending transaction locking script of a first output of the spending transaction and are consistent with requirements dictated by the previous transaction locking script and wherein the first set of script elements correspond to operations of a state machine, and inserting, into the spending transaction, a second set of script elements, wherein the second set of script elements form a part of the spending transaction locking script, are consistent with requirements dictated by the previous transaction locking script and correspond to permitted state machine state transitions that include states that can be implemented using distinct blockchain transactions that can be concurrently but independently processed by the blockchain network.

The spending transaction can include an input and an output with the input referencing a previous transaction output and wherein the spending transaction includes an unlocking script that, when executed by a transaction verifier with a previous transaction locking script of the previous transaction output, will meet a predetermined verification test, wherein the unlocking script causes the node to at least store values representative of fields of the spending transaction in memory accessible to the transaction verifier when executing the locking script, and inserting, into the spending transaction, data corresponding to additional state machines as spending transaction inputs and/or spending transaction outputs based on permitted state machine state transitions so that a number of the spending transaction inputs and/or spending transaction outputs used in the spending transaction is sufficient for a number of state machine transitions.

The permitted state machine state transitions might include a forking transition from one initial state to two subsequent states by creating, for the spending transaction, a first transaction output that corresponds to a first subsequent state, inserting, in the spending transaction, a first transaction output value for the first transaction output sufficient to cause the first transaction output to be an input for a first subsequent transaction referencing the first transaction output, inserting, into the first transaction output of the spending transaction, a third set of script elements, wherein the third set of script elements are part of a first locking script constraining the first subsequent transaction to take on the first subsequent state, creating, for the spending transaction, a second transaction output that corresponds to a second subsequent state, inserting, in the spending transaction, a second transaction output value for the second transaction output sufficient to cause the second transaction output to be an input for a second subsequent transaction referencing the second transaction output, inserting, into the second transaction output, a fourth set of script elements, wherein the fourth set of script elements are part of a second locking script constraining the second subsequent transaction to take on the second subsequent state, and inserting, into the first transaction output or the second transaction output, a fifth set of script elements, wherein the fifth set of script elements are part of the first locking script or the second locking script imposing a constraint that the first subsequent transaction and the second subsequent transaction be distinct.

The first locking script can constrain the first subsequent transaction to have a first state and the second locking script can constrain the second subsequent transaction to have a second state. The spending transaction can comprise three or more transaction output values corresponding to a fork of three or more states. The spending transaction can comprise three or more transaction input values corresponding to a merger of three or more states. The first locking script and the second locking script can constrain the first subsequent transaction and the second subsequent transaction to have a same state.

In general, the spending transaction might comprise N transaction input values and N transaction output values, wherein N is one, two, three or more.

The permitted state machine state transitions can include a merging transition from two initial states to one subsequent state, by inserting, into the spending transaction, a first transaction input for a first prior state, inserting, into the spending transaction, a second transaction input for a second prior state, and inserting, into the spending transaction, a merged state that is an allowed transition from the first prior state and the second prior state according to a state transition matrix.

The permitted state machine state transitions can be hardcoded into the first transaction input and/or the second transaction input by inserting, into the first transaction input, a first reference to a first previous transaction having the first prior state, inserting, into the second transaction input, a second reference to a second previous transaction having the second prior state, and inserting, into the spending transaction, a first transaction output for the merged state wherein the state transition matrix is available to the first previous transaction and the second previous transaction.

The permitted state machine state transitions can include a parallel operation from a number, N, of initial states to N subsequent states, N being two or more, by inserting, into the spending transaction, a first transaction input for a first prior state, inserting, into the spending transaction, a second transaction input for a second prior state, inserting, into the first transaction input, a first reference to a first previous transaction having the first prior state, inserting, into the second transaction input, a second reference to a second previous transaction having the second prior state, inserting, into the spending transaction, a first transaction output for a first subsequent state, inserting, into the first transaction output, a third set of script elements, wherein the third set of script elements are part of a first locking script constraining the first subsequent transaction to take on the first subsequent state, inserting, into the spending transaction, a second transaction output for a second subsequent state, and inserting, into the second transaction output, a fourth set of script elements, wherein the fourth set of script elements is part of a second locking script constraining the second subsequent transaction to take on the second subsequent state.

The operations of the state machine might encode for a smart contract implemented using the blockchain.

Transactions can be split up with arbitrary constraints. A method might comprise creating, at a node in a blockchain network, a first transaction, wherein the first transaction includes a first output having a first spendable value and a first locking script and the first transaction includes a second output having a second spendable value and a second locking script, including, in the first locking script, a first set of constraints on a first selected transaction output, wherein the first set of constraints are to be met by a first unlocking script if the first selected transaction output is to be valid for spending the first spendable value, including, in the second locking script, a second set of constraints on a second selected transaction output, wherein the second set of constraints are to be met by a second unlocking script if the second selected transaction output is to be valid for spending the second spendable value, and wherein the first set of constraints or the second set of constraints imposes a constraint on a locking script of a spending transaction having as a spending transaction output the first selected transaction output or the second selected transaction output.

The first selected transaction output can be an output of a first spending transaction, and the second selected transaction output can be an output of a second spending transaction distinct from the first spending transaction. The first set of constraints can be distinct from the second set of constraints and distinct from constraints on a transaction input of the first transaction. The first set of constraints and the second set of constraints can each comprise a common set of constraints. The constraint on the locking script of the spending transaction can require that, for the spending transaction to be valid, the locking script of the spending transaction include reference to at least one field of the spending transaction. Another constraint on the locking script requires that, for the spending transaction to be valid, the locking script of the spending transaction include a copy of a portion of the first locking script and/or a copy of a portion of the second locking script.

The first selected transaction output can be an output of a first spending transaction, the second selected transaction output can be an output of a second spending transaction, the first unlocking script can comprise fields of the first transaction, fields of the first selected transaction, and fields of the second spending transaction, and wherein the first locking script can comprise a first comparison of extracted fields of the first transaction and a second comparison of extracted fields of the first spending transaction.

The first set of constraints and the second set of constraints can each comprise a common set of constraints, whereby two constrained spending transaction output locking scripts are constrained by the common set of constraints. The first set of constraints and/or the second set of constraints can comprise a hash of a portion of the first locking script and/or a hash of a portion of the second locking script, and/or a constraint on a size of a portion of the first locking script and/or a size of a portion of the second locking script.

The first set of constraints and/or the second set of constraints can comprise an optional reference to input data. Each of a plurality of outputs of the first transaction can be constrained by a different constraint applied to outputs of the plurality of outputs.

Transactions can merge or have interdependencies with arbitrary constraints such as with a computer-implemented method, comprising creating, at a node in a blockchain network, a first spendable transaction, wherein the first spendable transaction includes a first spendable output having a first spendable value and a first locking script, including, in the first locking script, a first set of constraints on a spending transaction, wherein the first set of constraints is to be met by a first unlocking script of the spending transaction if the spending transaction is to be valid for spending the first spendable output, including, in the first set of constraints, a first spending transaction constraint that requires a first spending transaction output of the spending transaction to include a first spending transaction output locking script to contain a first set of smart contract script instructions, and including, in the first set of constraints, a second spending transaction constraint that requires the spending transaction to contain a second set of smart contract script instructions and requires the spending transaction to include a spending transaction input that references a second spendable transaction output.

The first set of smart contract script instructions can include script instructions duplicated from the first locking script and/or script instructions corresponding to a new smart contract that is distinct from a smart contract implemented in the first locking script.

The first set of constraints might be that the first spending transaction output locking script includes a reference to the second spendable transaction output and that the second set of smart contract script instructions includes a reference to an output of the first spendable transaction.

The method might include providing, in the first set of constraints, a first parallel constraint that requires the spending transaction to include a first spending transaction input referencing the first spendable transaction, a second parallel constraint that requires the spending transaction to include a second spending transaction input referencing the second spendable transaction output, a third parallel constraint that requires the first spending transaction output locking script to contain in the first set of smart contract script instructions at least a first set of script instructions determined, at least in part, by the first locking script, and a fourth parallel constraint that requires a second spending transaction output locking script to contain a second set of smart contract script instructions determined, at least in part, by a locking script of the second spendable transaction output.

The first set of constraints might include a first parallel constraint that requires the spending transaction to include a first spending transaction input referencing the first spendable transaction, a second parallel constraint that requires the spending transaction to include a second spending transaction input referencing the second spendable transaction output, a third parallel constraint that requires the first spending transaction output locking script to contain in the first set of smart contract script instructions at least a first set of script instructions duplicated from the first locking script, and a fourth parallel constraint that requires a second spending transaction output locking script to contain a second set of smart contract script instructions duplicated from a locking script of the second spendable transaction output.

It is further desirable to provide a computer-implemented method that comprises determining a first set of constraints on a first unlocking transaction output; determining a second set of constraints on a second unlocking transaction output; creating an initial transaction to include: at least one initial locking script that includes the first set of constraints and the second set of constraints; and at least one redeemable value, wherein unlocking the at least one redeemable value is contingent upon: the first set of constraints being satisfied, at least in part, by validating that a unlocking transaction includes the first unlocking transaction output; and the second set of constraints being satisfied, at least in part, by validating that the unlocking transaction includes the second unlocking transaction output; and causing the initial transaction to be validated at a node of a blockchain network.

A locking script in the first unlocking transaction output may be a duplicate of a locking script in the second unlocking transaction output.

A locking script in the first unlocking transaction output may be different from a locking script in the second unlocking transaction output.

The locking script in the first unlocking transaction output may include at least a portion of the at least one initial locking script.

Execution of the at least one locking initial script may select the at least a portion from a plurality of portions of the at least one initial locking script.

Execution of an unlocking script of the unlocking transaction may result in the at least one initial locking script receiving data that corresponds to one of the first unlocking transaction output or the second unlocking transaction output.

The data may have an index value. On a condition that the index value is a first index value, execution of the at least one initial locking script may determine whether the first set of constraints is satisfied. On a condition that the index value is a second index value, execution of the at least one initial locking script may determine whether the second set of constraints is satisfied.

The data may include a new locking script. As a result of receiving the data, the first unlocking transaction output may be constrained to include the new locking script.

The at least one initial locking script may include a constraint of a source of the data.

The method may further comprise determining a redeemable value for the first unlocking transaction output.

The initial transaction may encode a contract having a plurality of states.

The unlocking transaction may include a plurality of input values corresponding to the plurality of states.

The first set of constraints may constrain the first unlocking transaction output to have a first state. The second set of constraints constrains the second unlocking transaction output to have a second state.

It is further desirable to provide a computer-implemented method that comprises determining a unlocking transaction constraint that constrains a unlocking transaction to include a unlocking transaction input that references a previous transaction output; creating a redeemable transaction that includes: a redeemable transaction output that includes a redeemable amount; and a redeemable transaction locking script that includes the unlocking transaction constraint, wherein unlocking the redeemable amount is contingent upon execution of at least one unlocking script of the unlocking transaction satisfying the unlocking transaction constraint; and causing the redeemable transaction to be validated at a node of a blockchain network.

The unlocking transaction constraint may further constrain the unlocking transaction input to include a particular hash value.

The particular hash value may encode an identifier that references the previous transaction output.

The unlocking transaction constraint may further constrain a locking script of the unlocking transaction to include a set of script elements duplicated from the redeemable transaction locking script.

The redeemable transaction may encode a contract having a plurality of states.

The method may further comprise determining a redeemable value for an output of the unlocking transaction.

The unlocking transaction constraint may include a particular locking script element from the previous transaction output. As a result of the unlocking transaction input including the particular locking script element, the execution of the at least one unlocking script may satisfy the unlocking transaction constraint.

The particular locking script element may encode a cryptographic key of a particular entity.

The unlocking transaction constraint may be a first unlocking transaction constraint; and the method may further comprise: determining a second unlocking transaction constraint to further constrain the unlocking transaction; and creating a second redeemable transaction that includes: a second redeemable amount; and a second redeemable transaction locking script that includes the second unlocking transaction constraint, wherein unlocking the second redeemable amount may be further contingent upon execution of the at least one unlocking script satisfying the second unlocking transaction constraint.

The redeemable transaction locking script may be a first redeemable transaction locking script, and the at least one unlocking script may include a first unlocking script and a second unlocking script. The first unlocking transaction constraint may constrain the first unlocking script to include at least a portion of the first redeemable transaction locking script. The second unlocking transaction constraint may constrain the second unlocking script to include at least a portion of the second redeemable transaction locking script.

The at least a portion of the first redeemable transaction locking script may include a cryptographic key associated with a first entity. The at least a portion of the second redeemable transaction locking script may include a cryptographic key associated with a second entity different from the first entity.

The unlocking transaction constraint may further constrain the unlocking transaction to constrain an output of unlocking transaction.

The unlocking transaction constraints may encode another contract distinct from the contract. Unlocking the redeemable amount may be contingent upon the other contract being implemented in the output of the unlocking transaction.

It is further desirable to provide a computer-implemented method that comprises creating a blockchain transaction that encodes: a state machine in a first state and having a set of permissible state transitions; and a set of script elements to be executed to cause a unlocking transaction to: encode the state machine in compliance with the set of permissible state transitions; and comply with a restriction on an input to the unlocking transaction or comply a restriction on an output of the unlocking transaction; and causing the blockchain transaction to be validated by a node in a blockchain network.

The set of permissible state transitions may comprise state transitions that can be implemented independently and concurrently in distinct blockchain transactions.

The set of script elements may cause the unlocking transaction to comply with the restriction on the output of the unlocking transaction. The restriction on the output may require: a first output of the unlocking transaction to indicate a state corresponding to the first output in compliance with the set of permissible state transitions; and a second output of the unlocking transaction to indicate a state corresponding to the second output in compliance with the set of permissible state transitions.

The state corresponding to the first output and the state corresponding to the second output may be the same.

The state corresponding to the first output and the state corresponding to the second output may be different states.

The set of script elements may cause the unlocking transaction to comply with the restriction on the input of the unlocking transaction. The restriction on the input may require input to the unlocking transaction to indicate another state machine encoded in another blockchain transaction.

The restriction on the input may require the input to reference the state machine in the first state and to reference the other state machine in another state different from the first state.

A first transition from the first state to a second state may be within the set of permissible state transitions. A second transition from the other state to the second state may be within the set of permissible state transitions.

The set of script elements may cause the unlocking transaction to comply with the restriction on the input of the unlocking transaction. The restriction on the input may state a set of conditions for advancing the state machine. The set of conditions for advancing the state machine may be dependent on a state of another state machine.

The other state machine may be encoded in another blockchain transaction. The other transaction may encode a set of conditions for advancing the other state machine. The set of other conditions for advancing the other state machine may depend on a state of the state machine.

The set of script elements may cause the unlocking transaction to comply with the restriction on the output of the unlocking transaction. The restriction on the output may require the unlocking transaction to incorporate a set of elements of a smart contract into the output.

The set of elements of the smart contract may be obtained from another blockchain transaction.

The set of script elements may cause the unlocking transaction to comply with both the restriction on the input of the unlocking transaction and the restriction on the output of the unlocking transaction.

It is further desirable to provide a computer-implemented method that comprises creating, at a node in a blockchain network, a blockchain transaction having a transaction output that can be transferred by a first unlocking transaction input of a first unlocking transaction, inserting, into the blockchain transaction, a first set of script elements that would constrain the first unlocking transaction to include a first set of unlocking transaction script elements that correspond to operations of a state machine, and inserting, into the blockchain transaction, a second set of script elements that would constrain a second set of unlocking transaction script elements that correspond to permitted state machine state transitions that include states that can be implemented using distinct blockchain transactions that can be concurrently but independently processed by the blockchain network. The blockchain transaction can include a first output having a first locking script, and a first transaction output value can include a second output having a second locking script and a second transaction output value, wherein the first set of script elements may be part of the first locking script.

The unlocking transaction can include an unlocking script that, when executed by a transaction verifier with a previous transaction output locking script, may meet a predetermined verification test and may cause the node to at least store values representative of fields of the unlocking transaction in memory accessible to the transaction verifier when executing the previous transaction output locking script, inserting, into the unlocking transaction, a first set of script elements, wherein the first set of script elements form a part of a unlocking transaction locking script of a first output of the unlocking transaction and may be consistent with requirements dictated by the previous transaction locking script and wherein the first set of script elements correspond to operations of a state machine, and inserting, into the unlocking transaction, a second set of script elements, wherein the second set of script elements form a part of the unlocking transaction locking script, may be consistent with requirements dictated by the previous transaction locking script and correspond to permitted state machine state transitions that include states that can be implemented using distinct blockchain transactions that can be concurrently but independently processed by the blockchain network.

The unlocking transaction can include an input and an output with the input referencing a previous transaction output and wherein the unlocking transaction includes an unlocking script that, when executed by a transaction verifier with a previous transaction locking script of the previous transaction output, may meet a predetermined verification test, wherein the unlocking script causes the node to at least store values representative of fields of the unlocking transaction in memory accessible to the transaction verifier when executing the locking script, and inserting, into the unlocking transaction, data corresponding to additional state machines as unlocking transaction inputs and/or unlocking transaction outputs based on permitted state machine state transitions so that a number of the unlocking transaction inputs and/or unlocking transaction outputs used in the unlocking transaction is sufficient for a number of state machine transitions.

The permitted state machine state transitions might include a forking transition from one initial state to two subsequent states by creating, for the unlocking transaction, a first transaction output that corresponds to a first subsequent state, inserting, in the unlocking transaction, a first transaction output value for the first transaction output sufficient to cause the first transaction output to be an input for a first subsequent transaction referencing the first transaction output, inserting, into the first transaction output of the unlocking transaction, a third set of script elements, wherein the third set of script elements may be part of a first locking script constraining the first subsequent transaction to take on the first subsequent state, creating, for the unlocking transaction, a second transaction output that corresponds to a second subsequent state, inserting, in the unlocking transaction, a second transaction output value for the second transaction output sufficient to cause the second transaction output to be an input for a second subsequent transaction referencing the second transaction output, inserting, into the second transaction output, a fourth set of script elements, wherein the fourth set of script elements may be part of a second locking script constraining the second subsequent transaction to take on the second subsequent state, and inserting, into the first transaction output or the second transaction output, a fifth set of script elements, wherein the fifth set of script elements may be part of the first locking script or the second locking script imposing a constraint that the first subsequent transaction and the second subsequent transaction be distinct.

The first locking script can constrain the first subsequent transaction to have a first state and the second locking script can constrain the second subsequent transaction to have a second state. The unlocking transaction can comprise three or more transaction output values corresponding to a fork of three or more states. The unlocking transaction can comprise three or more transaction input values corresponding to a merger of three or more states. The first locking script and the second locking script can constrain the first subsequent transaction and the second subsequent transaction to have a same state.

In general, the unlocking transaction might comprise N transaction input values and N transaction output values, wherein N is one, two, three or more.

The permitted state machine state transitions can include a merging transition from two initial states to one subsequent state, by inserting, into the unlocking transaction, a first transaction input for a first prior state, inserting, into the unlocking transaction, a second transaction input for a second prior state, and inserting, into the unlocking transaction, a merged state that is an allowed transition from the first prior state and the second prior state according to a state transition matrix.

The permitted state machine state transitions can be hardcoded into the first transaction input and/or the second transaction input by inserting, into the first transaction input, a first reference to a first previous transaction having the first prior state, inserting, into the second transaction input, a second reference to a second previous transaction having the second prior state, and inserting, into the unlocking transaction, a first transaction output for the merged state wherein the state transition matrix is available to the first previous transaction and the second previous transaction.

The permitted state machine state transitions can include a parallel operation from a number, N, of initial states to N subsequent states, N being two or more, by inserting, into the unlocking transaction, a first transaction input for a first prior state, inserting, into the unlocking transaction, a second transaction input for a second prior state, inserting, into the first transaction input, a first reference to a first previous transaction having the first prior state, inserting, into the second transaction input, a second reference to a second previous transaction having the second prior state, inserting, into the unlocking transaction, a first transaction output for a first subsequent state, inserting, into the first transaction output, a third set of script elements, wherein the third set of script elements may be part of a first locking script constraining the first subsequent transaction to take on the first subsequent state, inserting, into the unlocking transaction, a second transaction output for a second subsequent state, and inserting, into the second transaction output, a fourth set of script elements, wherein the fourth set of script elements is part of a second locking script constraining the second subsequent transaction to take on the second subsequent state.

The operations of the state machine might encode for a smart contract implemented using the blockchain.

Transactions can be split up with arbitrary constraints. A method might comprise creating, at a node in a blockchain network, a first transaction, wherein the first transaction includes a first output having a first redeemable value and a first locking script and the first transaction includes a second output having a second redeemable value and a second locking script, including, in the first locking script, a first set of constraints on a first selected transaction output, wherein the first set of constraints may be met by a first unlocking script if the first selected transaction output is to be valid for unlocking the first redeemable value, including, in the second locking script, a second set of constraints on a second selected transaction output, wherein the second set of constraints may be met by a second unlocking script if the second selected transaction output is to be valid for unlocking the second redeemable value, and wherein the first set of constraints or the second set of constraints imposes a constraint on a locking script of a unlocking transaction having as a unlocking transaction output the first selected transaction output or the second selected transaction output.

The first selected transaction output can be an output of a first unlocking transaction, and the second selected transaction output can be an output of a second unlocking transaction distinct from the first unlocking transaction. The first set of constraints can be distinct from the second set of constraints and distinct from constraints on a transaction input of the first transaction. The first set of constraints and the second set of constraints can each comprise a common set of constraints. The constraint on the locking script of the unlocking transaction can require that, for the unlocking transaction to be valid, the locking script of the unlocking transaction include reference to at least one field of the unlocking transaction. Another constraint on the locking script requires that, for the unlocking transaction to be valid, the locking script of the unlocking transaction include a copy of a portion of the first locking script and/or a copy of a portion of the second locking script.

The first selected transaction output can be an output of a first unlocking transaction, the second selected transaction output can be an output of a second unlocking transaction, the first unlocking script can comprise fields of the first transaction, fields of the first selected transaction, and fields of the second unlocking transaction, and wherein the first locking script can comprise a first comparison of extracted fields of the first transaction and a second comparison of extracted fields of the first unlocking transaction.

The first set of constraints and the second set of constraints can each comprise a common set of constraints, whereby two constrained unlocking transaction output locking scripts may be constrained by the common set of constraints. The first set of constraints and/or the second set of constraints can comprise a hash of a portion of the first locking script and/or a hash of a portion of the second locking script, and/or a constraint on a size of a portion of the first locking script and/or a size of a portion of the second locking script.

The first set of constraints and/or the second set of constraints can comprise an optional reference to input data. Each of a plurality of outputs of the first transaction can be constrained by a different constraint applied to outputs of the plurality of outputs.

Transactions can merge or have interdependencies with arbitrary constraints such as with a computer-implemented method, comprising creating, at a node in a blockchain network, a first redeemable transaction, wherein the first redeemable transaction includes a first redeemable output having a first redeemable value and a first locking script, including, in the first locking script, a first set of constraints on a unlocking transaction, wherein the first set of constraints is to be met by a first unlocking script of the unlocking transaction if the unlocking transaction is to be valid for unlocking the first redeemable output, including, in the first set of constraints, a first unlocking transaction constraint that requires a first unlocking transaction output of the unlocking transaction to include a first unlocking transaction output locking script to contain a first set of smart contract script instructions, and including, in the first set of constraints, a second unlocking transaction constraint that requires the unlocking transaction to contain a second set of smart contract script instructions and requires the unlocking transaction to include a unlocking transaction input that references a second redeemable transaction output.

The first set of smart contract script instructions can include script instructions duplicated from the first locking script and/or script instructions corresponding to a new smart contract that is distinct from a smart contract implemented in the first locking script.

The first set of constraints might be that the first unlocking transaction output locking script includes a reference to the second redeemable transaction output and that the second set of smart contract script instructions includes a reference to an output of the first redeemable transaction.

The method might include providing, in the first set of constraints, a first parallel constraint that requires the unlocking transaction to include a first unlocking transaction input referencing the first redeemable transaction, a second parallel constraint that requires the unlocking transaction to include a second unlocking transaction input referencing the second redeemable transaction output, a third parallel constraint that requires the first unlocking transaction output locking script to contain in the first set of smart contract script instructions at least a first set of script instructions determined, at least in part, by the first locking script, and a fourth parallel constraint that requires a second unlocking transaction output locking script to contain a second set of smart contract script instructions determined, at least in part, by a locking script of the second redeemable transaction output.

The first set of constraints might include a first parallel constraint that requires the unlocking transaction to include a first unlocking transaction input referencing the first redeemable transaction, a second parallel constraint that requires the unlocking transaction to include a second unlocking transaction input referencing the second redeemable transaction output, a third parallel constraint that requires the first unlocking transaction output locking script to contain in the first set of smart contract script instructions at least a first set of script instructions duplicated from the first locking script, and a fourth parallel constraint that requires a second unlocking transaction output locking script to contain a second set of smart contract script instructions duplicated from a locking script of the second redeemable transaction output.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

BRIEF DESCRIPTION OF THE DRAWINGS

These and other aspects of the present invention will be apparent from and elucidated with reference to the embodiment described herein. An embodiment of the present invention will now be described, by way of example only, and with reference to the accompanying drawings, in which:

FIG. 5 illustrates an example script for implementing an OP_GENSIG script for generating a signature;

FIG. 6 illustrates an example script for implementing an OP_PREVTXINJECTION script for injecting a previous transaction corresponding to an input of an unlocking transaction;

FIG. 7 illustrates an example script for implementing an OP_SELFTXINJECTION script for injecting a previous transaction corresponding to an input being signed;

FIG. 24 illustrates an example of a trustless, deterministic state machine in accordance with an embodiment;

FIG. 29 is an example pseudocode sequence for a forking process;

FIG. 31 is an example pseudocode sequence for forcing smart contracts in an unlocking transaction;

FIG. 33 is a pseudocode sequence as an example for a merging process with weak dependency;

FIG. 34 is a pseudocode sequence as an example for a merging process with strong dependency;

FIG. 36 is a pseudocode sequence as an example for a parallel transaction barrier process.

DETAILED DESCRIPTION

Figure 1:
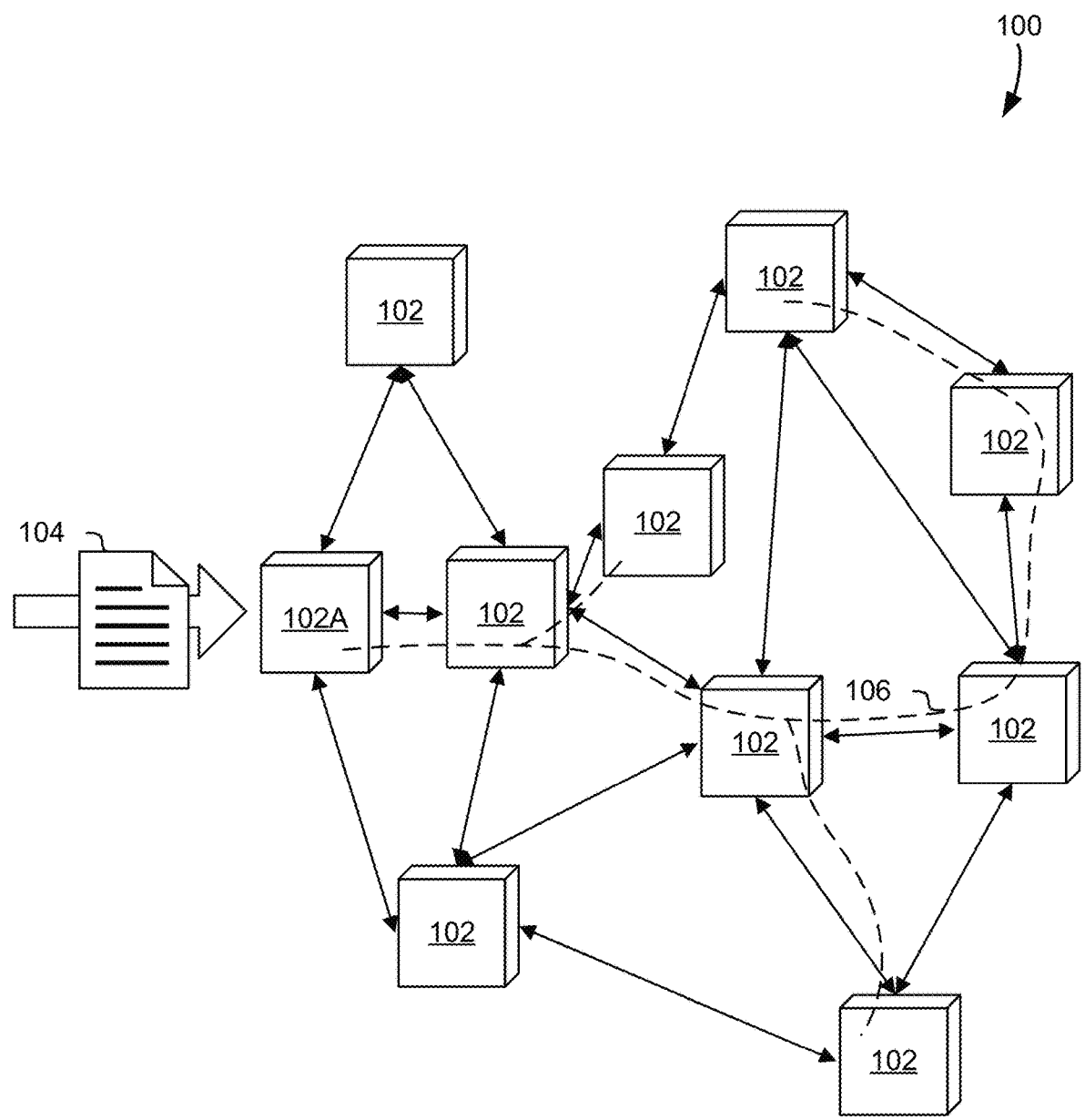
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the blockchain network 100 comprises blockchain nodes that might be implemented as peer-to-peer distributed electronic devices each running an instance of software and/or hardware that performs operations that follow a blockchain protocol that is, in whole or in part, agreed to among operators of blockchain nodes. In some examples, these distributed electronic devices are simply referred to as "nodes", such as nodes 102 in FIG. 1. An example of a blockchain protocol is the Bitcoin protocol.

A node 102 may comprise any suitable computing device (e.g., a server in a data centre, a client computing device such as a desktop computer, laptop computer, tablet computer, smartphone, etc.), by multiple computing devices in a distributed system of a computing resource service provider, or by any suitable electronic client device. Nodes 102 can have inputs to receive data messages or objects representative of proposed transactions, such as a transaction 104. Nodes 102 might be queryable for information they maintain, such as their understanding of the state of a transaction.

As shown in FIG. 1, some nodes 102 may be communicatively coupled to one or more other of the nodes 102. As for which nodes 102 can communicate with which other nodes, those details need not be centrally determined. It can be sufficient that active nodes in the blockchain network 100 are able to communicate with one or more other nodes 102 such that a message that is passed from one node 102 to another node 102 can propagate throughout the blockchain network 100 (or some significant portion of it), assuming that the message is one that the blockchain protocol indicates should be forwarded. One such message might be the publication of a proposed transaction by one of the nodes 102A, which would then propagate along a path such as a path 106. Another such message might be the publication of a new block proposed for inclusion onto a blockchain.

Figure 2:
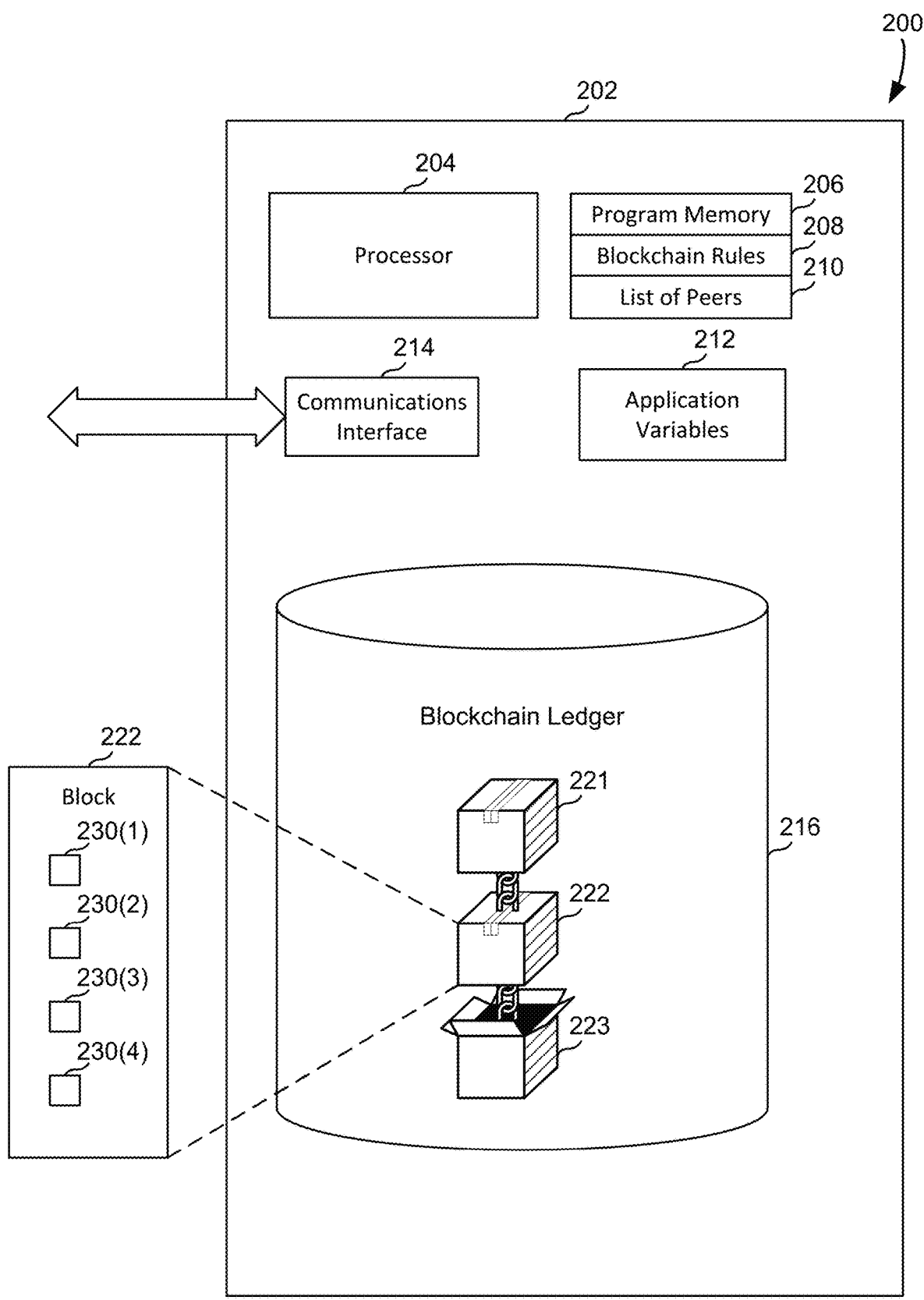
FIG. 2 illustrates an example of a blockchain node that might be used in the blockchain environment of FIG. 1.

FIG. 2 illustrates an example 200 of a blockchain node 202 that might be used in the blockchain environment as a node in the blockchain network of FIG. 1. As illustrated, blockchain node 202 is shown including a processor 204, program memory 206, storage for blockchain rules and protocol details 208, a list of peers 210, storage for application variables 212, a communications interface 214, and storage for a blockchain ledger 216. The blockchain ledger 216 contains data corresponding to blocks in the blockchain, such as blocks 221, 222, 223 that contain data corresponding to transactions, such as block 222 having transactions 230 (1)-(4). The blocks, except for block 223, may be cryptographically immutable in that a subsequent block relies on a value that is computed on a block when it becomes immutable and any modifications to an immutable block can be easily recognised by other blockchain nodes as an invalid block. Block 223 is illustrated as an open box, representing storage of transactions that may be possibly mutable and may not yet be committed to the blockchain.

Blockchain node 202 communicates over the communications interface 214, which can be implemented as one or more of wired or wireless communication. The blockchain ledger 216 might be a complete copy of the blockchain ledger of the blockchain network or a portion thereof. Some blockchain nodes might only maintain the untransferred transactions, while others might maintain the entire ledger. In this manner, the ledger is a distributed ledger, as each node can have its own copy. A node preferably only modifies its copy according to rules of the protocol and for all nodes that fully follow those rules, their copy should, at times, be the same as other nodes, save for some propagation time for blocks and transactions. A blockchain node should include the ability to verify blocks it receives and transactions in those blocks. A rule of the blockchain protocol might be that a blockchain node is not to propagate a block or a transaction to other nodes if it determines that the block of transaction is invalid. With that rule, blocks and transactions that are valid and verified to be valid may propagate the blockchain network, whereas invalid ones may not.

Some of the nodes in a blockchain network may be miner nodes that perform the operation of collecting transactions and creating blocks of transactions so that a new block can be committed to the blockchain. A miner node might be expected to perform some operation that is both complex (to avoid rogue nodes from easily creating improper blocks) and that is dependent on the data of the included transactions (so that a rogue node cannot perform the complex operation ahead of time), where the performance of those tasks is easily verified by other nodes. As those other nodes verify the work of the miner node and, upon verification, they accept the block into their copy of the blockchain and propagate it. This commits the new block to the distributed ledger of the blockchain. In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks may be added to the blockchain by a consensus of the nodes in the blockchain network. Also in some examples, a blockchain comprises a list of validated blocks.

In an embodiment, at least some of the nodes operate as validating nodes that validate transactions as described in the present disclosure. In some examples, the blockchain evidences value in the form of digital assets and together the transactions of the blockchain provide a chain from a genesis transaction (that starts the blockchain) or from distribution transactions that generate newly "mined" digital assets as a reason for miner node operators to participate, to subsequent transactions. The end of one part of the chain would be an untransferred transaction, or portion thereof, and each transaction on the blockchain specifies one or more outputs, some of which might be transferred and some untransferred, where an output comprises a specification of a value of that output and the requirements needed for someone to "unlock" that output by inserting a valid transaction (i.e., one that at least meets the specified requirements) that would extend that part of the chain. As used herein, an unspent transaction output might be referred to as a UTXO. Unlocking the UTXO may in the art also be known as spending the UTXO.

The requirements needed for someone to unlock a UTXO may be specified in the locking script of the UTXO. A valid unlocking transaction could be one that (i) specifies one or more previous UTXOs as the transaction's inputs, where the specification could be with pointers to the UTXOs, (ii) satisfies the requirements of the locking script(s) for each of those UTXOs, and (iii) has inputs such that the sum of the values of all of the UTXOs pointed to by those inputs is less than or equal to the sum of the values of all of the outputs of the transaction. The data representing the satisfaction of the requirements of a locking script can be referred to as an unlocking script. A validating node can process the unlocking script, followed by the locking script and an output of that process is either an invalid result or a validation of the unlocking transaction.

The process can be a stateless process, so that if one node runs that unlocking script and that locking script and the result is a validation that would be the outcome at other nodes. Therefore, an unlocking transaction that satisfies the locking script of the output of a previous transaction already on the blockchain that has not been already transferred may propagate and eventually be committed to the blockchain. The node that created the unlocking transaction that gets committed would in turn have specified the requirements, in its own locking script(s), that are required for anyone to unlock that new transaction's output's value(s). The process may be considered stateless in that the scripts need not refer to references outside the script and may not be dependent on variables or other state outside of those scripts, with some small exceptions. As a result, an unlocking script and a locking script can be evaluated in isolation.

In other variations, the blockchain system might include functionality that allows for external data to be included in the script evaluation process. In such cases, the external data can be controlled and/or secured in such a way that when an unlocking script and a locking script are evaluated using the external data, the evaluation may be consistent across nodes performing the evaluation.

Figure 3:
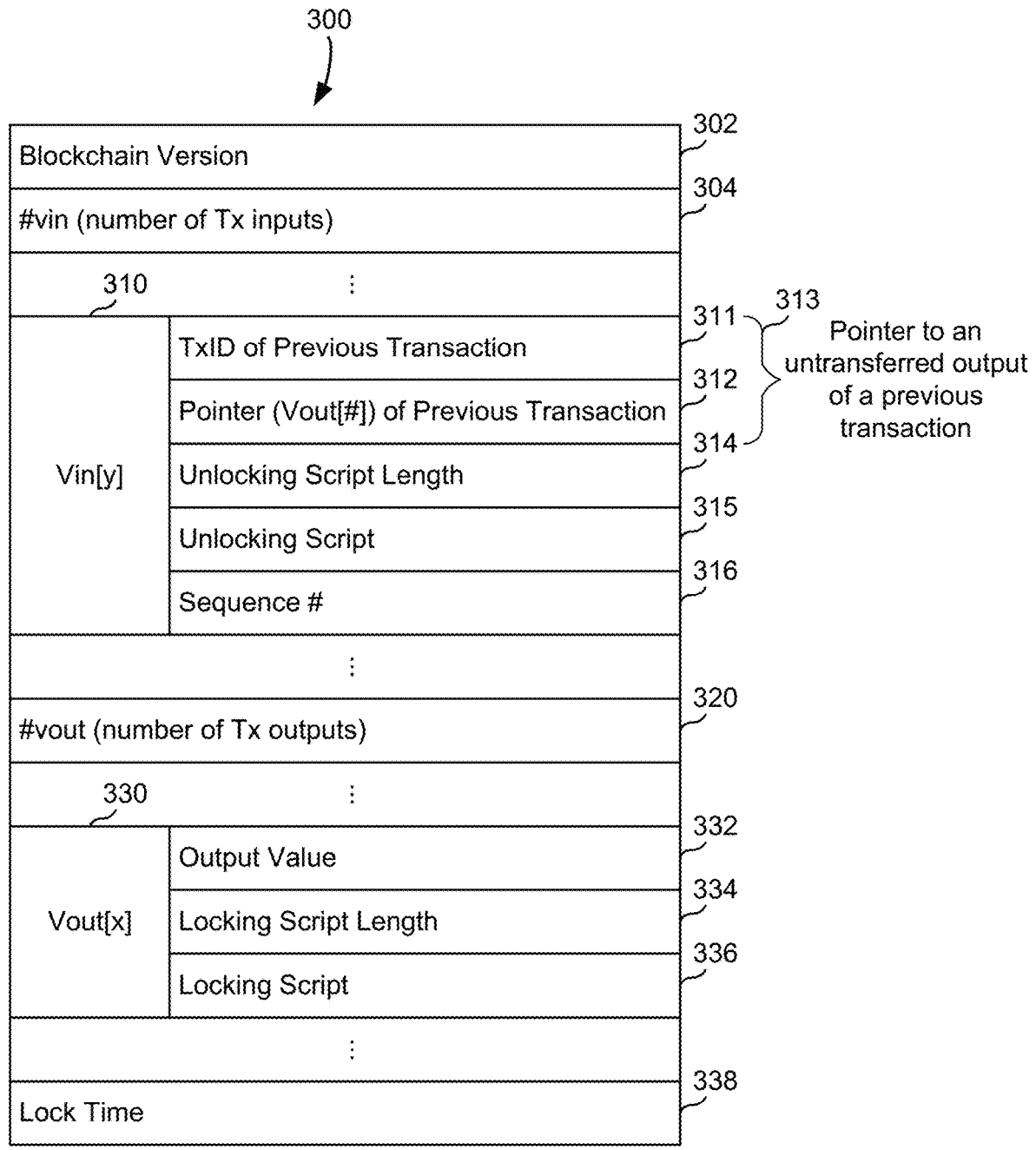
FIG. 3 illustrates an example of a transaction as might be stored in a blockchain ledger used by the blockchain node of FIG. 2.

FIG. 3 illustrates an example of a transaction 300 as might be stored in a blockchain ledger used by the blockchain node of FIG. 2. Other variations with similar functionality are possible. The data elements or fields of a transaction might be as shown in FIG. 3 and might include additional fields beyond those described in this disclosure. As shown, there is a blockchain version field 302 that has a value to indicate a blockchain protocol version of the transaction 300. A #vin field 304 indicates how many transaction inputs (explained below) are present in the transaction 300. Other fields might be present and not illustrated, but for each transaction input (illustrated here as the example Vin[y] 310), there may be a set of fields including a transaction ID (TxID) 311 of a previous transaction, a pointer 312 to one of the outputs of that previous transaction (the transaction that supplies the transaction output to match transaction input 310), where the TxID 311 and the pointer 312 together form a pointer 313 that references the output of the previous transaction. As used herein, the term "previous transaction" when used in context with respect to a current or present transaction may refer to a specific prior transaction (or transactions) having a transaction output that is referred to (and "transferred") by the current or present transaction. In examples, the current or present transaction might be referred to as the "unlocking transaction".

In some blockchain implementations, there is no centralised mechanism for assigning unique TxID values and instead, there is a decentralised mechanism for generating a unique TxID for a transaction, such as by generating a hash of the contents of the transaction itself. Since a valid transaction cannot have all of the exact same content as another valid transaction, each valid transaction may have a unique hash for its TxID (aside from the astronomically low probability of a hash collision). However, implemented, it is assumed herein that each transaction has a unique transaction ID. Due to the nature of hashing, once a TxID is generated from a transaction's content, none of that content can be changed and have the TxID remain valid for that transaction.

As shown in FIG. 3, the set of fields for the transaction input Vin[y] 310 also includes an Unlocking_Script_Length field 314 indicating a length of a script that follows, an Unlocking_Script field 315 containing an unlocking script for vin[y] 310 that "unlocks" a corresponding locking script of the transaction output pointed to by the pointer 313, and a sequence # field 316 that might be used to constrain the transaction 300.

Although FIG. 3 only explicitly shows one transaction input and one transaction output, more than one of each may be possible. Following the transaction inputs, there may be a #vout field 320 that may indicate how many transaction outputs (also explained below) are present in the transaction 300. For each transaction output (illustrated here as the example Vout[x] 330), there may be a set of fields including an output value field 332 that indicates the transaction value provided by this transaction output Vout[x] 330, a Locking_Script_Length field 334 indicating a length of a script that follows, and a Locking_Script field 336 containing a locking script for this transaction output Vout[x] 330. As explained, the transaction value of this transaction output can be "transferred" by anyone able to create an unlocking transaction that has a transaction input that has an unlocking script that a blockchain node may verify as TRUE when performing a verification using that unlocking script and that locking script. Other fields might follow the transaction output fields, such as a lock time field 338 that might constrain the transaction 300 to be not active prior to a specified future time or prior to a specified future block. Where each transaction input of an unlocking transaction points to a corresponding transaction output of a previous transaction output and the previous transaction output includes the transaction value, the transaction input need not contain a field indicating that transaction value.

Figure 4:
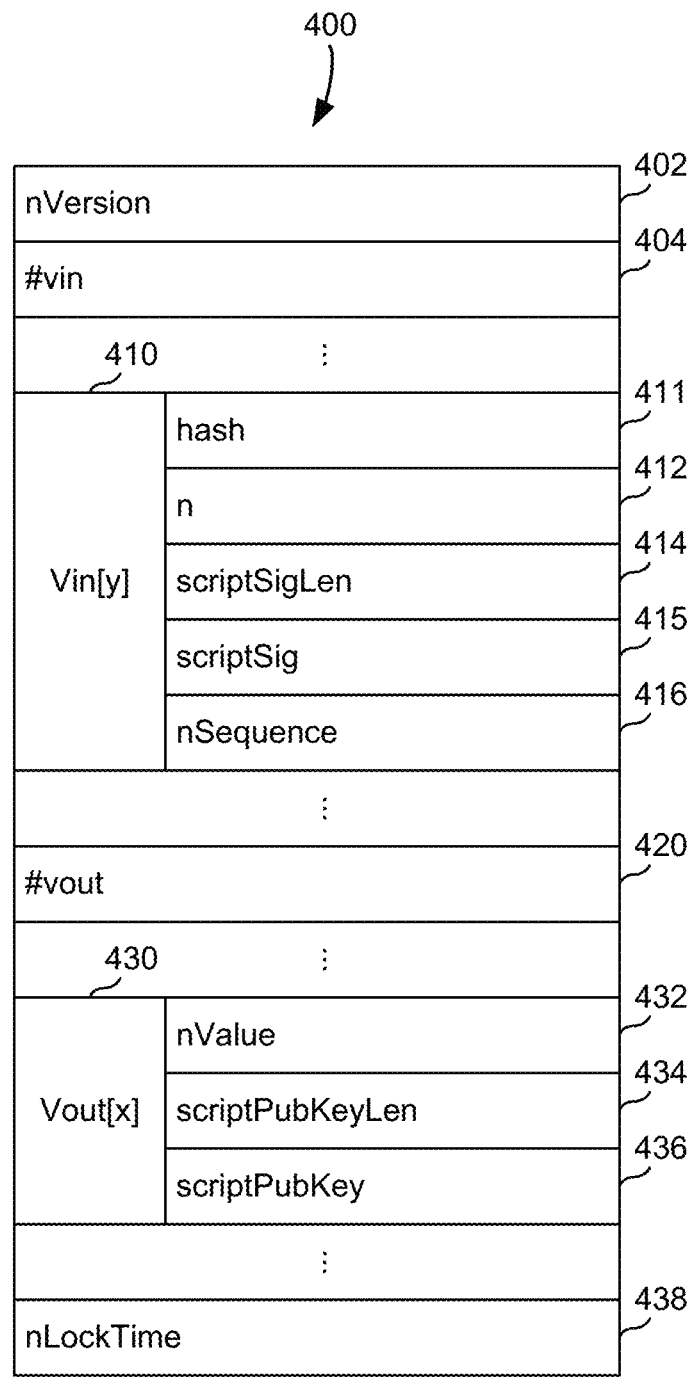
FIG. 4 illustrates an example of a blockchain transaction, specific to a Bitcoin blockchain environment.

FIG. 4 illustrates an example of a blockchain transaction 400, specific to a Bitcoin blockchain environment. In this example, the blockchain transaction 400 includes the data elements or fields shown and might include additional fields beyond those shown or described in this disclosure. The transaction 400 includes an nVersion field 402 that has a value to indicate a version of the transaction 400. A #vin field 404 may indicate how many transaction inputs are present in the transaction 400. For each transaction input, such as a transaction input Vin[y] 410, there may be a set of fields including a hash 411 that references a previous transaction, a pointer n 412 that points to a particular output of that previous transaction, a scriptSigLen field 414 indicating a length of an unlocking script that follows, a scriptSig field 415 containing an unlocking script for that transaction input Vin[y] 410, and an nSequence field 416 that might be used to constrain the transaction 400.

Following the transaction inputs, there may be a #vout field 420 that indicates how many transaction outputs are present in the transaction 400 and, for each transaction output (one is illustrated here as the example Vout[x] 430), there may be a set of fields including an nValue field 432 that indicates the transaction value provided by this transaction output Vout[x] 430, a scriptPubKeyLen field 434 indicating a length of a locking script that follows, and a scriptPubKey field 436 containing the locking script for this transaction output Vout[x] 430. The transaction 440 may be also shown with an nLockTime field 438 that might constrain the transaction 400 to be not active prior to a specified future time or prior to a specified future block.

OP Codes

In an example scripting language, such as the one used in many Bitcoin blockchain nodes, there may be a set of operation codes (OP codes) that can appear as script instructions in a script, such as a locking script or an unlocking script. In the present disclosure, various script OP codes and keywords are referenced for performing various operations. However, it is contemplated that other blockchain technologies could implement different instruction sets, and therefore the operation codes described in the present disclosure should be considered illustrative of the operations performed by the operation code.

Certain embodiments of the present disclosure operate under the assumption that the scripting system or other system for implementing the sets of instructions described allow for more than 200 instructions (e.g., more than 200 OP codes) in a single script. Likewise, certain embodiments of the present disclosure further assume that the functionality provided by the operation codes referred to in the present disclosure are present and enabled in the system that executes the operation codes scripts/sets of instructions. Examples of the operation codes referred to in the present disclosure include:

OP_ADD, which pops the top two items from the stack, adds them and pushes the result onto the stack OP_BIGMOD, which pops the top two items from the stack, divides the second item by the first and pushes the remainder onto the stack OP_BIGMODADD, which pops the top three items from the stack, performs modulo addition of the first item and the second item, modulo the third item, and pushes the result onto the stack OP_BIGMODINVERSE, which pops the top two items from the stack, performs a modulo negative exponent operation of the first item modulo the second item, and pushes the result onto the stack OP_BIGMODMUL, which pops the top three items from the stack, performs modulo multiplication of the first item and the second item, modulo the third item, and pushes the result onto the stack OP_CAT, which pops the top two items from the stack, concatenates the two items and pushes the result onto the stack OP_CHECKSIG, which pops two items from the stack, using the first as a public key and the second as a signature, checks whether the popped signature is a valid signature and, if valid, pushes 1 (TRUE) onto the stack, otherwise pushes 0 (FALSE) onto the stack OP_CHECKSIGVERIFY, which functions the same as OP_CHECKSIG, but OP_VERIFY is executed afterward OP_DIV, which pops two items from the stack, divides the second item from the first item and pushes the result onto the stack OP_DUP, which pushes a copy of the top item on the stack onto the stack, thus duplicating the top item OP_ELSE, which, if the preceding OP_IF or OP NOTIF or OP_ELSE was not executed, then these statements are executed; otherwise, if the preceding OP_IF or OP_NOTIF or OP_ELSE was executed, then these statements are not executed OP_ENDIF, which ends an if/else block OP_EQUAL, which reads the first two items on the stack and if the two items are exactly equal, pushes 1 onto the stack, 0 otherwise OP_EQUALVERIFY, which is the same as OP_EQUAL, but runs OP_VERIFY afterward OP_FROMALTSTACK, which puts the input onto the top of the main stack and removes it from the alternate stack OP_HASH256, in which the input is hashed twice: first with SHA-256 and then with RIPEMD-160

OP_IF, which, if the top stack value is not False, the statements are executed and the top stack value is removed OP_MUL, which multiplies the top two items on the stack OP_NOTIF, which, if the top stack value is False, the statements are executed and the top stack value is removed OP_OVER, which copies the second item on the stack and pushes it onto the top of the stack OP_ROLL, in which the item that is n items deep in the stack is moved to the top OP_SUBSTR, which returns a section of a string OP_SWAP, which swaps the top two items on the stack OP_TOALTSTACK, which puts the input onto the top of the alternate stack and removes it from the main stack OP_VERIFY, which marks the transaction as invalid if top stack value is not true Some of the above OP codes might be elementary OP codes supported by a blockchain node, whereas others are referenced here as OP codes for clarity of description but are typically implemented as small scripts made up of multiple elementary OP codes. For example, OP_BIGMOD is referenced as an OP code, but might be implemented using a sequence of OP codes to perform a function of returning the remainder after dividing the top two items on the stack. OP_BIGMODADD, OP_BIGMODINVERSE, and OP_BIGMODMUL might be represented by similar sequences of OP codes in a straightforward manner.

OP_GENSIG: In the present disclosure, references to OP_GENSIG should be viewed as shorthand for operations corresponding to the OP_GENSIG script described here. The OP_GENSIG script that generates a signature of a transaction, which might in turn be pushed onto a stack or used. The OP_GENSIG script begins with the assumption that the inputs pushed onto a main (last-in, first-out) stack, in order, are a <SIGHASH Type> (indicating which fields of the transaction are to be used in the hash), a message value <m> (a double SHA256 of the serialized set of the used transaction fields of the transaction), a private key <a> (used in hashing the message value <m>), and a number <k> (a random or pseudorandom number used to mask/protect the private key; a "mask number").

FIG. 5 shows the inputs and outputs of the OP_GENSIG script 500. In the OP_GENSIG script, the first line causes the number <k> to be copied to the alternate stack, and then multiplies <k> against the elliptic curve generator <PubK G> to produce elliptic curve point K at the top of the main stack. The second line of the script causes r to be calculated from x-coordinate of K modulo n and pushes a copy of r to the alternate stack. The third line of the script determines $s=k^{-1}(m+r \times a)$ mod n. Finally, the fourth line of the script causes r and s to be encoded in DER format and concatenated with <SIGHASH Type>.

The type of the signature hash can be indicated by a byte-encoded value, SIGHASH Type. The SIGHASH Type value specifies the set of fields to be extracted from a transaction before being serialized (e.g., canonicalised) and hashed. In some examples, the SIGHASH Type value can be SIGHASH_ALL, SIGHASH_NONE, SIGHASH_SINGLE, SIGHASH_ANYONECANPAY or some combination of two or more of these. In an embodiment, the type SIGHASH_ALL indicates that all fields in the transaction are to be included in a serialization (and thus hashed and signed), except for the input scripts. In an embodiment, the type SIGHASH_NONE indicates that the outputs need not be signed, which can allow others to update the transaction. In an embodiment, the type SIGHASH_SINGLE indicates that inputs are signed but the sequence numbers are blanked, so others can create new versions of the transaction which would use the same hash (assuming the fields that are hashed are not changed), but the only output that is signed is the one at the same position as the input.

In an embodiment, the type SIGHASH_ANYONECANPAY is combined with the other types and indicates that the input that includes SIGHASH_ANYONECANPAY is signed but that other inputs need not be signed. The SIGHASH Type value can be represented by a number that indicates the SIGHASH Type. For example, in some implementations SIGHASH_ALL is represented by a byte with a value of one (e.g., binary "00000001"), SIGHASH_NONE is represented by a byte with a value of two (e.g., binary "00000010"), SIGHASH_SINGLE is represented by a byte with a value of three (e.g., binary "00000011"), and SIGHASH_ANYONECANPAY is represented by a byte with a value of 80 (e.g., binary "01010000"). Combining SIGHASH Type values, in some implementations, is performed by binary addition of the respective byte values. In some examples, a set of transaction fields determined by SIGHASH Type refers to a subset, as determined by the SIGHASH Type value, of the corresponding transaction that is serialized. For example, with the SIGHASH Type of SIGHASH_ANYONECANPAY, only one transaction input is included within a signature.

By requiring that the unlocking script include the SIGHASH, the locking script can verify that the serialized set of unlocking transaction fields supplied by the unlocking script was actually the source of the SIGHASH and in turn, with the OP code OP_CHECKSIG, the locking script can verify that the SIGHASH Type value provided by the unlocking script matches the signature hash of the unlocking transaction. The locking script can do this because when it is executed by the transaction verifier, at that time transaction verifier is able to execute the OP_CHECKSIG operation and place the signature of the actual unlocking transaction onto the stack.

OP_DERENCODE: In the present disclosure, references to OP_DERENCODE should be viewed as shorthand for operations corresponding to popping the top two items from the stack, encoding them in DER format and pushing the result onto the stack.

OP_ECPMULT: In the present disclosure, references to OP_ECPMULT should be viewed as shorthand for operations corresponding to popping two items from the stack, performing elliptic curve point multiplication (also referred to as elliptic curve scalar multiplication) of those two items, and pushing the result onto the stack.

OP_ECPX: In the present disclosure, references to OP_ECPX should be viewed as shorthand for operations corresponding to popping two items from the stack, using the first item as a modulus n and the second item as an elliptic curve point K, calculating the x-coordinate of K modulo n and pushing the result onto the stack.

OP_PREVTXINJECTION: In the present disclosure, references to OP_PREVTXINJECTION should be viewed as shorthand for operations corresponding to the injection of a previous transaction corresponding to an input, X, of an unlocking transaction. FIG. 6 shows the inputs and outputs of the OP_PREVTXINJECTION script 600.

OP_SELFTXINJECTION: In the present disclosure, references to OP_SELFTXINJECTION should be viewed as shorthand for operations corresponding to the injection of a previous transaction corresponding to an input being signed. FIG. 7 shows the inputs and outputs of the OP_SELFTXINJECTION script 700.

Figure 8:
FIG. 8 illustrates an example script for implementing an OP_SPENDINGTXINJECTION script for injecting a serialized unlocking transaction into a locking script.

OP_SPENDINGTXINJECTION: In the present disclosure, references to OP_SPENDINGTXINJECTION should be viewed as shorthand for operations corresponding to injecting a serialized unlocking transaction into a locking script. Any entity that provides the SIGHASH Type value and set of unlocking transaction fields determined according to the SIGHASH Type can unlock the transaction output. This can be a useful feature. FIG. 8 shows the inputs and outputs of the OP_SPENDINGTXINJECTION script 800.

OP_EXTRACTTXID: In the present disclosure, references to OP_EXTRACTTXID should be viewed as shorthand for operations corresponding to taking in a transaction ID and the transaction ID position as input and outputting the extracted transaction ID. The inputs to OP_EXTRACTTXID are a serialized transaction and a value, X, indicating an input index and the output is the transaction identifier associated with the transaction input that is at that index in that serialized transaction. This script may need to parse the serialized transaction to extract the transaction ID, as the serialized transaction might comprise fields with variable length with the variances in length indicated by other fields in the serialized transaction.

FIG. 8 shows OP_SPENDINGTXINJECTION script 800, an OP code shorthand for a script that encodes constraints for causing injection of a serialized set of unlocking transaction fields. The locking script might include the OP code OP_GENSIG (which would result in the generation of a Bitcoin signature) followed by OP code OP_CHECKSIG (which would result in the signature being checked for being a valid signature for the unlocking transaction). In order for OP_GENSIG to produce a valid signature, it must have, as an input, certain elements: a SIGHASH type element, a hash of serialized set of unlocking transaction fields (the particular set that corresponds to the SIGHASH type element), a private key, and a mask number (e.g., a random or pseudorandom number used to mask/protect the private key). By including, in the locking script, a hash OP code, the private key and a random number, this effectively constrains the unlocking script to provide the SIGHASH type and serialized set of unlocking transaction fields.

Figure 9:
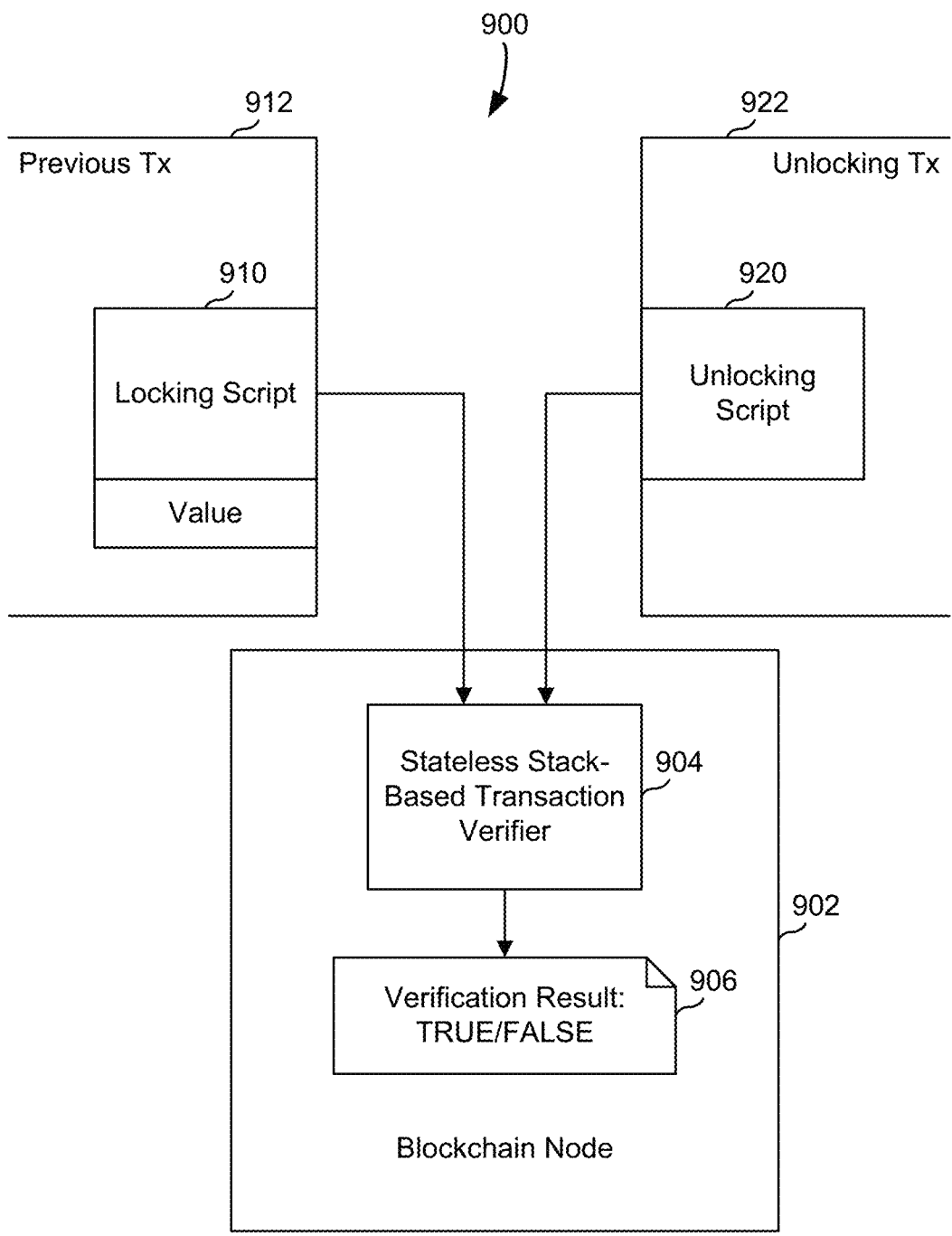
FIG. 9 illustrates an example of a pair of transactions, wherein one is a transaction having a value that is to be transferred and the other is a transaction representing the unlocking of that value.

FIG. 9 illustrates an example 900 of a pair of transactions. A blockchain node 902 that verifies transactions may have a transaction verifier 904, which can be a stateless stack-based transaction verifier that outputs a TRUE or FALSE result 906 depending on whether its inputs are valid. In other variations, the transaction verifier is not necessarily stateless and/or can refer to external trusted data or state. The teachings here might also apply to blockchain systems that do not use stack-based transaction verifiers.

The inputs to the transaction verifier 904 may be a locking script 910 from an output of a previous transaction 912 (the transaction output being transferred) and an unlocking script 920 of an input of an unlocking transaction 922 (the transaction input doing the unlocking). Although not shown, each transaction might include other fields. In a more general case, each transaction can have multiple inputs and/or multiple outputs, in which case the locking script 910 might be the locking script for one of a plurality of transaction outputs of the previous transaction 912 and the unlocking script 920 might be the unlocking script for one of a plurality of transaction inputs of the unlocking transaction 922.

With a stateless stack-based transaction verifier, the locking script 910 and the unlocking script 920 may be processed in isolation and not dependent on variables or other state outside of those scripts, with some small exceptions. As a result, the locking script 910 may not refer to fields of the previous transaction outside of the locking script 910 itself. The locking script 910 also cannot refer to fields of the unlocking transaction 922, because the unlocking transaction 922 did not exist at the time that the previous transaction 912, and therefore also the locking script 910, were created and made immutable.

The unlocking script 920, in order to be stateless, also cannot operate directly on fields of the unlocking transaction 922. The stateless quality may be useful in that it ensures that any properly programmed blockchain node would come to the same result 906 given that same locking script 910 and the same unlocking script 920. One exception to this is that a script might have the ability to check a signature in one of the scripts against a signature generated from the transaction as a whole. In an embodiment, scripts can use OP_CHECKSIG for this purpose.

In a stack-based operation, the transaction verifier executes the unlocking script by processing each OP code in the script in turn. Some OP codes result in processing, some result in data being pushed onto or popped from a stack, or some combination. Once execution of the unlocking script is complete, there may be data remaining on the stack. If the execution of the unlocking script is without scripting errors or OP codes that terminate execution, the transaction verifier then executes the locking script, which can use that data that is present on the stack. Where the locking script and the unlocking script may be written using the same set of OP codes, this is similar in effect to executing a single script comprising a concatenation of the unlocking script followed by the locking script. However, having a check for scripting errors at the end of the execution of the unlocking script's OP codes and before execution of the locking script's OP codes can prevent problems caused by malformed unlocking scripts.

Once the execution of the scripts is complete, the result that remains at the top of the stack is the result of the verification. If TRUE is on the top of the stack, that may be considered a verification that the unlocking script actually unlocks the locking script. In this regard, the unlocking script satisfies all of the requirements of the locking script.

Figure 10:
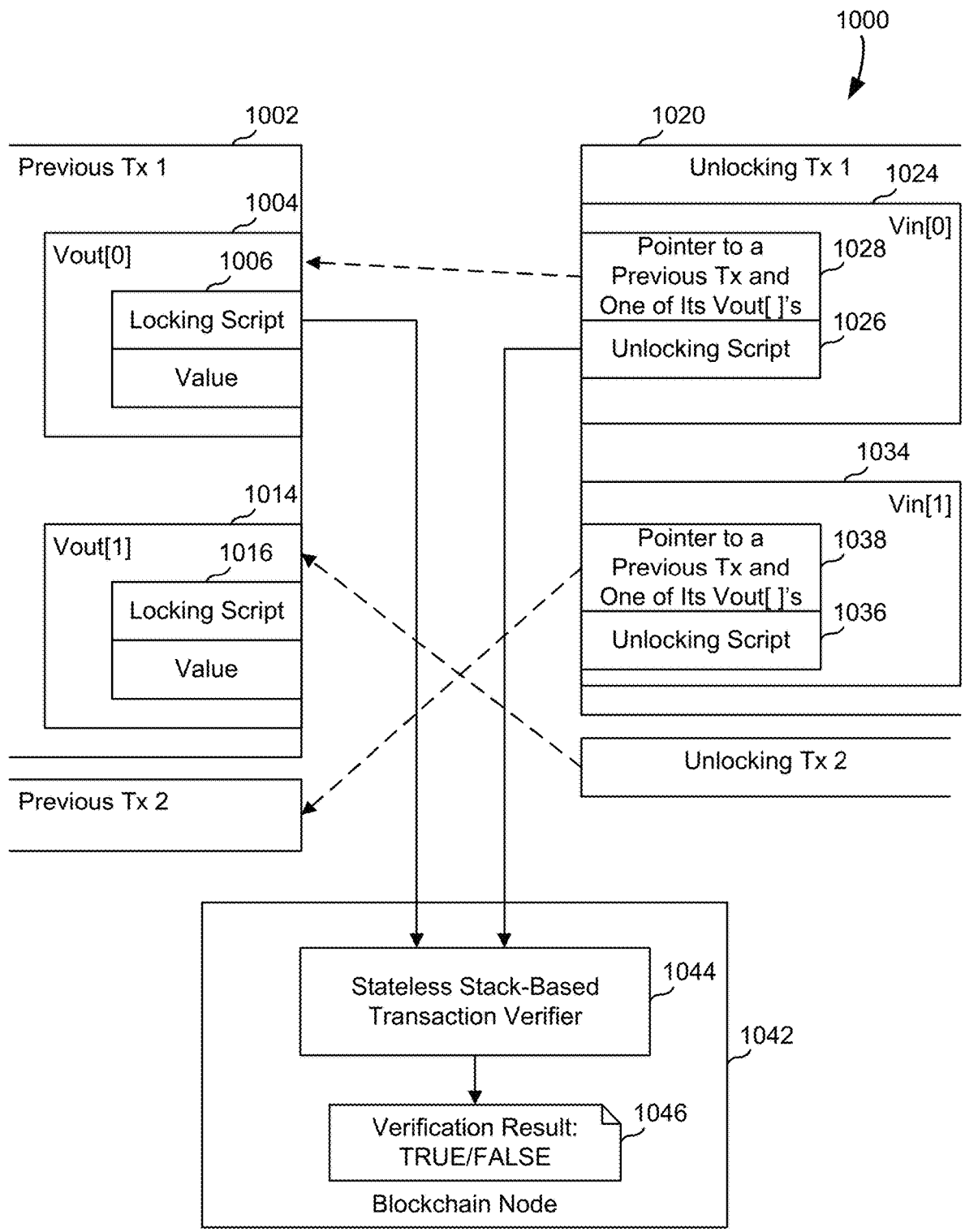
FIG. 10 illustrates an example of multiple transactions, wherein a transaction has multiple inputs from other transactions and multiple outputs that can be transferred by future transactions.

FIG. 10 illustrates an example 1000 of multiple transactions and multiple inputs/outputs. As shown, a previous transaction 1002 has two transaction outputs, Vout[0] 1004 with its locking script 1006 and Vout[1] 1014 with its locking script 1016, and their corresponding transaction output values, among other fields not shown, such as the transaction inputs to the previous transaction 1002. An unlocking transaction 1020 is shown with two transaction inputs, Vin[0] 1024 (with its unlocking script 1026 and a pointer 1028 to its corresponding previous transaction output) and Vin[1] 1034 (with its unlocking script 1036 and a pointer 1038 to its corresponding previous transaction output). In this example, the corresponding previous transaction output for Vin[0] is Vout[0] of the previous transaction 1002 (Previous Tx 1), while the corresponding previous transaction output for Vin[1] is some output of another transaction (Previous Tx 2) (not shown).

To validate the unlocking transaction 1020, a blockchain node 1042 with a transaction verifier 1044 outputs a TRUE or FALSE result 1046 depending on whether all of its inputs are valid. In this case, multiple inputs may be present for unlocking transaction 1020, so they are each validated by processing an unlocking script of a transaction input and the locking script of the corresponding transaction output pointed to by the inputs' pointer.

With the ability to have multiple outputs and multiple inputs, the value of one transaction can be transferred by multiple other transactions and the value that is redeemable in a new transaction might come from more than one previous transaction. As explained above, the locking script can impose, via signatures and other cryptographic techniques, constraints on what must be in the unlocking script.

One such constraint may be that the unlocking script must contain some arbitrary data. Some constraints might be "weak constraints" or more general constraints, such as a constraint that the unlocking script must contain some data that has a length of four bytes, or some specific number of bytes without constraining those bytes to be any particular values. A stronger, or more specific constraint may be that the data must produce a specific hash value when the data is hashed. This latter constraint typically requires that the data be of a specific length and be a specific value for the data as it might be nearly impossible for someone to determine a different value that would result in the same hash. The constraint might be implemented in a script by the unlocking script pushing that data onto the stack, or pushing on a hash of that data onto the stack, having the locking script push the needed hash onto the stack and then executing the OP_EQUAL and then the OP_VERIFY OP code. Those OP codes would return true if those two pushed items matched, and return false if they did not. In the more general case, constraints can be imposed that require certain data to be present or data with certain characteristics to be present.

An example of a weak constraint is that the unlocking script must include certain data that might comprise the serialized set of unlocking transaction fields without necessarily requiring that those fields be any specific values. In this manner, a locking script can constrain the script of an unlocking script that unlocks that locking script's output to include fields of the unlocking transaction from where the unlocking script came. This effectively allows the locking script to perform operations on the fields of the unlocking transaction that the unlocking script leaves on the stack. Another example of a weak constraint is that the unlocking script must contain certain data, possibly obtained from a specified place, but where there is not a constraint on the value of the data. This allows for some weak constraints that can be imposed even if the value of the data is not determined until well after the locking script is immutable.

The operations of constraining and the data of the constraints might include elements of a "smart contract". A smart contract defines terms and conditions of a contract involving who can do what, when they can do it, and who gets paid what and when. Where the terms and conditions can be represented as constraints, weak or strong, on an unlocking script or other parts of an unlocking transaction, those terms and conditions of a smart contract can be enforced by the blockchain protocol. So, just as in the above example where only Bob is able to unlock the value of a transaction output that is locked (because only an unlocking script that only Bob is able to create would unlock that transaction output), there might be a constraint that only upon the permission granted by one party and after a certain time and only after another transaction output is spent, etc., then a transaction output can be spent.

Figure 11:
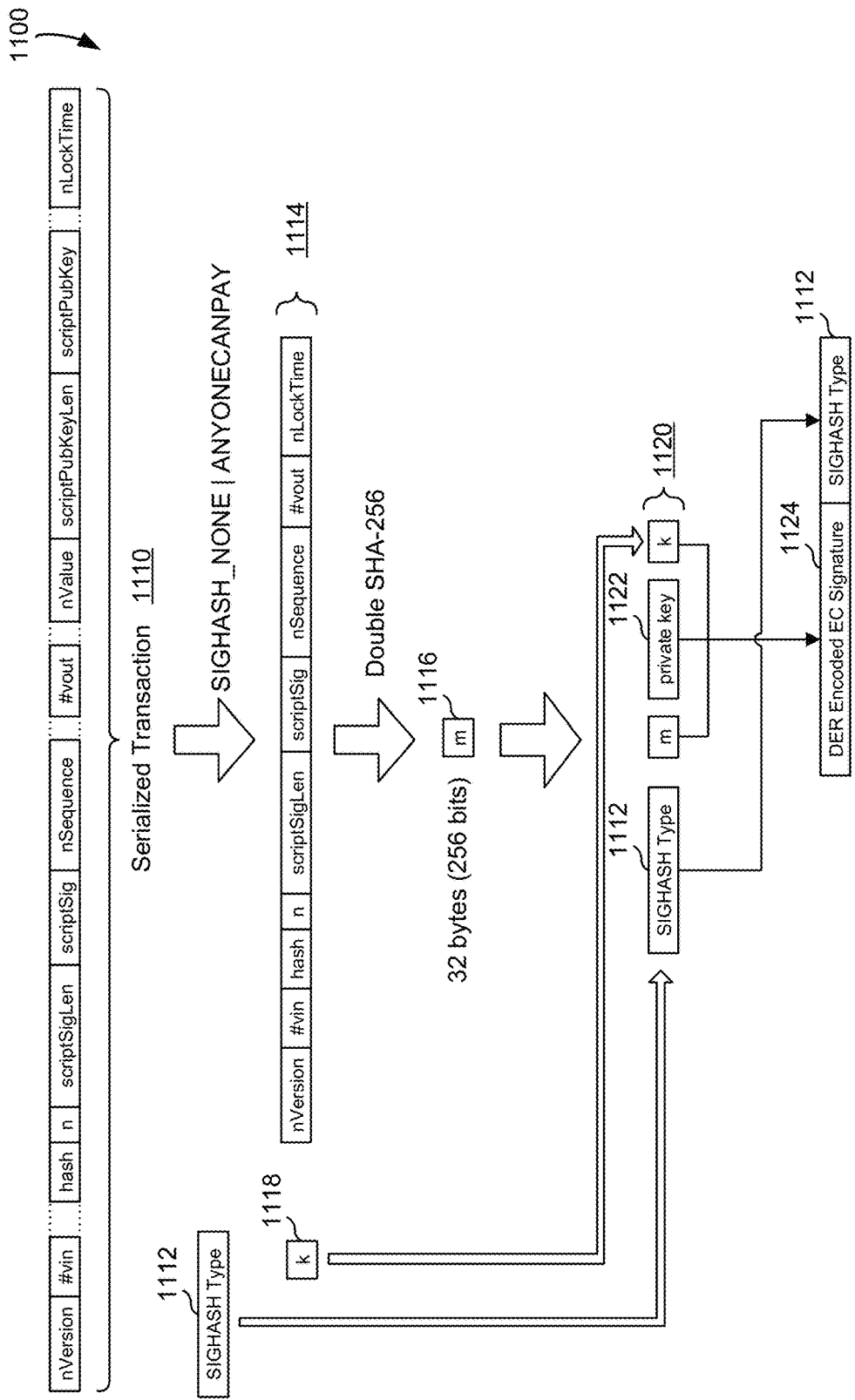
FIG. 11 illustrates an example of generating a signature from a serialized set of transaction fields in accordance with an embodiment.

FIG. 11 illustrates a procedure 1100 for generating a signature from a serialized set of transaction fields. This might be done by a blockchain node that is creating a transaction or some other generator of transactions. As illustrated in FIG. 11, a serialized transaction 1110 (i.e., the transaction represented in a series of data objects of a particular format) comprises a set of field values of a transaction. The signer of the serialized transaction 1110 chooses a SIGHASH Type 1112 and provides the signer's private key. The blockchain client/node can determine from the SIGHASH Type 1112 which fields, or modified fields, of the serialized transaction 1110 are to be used. Some of the fields might be modified (other than setting them to zeroes) prior to the hash being generated. In the example of FIG. 11, the SIGHASH Type is set equal to SIGHASH_NONE-|SIGHASH_ANYONECANPAY and thus the fields selected are those shown by a modified serialized transaction 1114.

The blockchain client/node generates a hash (e.g., performs a double SHA-256 hash) of the modified serialized transaction 1114, which results in a message, m 1116. The blockchain client/node handling the serialized transaction 1110 chooses a number, k 1118, which is typically a random or pseudorandom number in order to mask/protect a private key. The number k is referred to at times in the present disclosure as a "mask number". The blockchain client/node then creates a signature 1124 (a DER encoded EC signature, in this example) from a set of signature inputs 1120 from the SIGHASH Type 1112, the message m 1116, a signer's private key 1122, and the number k 1118. Signature 1124 and SIGHASH Type 1112 can then be used in an unlocking script.

Figure 12:
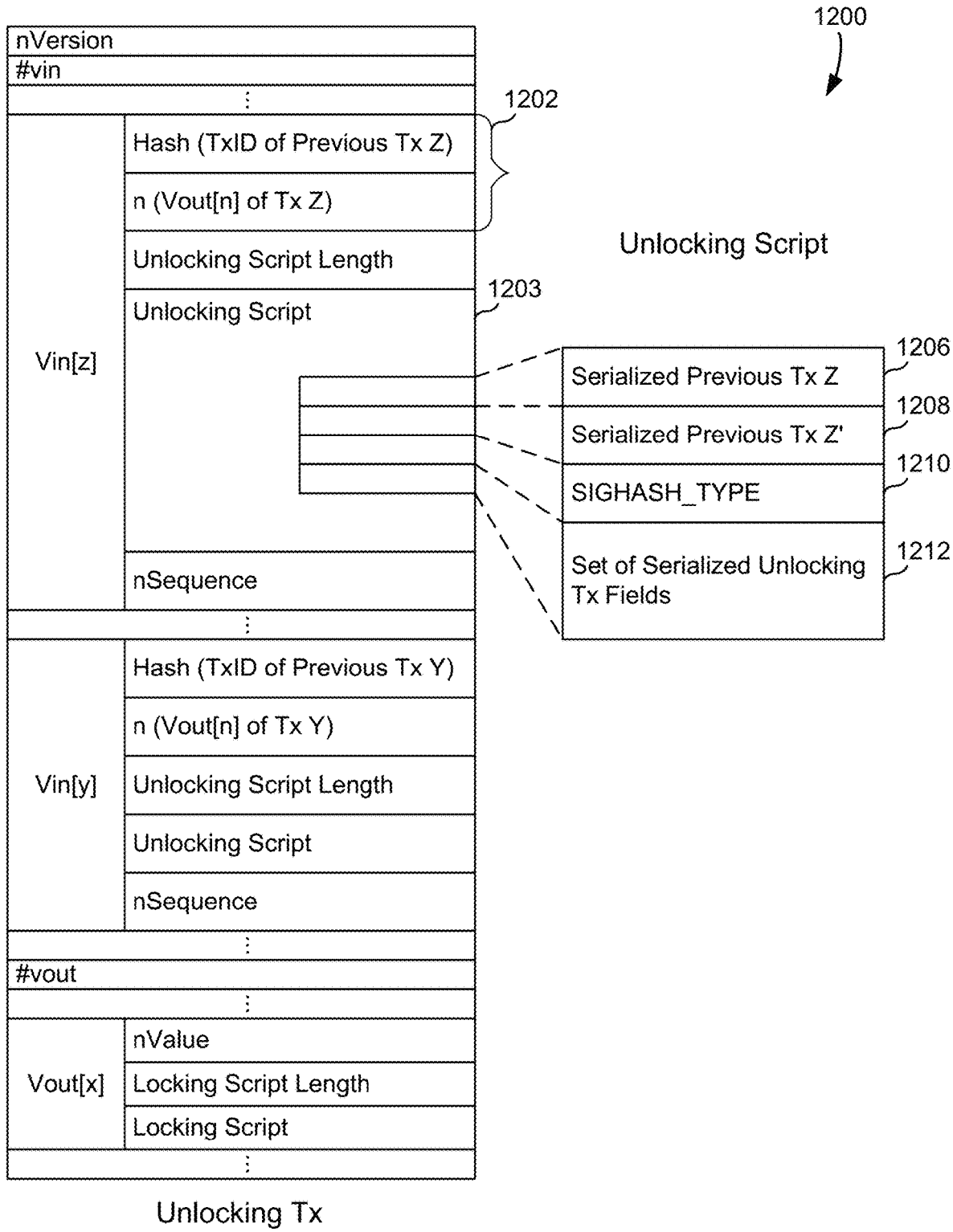
FIG. 12 illustrates an example of an unlocking transaction that includes an unlocking script that includes a copy of parts of the unlocking transaction.

FIG. 12 illustrates an example of an unlocking transaction 1200 that includes an unlocking script 1203 that includes a copy of the unlocking transaction (such as a serialized set of fields of the unlocking transaction). As illustrated in FIG. 12, one of the transaction inputs is Vin[z]. Input Vin[z] has a hash that is the previous transaction TxID and an output number, n, of that previous transaction. Together these form a pointer 1202 to a specific output of a specific previous transaction, which Vin[z] is to unlock. The transaction input Vin[z] has an unlocking script 1203 that in turn has several components or subscripts 1206, 1208, 1210, 1212. The unlocking script 1203 includes a serialized version 1206 of Previous Tx Z. Also shown is a serialized version 1208 of Previous Tx Z', which is a transaction with an output that was transferred by Previous Tx Z, serialized in the same manner. Although not shown, additional prior transactions can be included. The unlocking script 1203 also includes a SIGHASH_TYPE byte 1210 to indicate what fields of the unlocking transaction 1200 have been included.

The locking script of the previous transaction uses OP_GENSIG and OP_CHECKSIG to constrain the unlocking script to have included the unlocking transaction and uses the TxID of the previous transaction and OP_EQUALVERIFY to constrain the unlocking script to have included the serialized version 1206 of the Previous Tx Z. The TxID of the Previous Tx Z can be extracted from the fields of the unlocking transaction and the Previous Tx Z can be injected. Since the Previous Tx Z itself includes a TxID of Previous Tx Z', that TxID can be extracted and so on.

The serialized set of transaction fields of an unlocking transaction does not include the unlocking script(s) of the unlocking transaction itself; that would otherwise have causality issues. In some embodiments, such as a Bitcoin blockchain environment, signature hashes of a transaction can exclude some predetermined fields. A SIGHASH Type may refer to which set of fields are extracted from a transaction before being serialized and hashed.

A locking script of a previous transaction can impose on an unlocking transaction the requirement that, for the unlocking transaction to be valid, the unlocking transaction's unlocking script needs to include a copy of some or all of the fields of the unlocking transaction and a reference to one or more of the previous transaction(s) that the unlocking transaction unlocks. Of course, the fields of the unlocking transaction may be mutable at the time the unlocking transaction is created. However, a locking script of the previous transaction can impose constraints on fields of the unlocking transaction, in that if those fields of the unlocking transaction that are part of the unlocking script of the unlocking transaction do not satisfy those constraints, the unlocking transaction may not validate when the locking script is executed. The fields that are not part of the unlocking script (such as fields that by the SIGHASH Type value are not included or set to zero) may not be constrained by the locking script. Also, not all of the fields that are included in the serialized unlocking transaction need have constraints. For example, a locking script might only constrain one of the many fields of the serialized unlocking transaction that are included in the unlocking script.

Different outputs of the previous transaction can apply different sets of constraints, perhaps on different inputs and outputs of different unlocking transactions. Using such techniques, a blockchain node can create a transaction with such a locking script and that locking script can further perform other checks such that as the created transaction output is transferred, and the transaction that unlocks that transaction output, etc., may necessarily carry various data elements and state.

The transaction of FIG. 12 can be extended to implement a state machine with considerable complex functionality. As explained above, a locking script can access, at verification time, data that may only be available after the locking script is created and fixed. That data can include details of fields of the unlocking transaction being verified as well as details of the previous transaction containing the locking script (and possibly other prior transactions that are known to the blockchain node that is creating the unlocking transaction at the time). This allows the state of a state machine to be represented in the scripts and for the state and state transitions to be implemented and occur within the trustless confines of a blockchain environment. In other words, a state machine can be implemented using transactions that are verified by blockchain nodes that are not necessarily trusted, by having the transactions processed as with other transactions handled by a blockchain network. In some examples, "trustless" refers to the property that any entity can create a valid unlocking transaction as long as the constraints are met, and that entity does not need to be trusted. However, in some cases the entity may need to interact with a determined source to obtain required inputs. In some embodiments, one or more input can be obtained from an undetermined source, such as from a serialized previous transaction.

In the blockchain network, a transaction has some values for its inputs (determined by the transaction output values of the previous transactions that the transaction inputs unlock) and some values for its outputs. To be valid, the sum of the outputs cannot exceed the sum of the inputs (except for distribution transactions and the genesis transaction, which can be set aside for this description), and to be taken up by a miner node, the outputs might be less than the inputs, so as to provide a reason for the miner node operator to participate. In implementing a trustless deterministic state machine using a blockchain network, the initial state of the state machine would be in a transaction that contains sufficient value to provide reasons for miners to include transactions that correspond to state transitions of the state machine.

In the general case, a locking script of a previous transaction can be used in implementing a state machine such that an unlocking transaction represents a state transition of that state machine with the locking script constraining the contents of the unlocking transaction, in particular, constraining the contents and nature of the various transaction outputs of the unlocking transaction. Thus, a locking script of an output of the previous transaction can in effect specify what each transaction output of the unlocking transaction needs to look like. The locking script can require different characteristics of different unlocking transaction outputs, such as by requiring that Vout[0] of the unlocking transaction include certain data and script elements and that Vout[1] of the unlocking transaction include certain other data and other script elements.

Any entity that provides the SIGHASH Type and a set of unlocking transaction fields that the particular SIGHASH Type uses can unlock the transaction output. In this manner, some parties would have a reason to propagate the contents of the transaction by unlocking it and carrying forward details from the locking script. As noted above, in some examples, to "unlock" the transaction output refers to creating an unlocking transaction that references the transaction output and may evaluate as valid, which may thereby cause the transaction output to be transferred.

Using the techniques and apparatus described above, transactions can be created on a blockchain ledger that include scripts that implement smart contracts, that are able to implement state machines, and that can reference fields of a current transaction, a previous transaction having outputs transferred by the current transaction, and possibly other prior transactions. With these facilities, a transaction flow can enforce self-replicating scripts, for use with smart contracts or otherwise.

Figure 13:
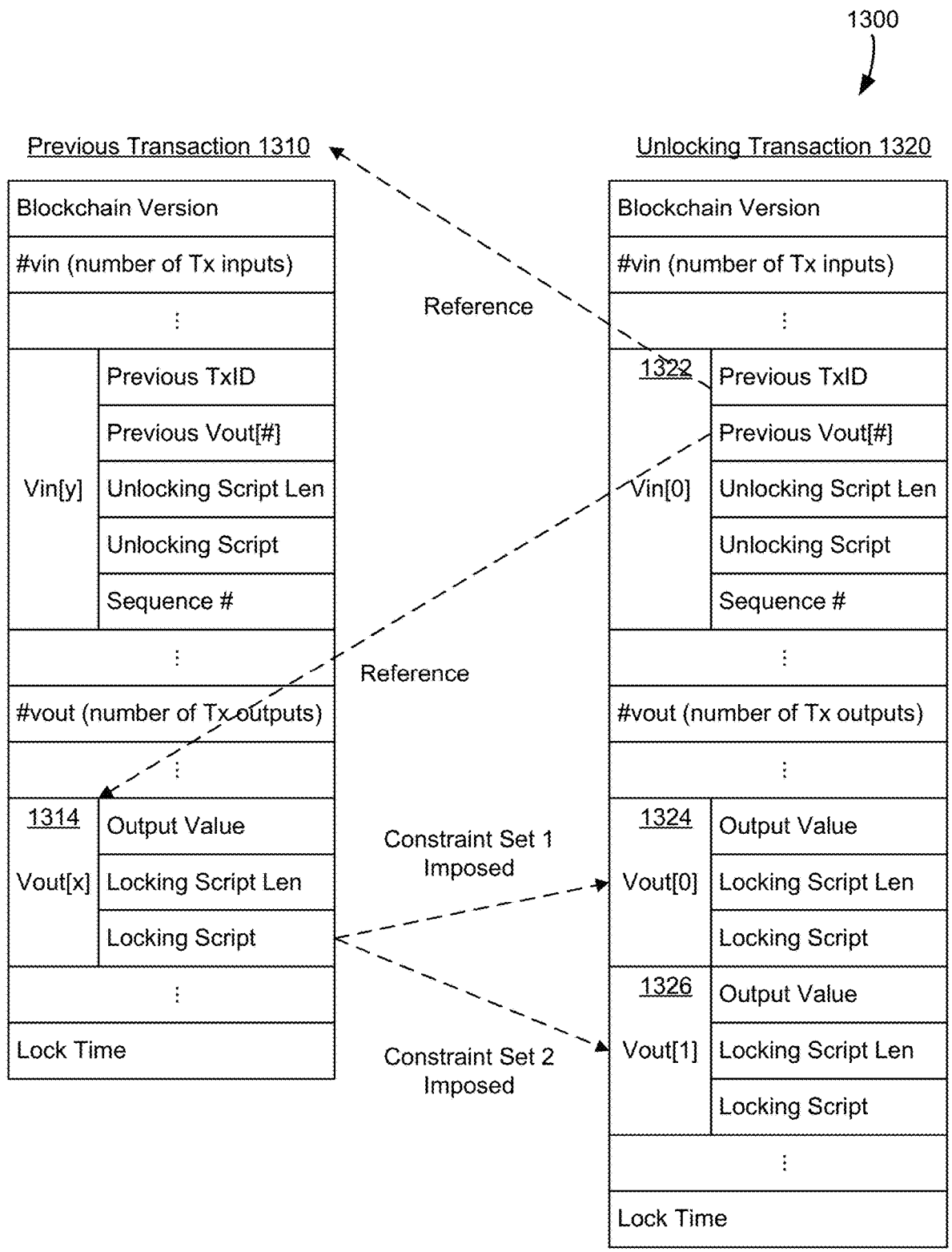
FIG. 13 illustrates an unlocking transaction and a previous transaction.

FIG. 13 illustrates an unlocking transaction 1320 and a previous transaction 1310. In this example 1300, the unlocking transaction has an input Vin[0] 1322 that references the previous transaction and a transaction output Vout[x] 1314 of that previous transaction. In order for the unlocking transaction to be considered valid, the constraints of the locking script of Vout[x] must be met. As explained above, some constraints might be simple, such as a simple requirement that the unlocking script of the unlocking transaction input that points to a locking script must be able to provide a valid signature signed by the public key that appears on the locking script. However, locking scripts, as described herein, can provide more complex constraints.

For example, the locking script of Vout[x] 1314 of the previous transaction 1310 can impose a constraint specifically on the outputs of the unlocking transaction. The locking script of Vout[x] 1314 in this example imposes a set of constraints (Constraint Set 1) on an output Vout[0] 1324 of the unlocking transaction 1320 and a set of constraints (Constraint Set 2) on an output Vout[0] 1326 of the unlocking transaction 1320. In a specific case, Constraint Set 1 and Constraint Set 2 are the same and both merely require that the locking scripts of outputs Vout[0] 1324 and Vout[1] 1326 be the same as the locking script of Vout[x] 1314 of the previous transaction 1310.

In the more general case, the constraints can go beyond just a requirement of copying locking scripts. Additionally, the constraint sets can vary from unlocking transaction output to output. The constraints can be on the number of outputs that the unlocking transaction can have, the value of each output, as well as requiring certain contents in the unlocking transaction's outputs' locking scripts.

Constraints on Outputs of Injected Unlocking Transactions

Figure 14:
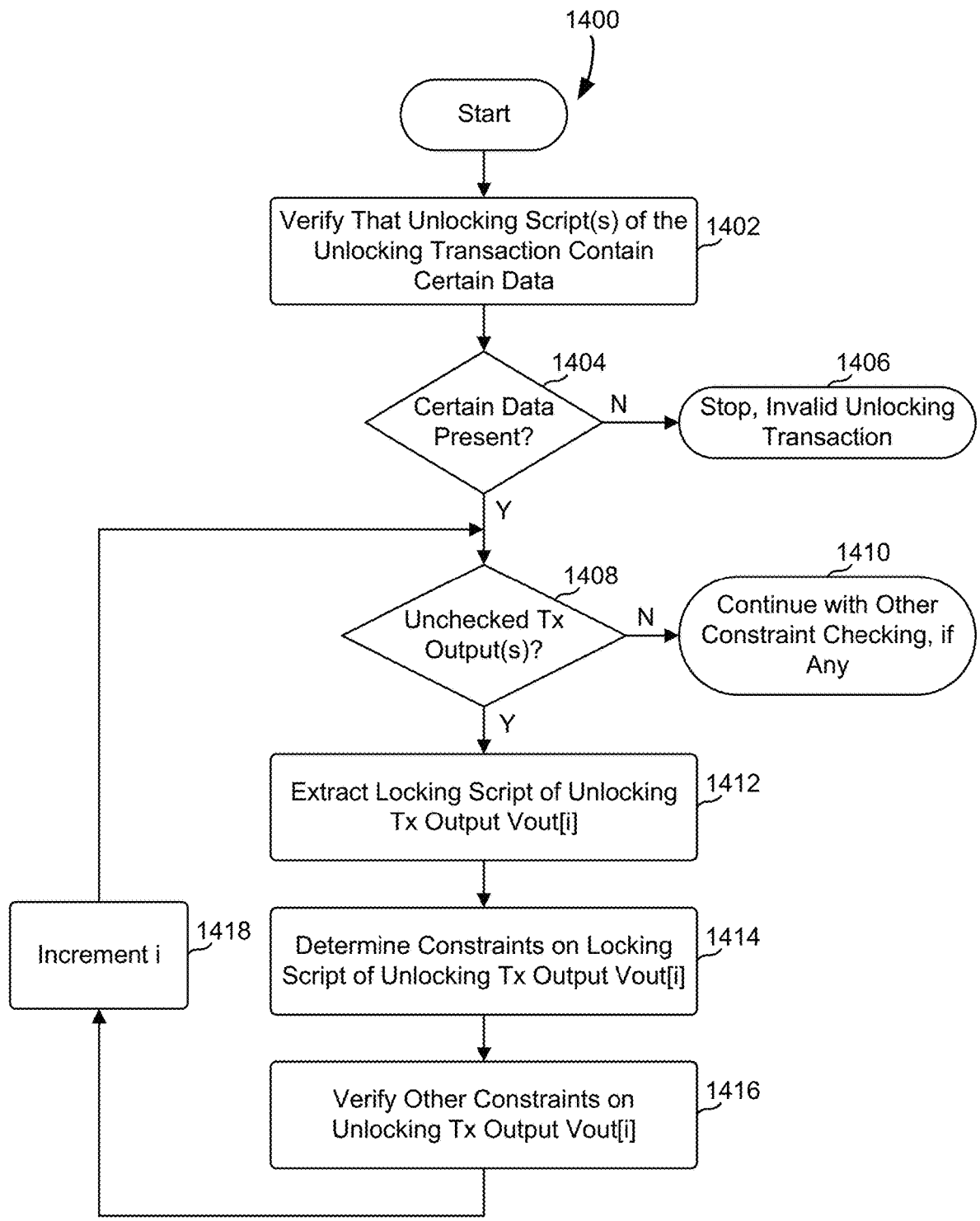
FIG. 14 is a flowchart of an example of a locking script that imposes constraints on the locking scripts of an unlocking transaction.

FIG. 14 is a flowchart of an example of a portion 1400 of a locking script of the previous transaction that imposes constraints on the locking scripts of an unlocking transaction. This example might be executed by a stack-based verifier that processes an unlocking script of an output of the unlocking transaction, which may leave data on the stack, then processes the locking script of the output of the previous transaction to perform this process. Since processing of the unlocking script is able to leave data on the stack, and since the unlocking script is able to leave, for example, serialized contents of the unlocking transaction on the stack, including the particulars of the unlocking transaction's locking scripts, those particulars may be available at verification time.

In step 1402 of the process, the verifier verifies that the unlocking scripts contain certain data, and the verifier might perform other verifications that do not need to be done on an output-by-output basis. Examples of such data might include a serialized set of unlocking transaction fields, a serialized previous transaction, references to earlier transactions, etc. In step 1404, the verifier checks if those constraints were met and if not, stops at step 1406, invalidating the unlocking transaction. Otherwise, processing continues at step 1408, where the verifier determines whether there are any unlocking transaction outputs to check. For the first time through, the verifier might set an index i=0 and when there are no more outputs to check, move to another flow of processing at step 1410.

For each index of an output, the verifier performs steps 1412, 1414, and 1416, then increments I (step 1418) and returns to step 1408 until there are no more indexes to consider. In another variation, instead of incrementing the index by one and verifying each output, the verifier might loop through a set of indexes to check, where the set does not necessarily include all values of i and/or not necessarily include them and verify them in incremental order. In such variations, step 1418 differs accordingly, looping through the indexes i for the outputs in the specific set of indexes being checked.

In step 1412, the verifier extracts a locking script of Vout[i] of the unlocking transaction. This might be implemented using the OP_SUBSTR operation on the stack contents. Next, in step 1414, the verifier determines, based on the locking script of the previous transaction's output, what the constraints are to be on the locking script of Vout[i] of the unlocking transaction. At step 1416, the verifier then verifies those constraints. In this manner, the locking script of an output of a previous transaction that is being transferred by an input of an unlocking transaction can impose constraints on the outputs of that unlocking transaction.

The locking script of an output of a previous transaction constrains an output of an unlocking transaction so as to allow that previous transaction locking script to dictate rules on how the output of the unlocking transaction can be transferred. These constraints can be hardcoded in the locking script of the output of the previous transaction, or the constraints can be determined based on data present in an unlocking script of the input of the unlocking transaction that points to that output of the previous transaction.

Figure 15:
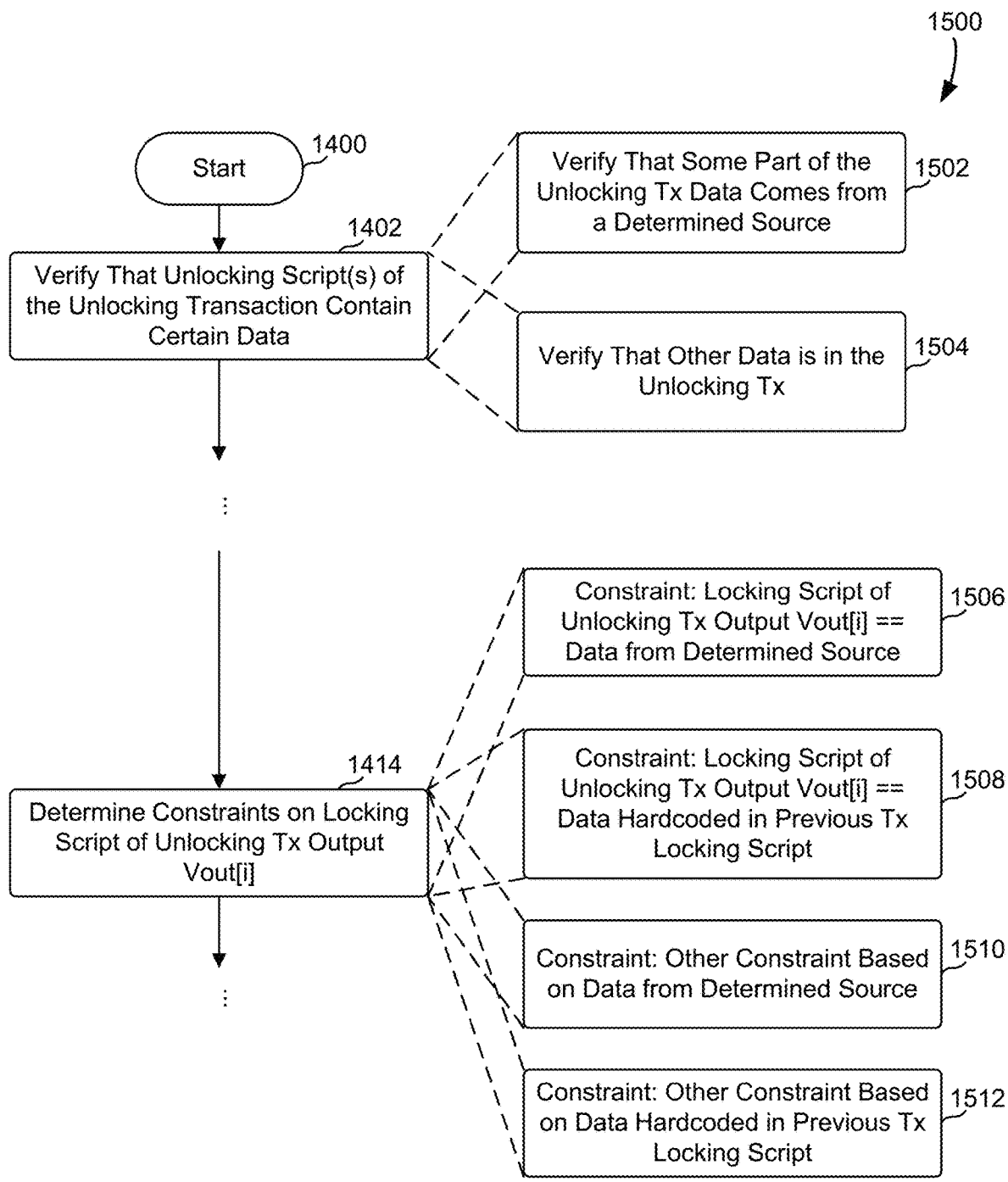
FIG. 15 illustrates some examples of more specific steps corresponding to the steps of FIG. 14.

FIG. 15 illustrates an example 1500 with flowcharts of more specific steps corresponding to the steps 1402 and 1414 of FIG. 14. One example of the verifier performing the step 1402 is performing the step 1502 wherein the verifier determines that some part of the data in the unlocking script (or elsewhere) in the input of the unlocking transaction comes from a determined source. The determined source might be a serialization of the unlocking transaction or a serialized prior transaction. Alternatively, or in addition, the verifier can perform step 1504 and perform some other verification of unlocking transaction data details.

As for the particular constraints that the locking script of the output of the previous transaction can impose on the locking script of an output of the unlocking transaction, there is a step 1506 wherein the locking script of the output Vout[i] of the unlocking transaction must be equal ("==" refers to a test for equality) to data from some determined source. Another example is a step 1508 wherein the locking script of the output Vout[i] of the unlocking transaction must be equal to data that is hardcoded into the locking script of the output of the previous transaction. Step 1510 covers the case where another constraint is imposed on the output Vout[i] of the unlocking transaction based on data from the determined source, and step 1512 covers the case where another constraint is imposed on Vout[i] based on hardcoded data from the locking script of the output of the previous transaction.

In some cases, instead of using the full extent of the data from the source or hardcoded, a hash of the data can be used, in which case the comparing is done from hash to hash.

The data that is to be used can come from the previous transaction, such as from being hardcoded into the locking script of the output of the previous transaction, or it can be data from a preceding transaction of a previous transaction (or a reference to that preceding transaction, two links away from the unlocking transaction (i.e., a transaction that had one or more of its outputs transferred by the previous transaction). In this manner, the data used can come from any transaction in the chain from the previous transaction to its distribution transaction(s) (e.g., Coinbase transaction(s) in the Bitcoin protocol).

Figure 16:
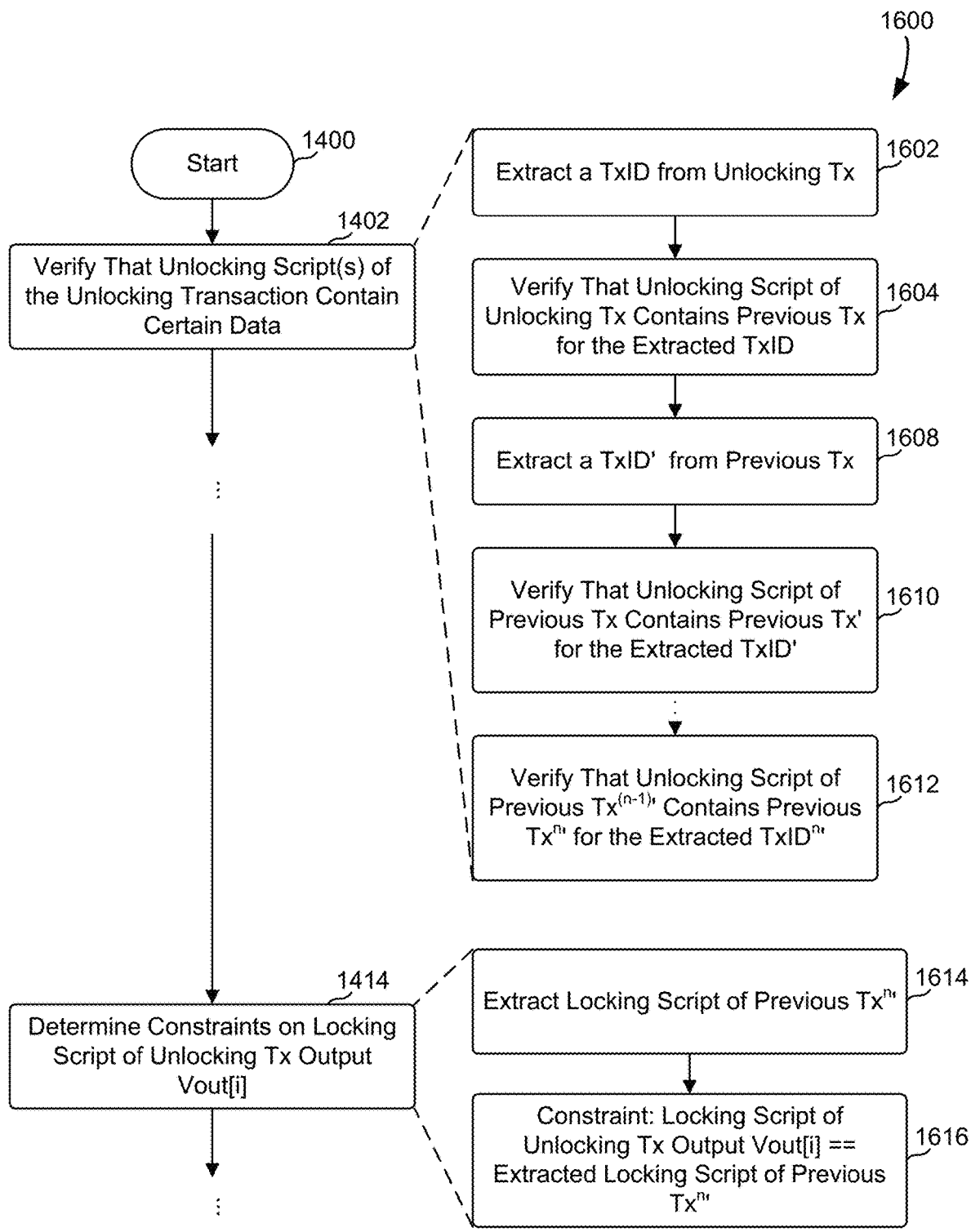
FIG. 16 illustrates an example of verifying unlocking scripts.

FIG. 16 illustrates an example 1600 with flowcharts of more specific steps. For step 1402 in the process 1400 of FIG. 14 (where the verification is that the unlocking script has certain data), steps 1602, 1604, 1608, 1610 and 1612 might be performed to verify that the unlocking script of the unlocking transaction has a reference to a transaction in a chain of transactions.

In step 1602, the verifier extracts a transaction ID (TxID) from an input of the unlocking transaction, which it can do if that is available in an unlocking script. The verifier can then verify at step 1604 that the unlocking script also contains a serialized copy of the previous transaction for that TxID. If not, the verifier can invalidate the transaction, but if yes, then at step 1608, the verifier extracts a TxID from the previous transaction, TxID' and then at step 1610 verify that the previous transaction contains a serialized copy of the transaction referenced by TxID' or a reference thereto. This chain can continue n times, where at step 1612, the verifier verifies that the transaction referenced by TxID$^{(n-1)'}$ (n−1 primes) contains a serialized copy of the transaction referenced by TxID''' (n primes).

In FIG. 16, steps 1614 and 1616 involve extracting the locking script for the copy of the transaction referenced by TxID''' and verifying the constraint that the locking script of the unlocking transaction's output Vout[i] is equal to that extracted locking script of the transaction referenced by TxID'''.

Constraints can be applied to a subset of an output's locking script instead of the whole locking script. Constraints can be determined from a subset of the data instead of the whole data. For example, one subset might require that "Pay-to-Public-Key-Hash" appear, and another subset might require that "Pay to Bob" appear.

Suppose an unlocking transaction's output's locking script can be represented by two parts, <x><y>, where <x> and <y> can be extracted using string splicing operations so that constraints are applied to <x> and <y> individually. An example is where <x> is constrained to be <PubK A> and <y> is constrained to be OP_CHECKSIG. In this manner, the overall locking script is constrained to be <PubK A> OP_CHECKSIG. It may also be possible to use constraints derived from data in the unlocking script.

Using these techniques, a locking script of an output of a previous transaction can impose constraints on an unlocking transaction that attempts to unlock that output. In particular, the constraints can be constraints on the set of outputs that the unlocking transaction has, and the constraints can be different for different outputs and also different than the locking script of the previous transaction.

The constraints can correspond to indexes that refer to the various outputs. In one case, the constraints are repeated for each index, but in other cases, some structure can be provided. For example, the indexes for a constraint can be used in conditional statements to pick a set of constraints, such as "if index==0: constraint A else constraint B".

If the set of indexes is hardcoded, the outcomes of the parts of the script that use the indexes may be fixed. Instead of, or in addition to, constraints on outputs of the unlocking transaction, there can also be constraints on the inputs of the unlocking transaction.

Constraints on Inputs of Injected Unlocking Transactions

One use of having a locking script constraining an input of an unlocking transaction is to allow the locking script to encode a dependency on a transaction with certain properties (e.g., the constrained input must reference that transaction). This is different from constraining an output of the unlocking transaction as an output is mutable, whilst an input may be a reference to a pre-existing immutable UTXO on the blockchain. In other words, an output can be modified to match the constraints, whilst an input must be found that matches those constraints.

Constraints on inputs of unlocking transactions might fall under two general types: (1) a constraint placed directly on the reference of the input (i.e., the transaction TxID field, and optionally the output pointer field), and (2) a constraint on the fields of the previous transaction pointed to by the reference in the input.

Figure 17:
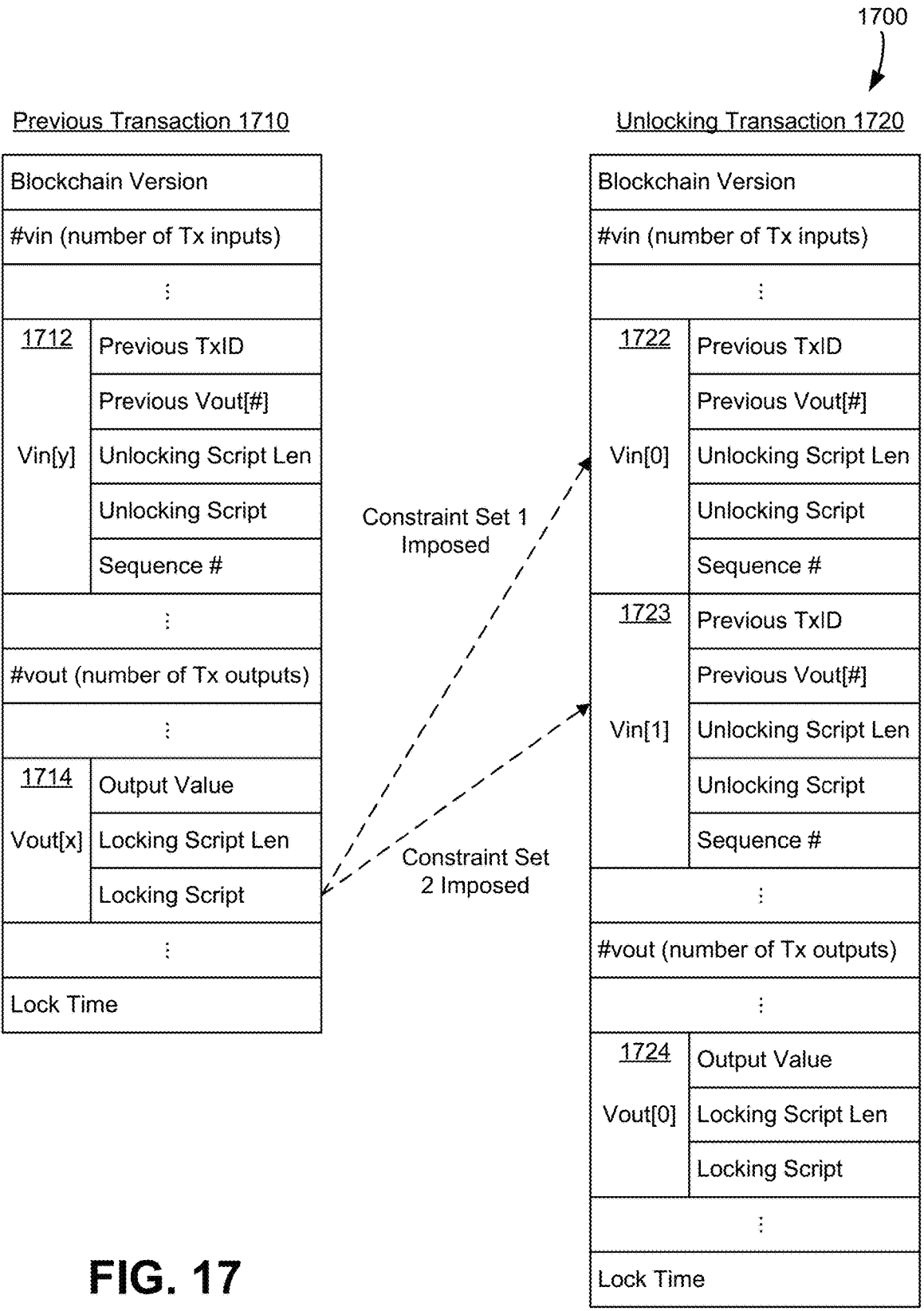
FIG. 17 illustrates an example of locking scripts imposing sets of constraints on inputs.

FIG. 17 illustrates an example 1700 including a previous transaction 1710 and an unlocking transaction 1720, where the previous transaction 1710 has an input Vin[y] 1712 and an output Vout[x] 1714 and the unlocking transaction 1720 has inputs Vin[0] 1722 and Vin[1] 1723, and an output Vout[0] 1724. The locking script of Vout[x] 1714 imposes a set of constraints (Constraint Set 1) on input Vin[0] 1722 and a set of constraints (Constraint Set 2) on input Vin[0] 1723. The constraint sets might include constraints on the unlocking script, on the references, or other parts of the inputs. The constraint sets could be the same or different, or where there are more than two inputs, some the same and some different.

In part, these constraints can reference parts of the unlocking transaction such as by using the OP_SPENDINGTXINJECTION script to have a serialized set of unlocking transaction fields injected as data into the unlocking script.

Figure 18:
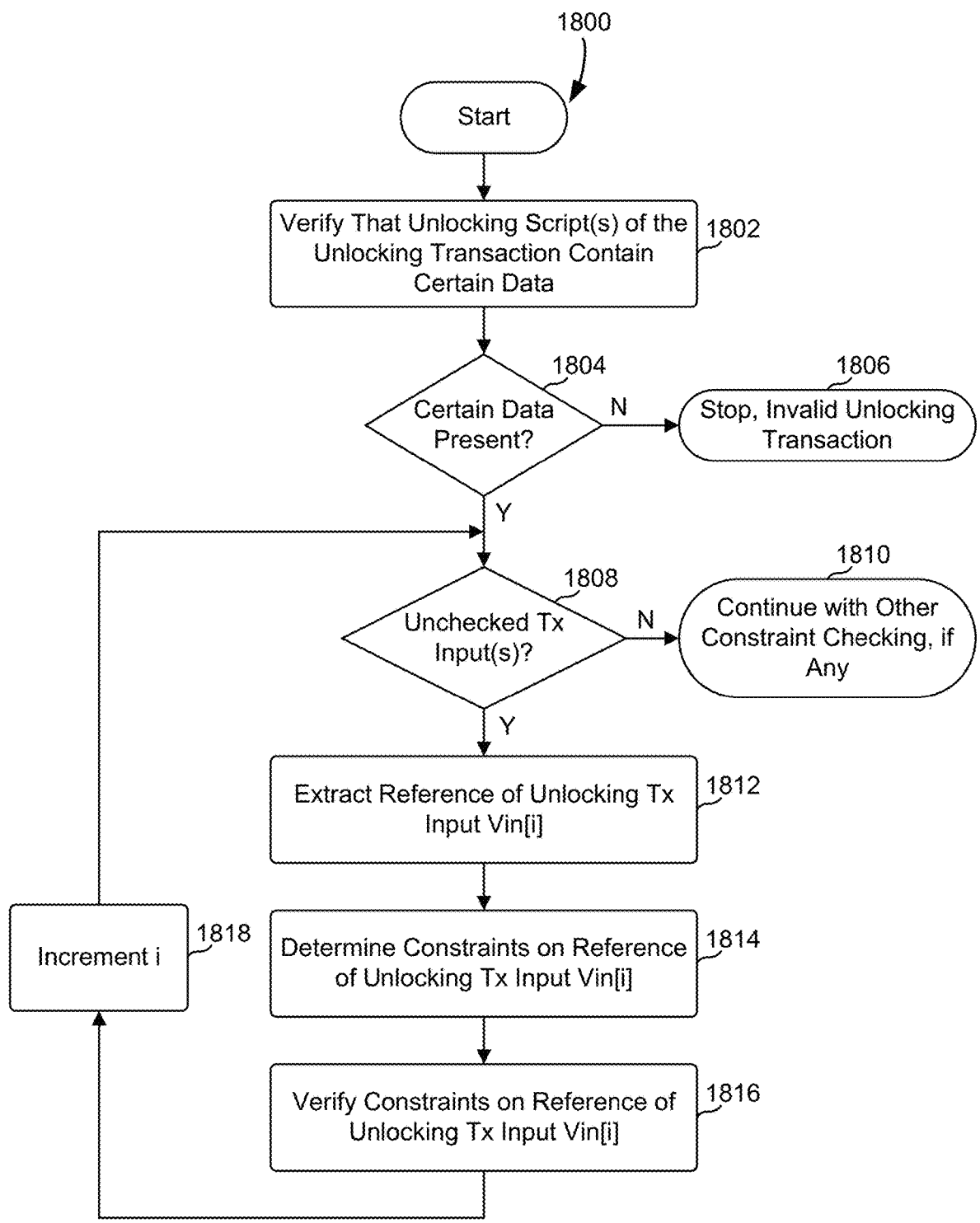
FIG. 18 is a flowchart of an example of a locking script that imposes constraints on the inputs of an unlocking transaction.

FIG. 18 is a flowchart of an example of a portion 1800 of a locking script of the previous transaction that imposes constraints on the inputs of an unlocking transaction. This example might be executed by a verifier that processes an unlocking script of an output of the unlocking transaction, which may leave data on the stack, including details of the unlocking transaction, and then processes the locking script of the output of the previous transaction to perform this process.

In step 1802 of the process, the verifier verifies that the unlocking scripts contain certain data, and the verifier might perform other verifications that do not need to be done on an output-by-output basis. In step 1804, the verifier checks if those constraints were met and if not, stops at step 1806, invalidating the unlocking transaction. Otherwise, processing continues at step 1808, where the verifier determines whether there are any unlocking transaction inputs to check. For the first time through, the verifier might set an index i=0 and when there are no more inputs to check, move to another flow of processing at step 1810.

For each index of an input, the verifier performs steps 1812, 1814, and 1816, then increments i (step 1818) and returns to step 1808 until there are no more indexes to consider (or the verifier loops through a set of indexes to check, not necessarily all of them and/or not necessarily in incremental order; in those cases, step 1818 differs accordingly, looping through the indexes i for the inputs being checked). In step 1812, the verifier extracts, from the unlocking transaction, input Vin[i], its reference to the previous transaction, and the output it unlocks. This might be implemented using the OP_SUBSTR operation on the stack contents. Next, in step 1814, the verifier determines, based on the locking script of the previous transaction's output, what the constraints are to be on the reference or use that reference to cause the injection of the previous transaction, after which constraints can be applied to the fields of the previous transaction. At step 1816, the verifier then verifies those constraints. In this manner, the locking script of an output of a previous transaction that is being transferred by an input of an unlocking transaction can impose constraints on the inputs of that unlocking transaction.

Figure 19:
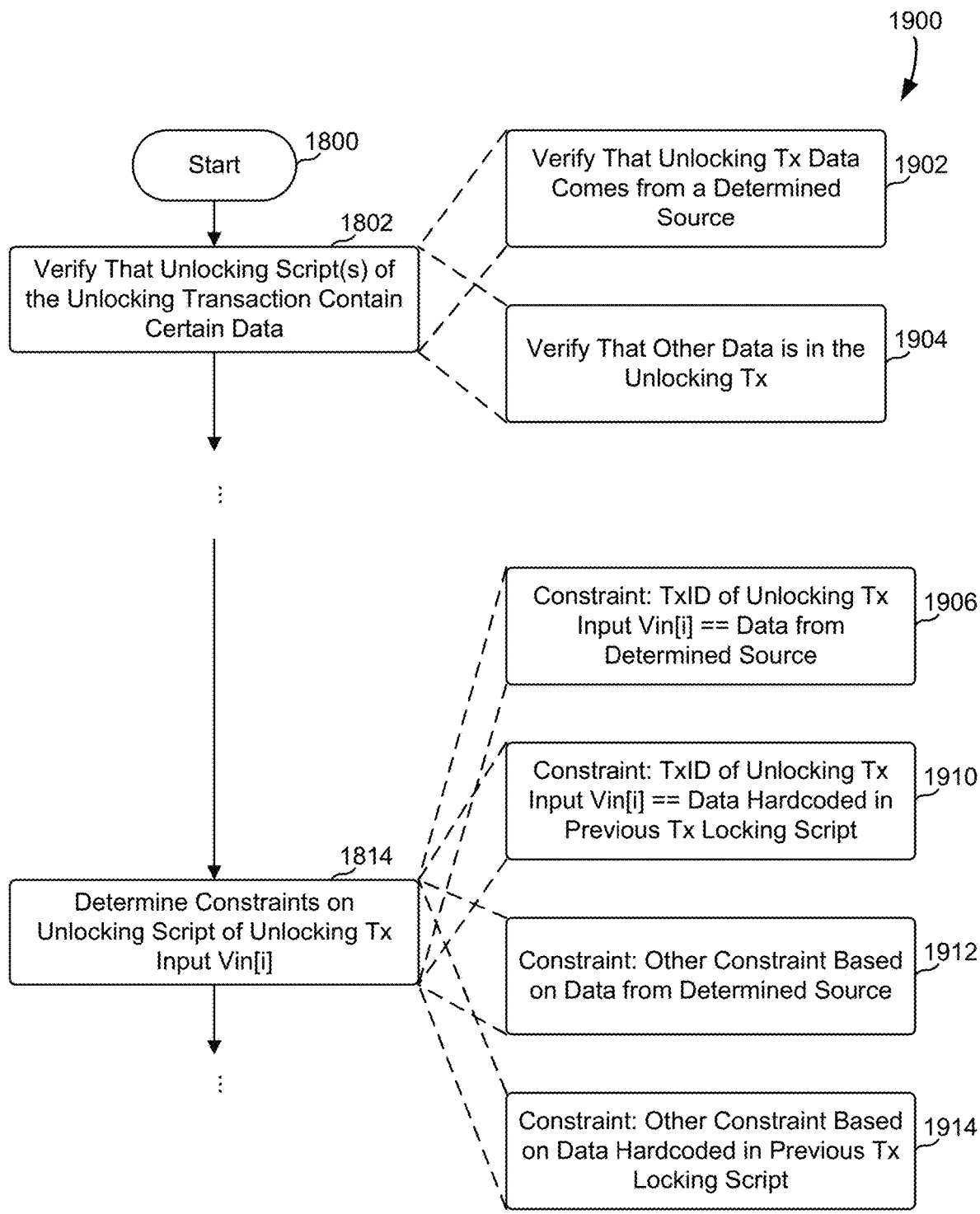
FIG. 19 illustrates examples of input constraints.

Other examples 1900 of input constraints are shown in FIG. 19, by elements 1902, 1904, 1906, 1910, 1912, and 1914. Since the TxID may be a one-to-one mapping with a transaction, it means the constraint may be that a specific transaction must be referenced in the input. The transaction the locking script is dependent on may be created first, thereby allowing the locking script to use its own TxID in a constraint on an input of the unlocking transaction.

A constraint can be placed on the fields of the previous transaction corresponding to the reference in the input. This may be possible by using the TxID in the input to cause the injection of the corresponding previous transaction, before placing constraints on the fields of the previous transaction. A constraint could refer to a different input than the input that is unlocking the output of the previous transaction that has the locking script that is imposing the constraint.

Figure 20:
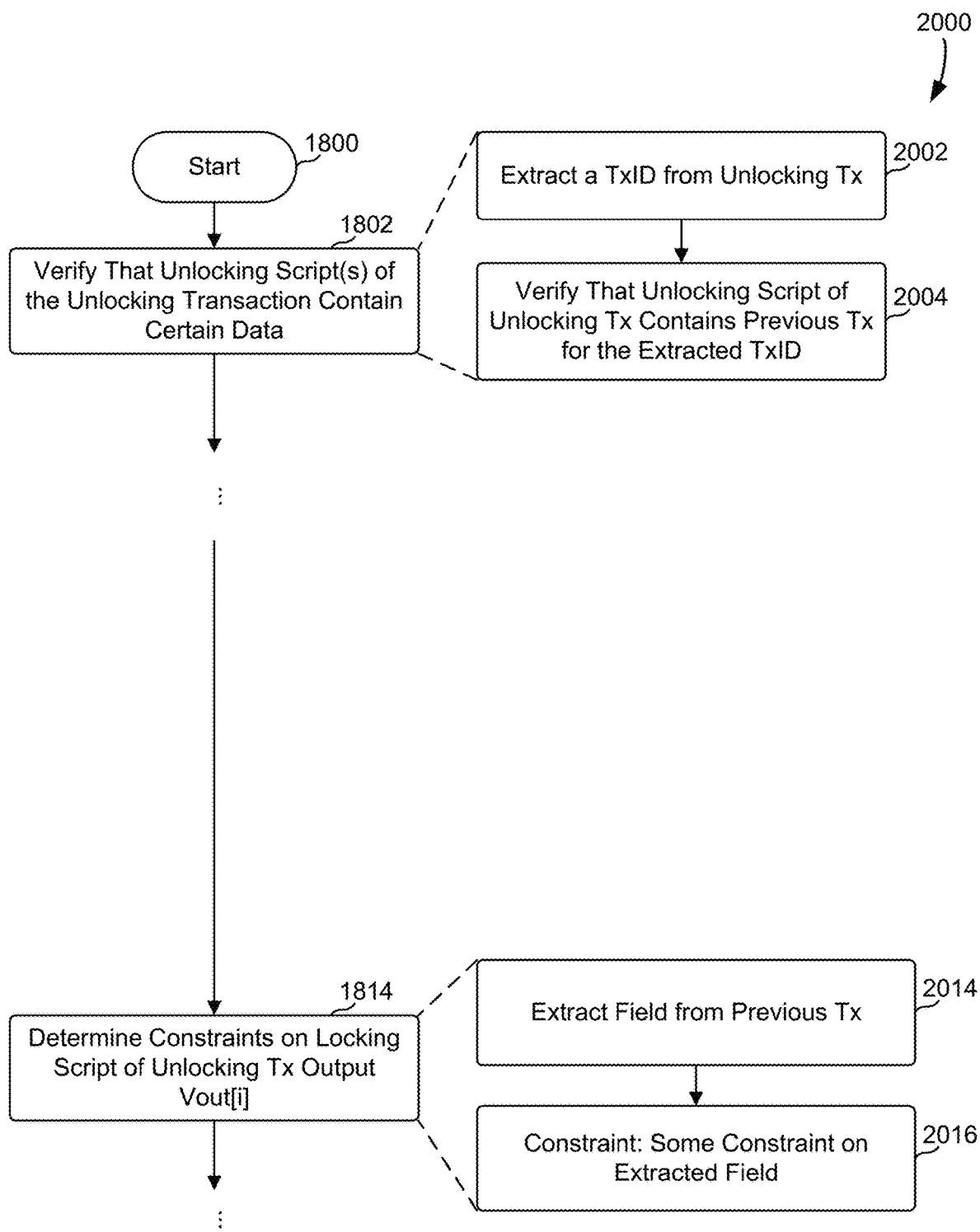
FIG. 20 illustrates examples of constraints in the context of the process shown in FIG. 18.

FIG. 20 illustrates examples 2000 of constraints, in the context of steps 1802 and 1814 in the process 1800 of FIG. 18. In FIG. 20, steps 2002, 2004, 2014 and 2016 might be performed. In step 2002, the verifier extracts a transaction ID (TxID) from an input of the unlocking transaction, which it can do if that is available in an unlocking script. The verifier can then verify at step 2004 that the unlocking script also contains a serialized copy of the previous transaction for that TxID. In step 1614, the verifier extracts a set of one or more fields from the previous transaction and in step 1616 verifies some constraint on that set of extracted fields.

Figure 21:
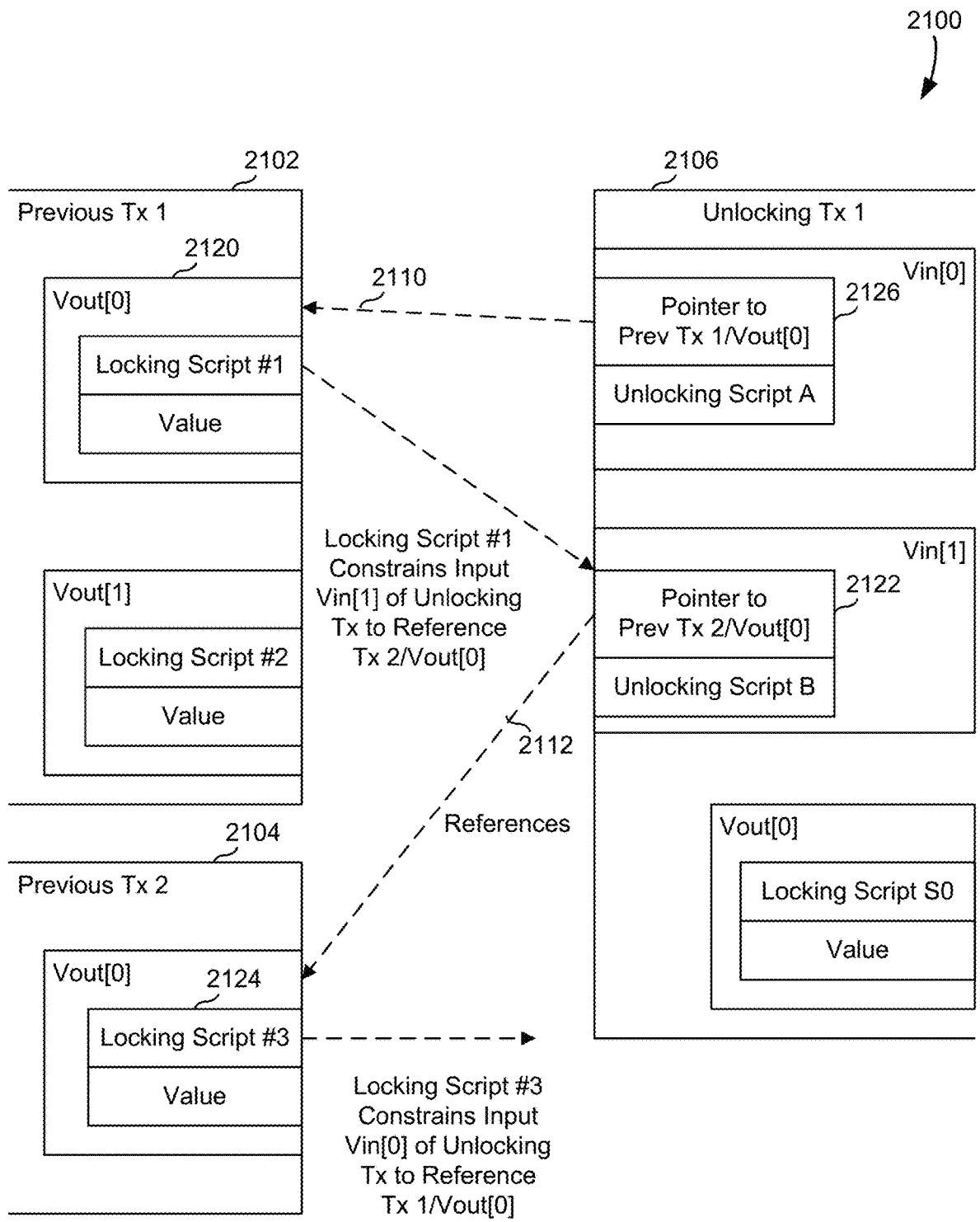
FIG. 21 illustrates interlocking script constraints.

FIG. 21 illustrates an example 2100 of interlocking script constraints. As illustrated there, a previous transaction (Previous Tx 1) 2102 and a previous transaction 2104 (Previous Tx 2) may be referenced by inputs of an unlocking transaction (Unlocking Tx 1) 2106. In particular, input Vin[0] of Unlocking Tx 1 points to Vout[0] of Previous Tx 1, as indicated by arrow 2110. Thus, if Unlocking Tx 1 is valid, it may unlock Vout[0] of Previous Tx 1. Also, input Vin[1] of Unlocking Tx 1 points to Vout[0] of Previous Tx 2, as indicated by arrow 2112. Such references might be conventional references for an unlocking transaction with multiple inputs that reference multiple previous transactions.

In order to reference previous transactions, those transactions should already exist and be immutable prior to the creation of the unlocking transaction. Nonetheless, the previous transactions can apply interdependent locking script constraints on the unlocking transaction. By placing constraints upon a set of inputs of an unlocking transaction, interdependent locking scripts can be implemented, which can provide for—among other things—concurrency in the context of a trustless deterministic state machine.

A locking script 2120 of output Vout[0] of Previous Tx 1 has a constraint on input Vin[1] of Unlocking Tx 1 that requires that the input's pointer 2122 (e.g., its reference to a previous transaction and an output of that previous transaction) be a reference to Previous Tx 2 and Vout[0] of Previous Tx 2. A locking script 2124 of output Vout[0] of Previous Tx 2 has a constraint on input Vin[0] of Unlocking Tx 1 that requires that the input's pointer 2126 (e.g., its reference to a previous transaction and an output of that previous transaction) be a reference to Previous Tx 1 and Vout[0] of Previous Tx 1.

Since the TxID of a transaction is not known until the transaction is finalized, a transaction locking script cannot directly specify what TxID the unlocking transaction unlocking script must refer to, but this can essentially be effected by the locking script extracting the input's pointer (which includes the TxID of the previous transaction having the locking script), use that TxID to inject the fields of the previous transaction and verify that some field of the previous transaction is equal to a value that it is supposed to be. In other words, if the previous transaction has a field that is set to a certain value and the locking script of that previous transaction obtains a TxID from a unlocking transaction input, injects whatever transaction is referenced by that TxID, checks for that field to be set to a certain value and that field is not set to that certain value, then it must be the case that the unlocking transaction input is pointing to a different previous transaction. So, by checking for that certain value, the locking script of a previous transaction output can ascertain whether the unlocking transaction input refers to that previous transaction output or not.

In this manner, Previous Tx 1 is stating that its first output can only be transferred by a transaction that also unlocks the first output of a particular transaction (Previous Tx 2), and Previous Tx 2 is stating that its first output can only be transferred by a transaction that also unlocks the first output of Previous Tx 1.

Interdependent locking scripts allow for, among other things, multiple smart contracts that place conditions on each other. For example, Smart Contract 1 might be "Alice agrees to contribute 1BTC to Carol, but only if Bob contributes 2BTC to Carol" and Smart Contract 2 might be "Bob agrees to contribute 2BTC to Carol only if Alice agrees to contribute 1BTC to Carol". In order to be valid, the unlocking transaction has to unlock both smart contracts.

As described above, a locking script can encode a dependency into a transaction with certain properties and those properties can include fields of that transaction. This means that it may be possible to have a locking script be dependent on a transaction with a certain locking script.

For example, in the illustration of FIG. 21, locking script #1 (of Vout[0] of Previous Tx 1) constrains Vin[1] of Unlocking Tx 1 to be referencing locking script 2124 (of Vout[0] of Previous Tx 2) and locking script #3 2124 constrains Vout[0] of Unlocking Tx 1) to be referencing locking script #1 of Vout[0] of Previous Tx 1. Herein, this may be referred to as a locking script encoding dependency on another locking script.

Implementing interdependent locking scripts might create a causality race condition, wherein a first locking script encodes dependency on a second locking script and the second locking script encodes dependency on the first locking script, since it may be that one of Previous Tx 1 and Previous Tx 2 exists before the other. If a locking script A hardcodes a dependency onto a locking script B, locking script B must already be known and fixed, making it impossible for locking script B to have hardcoded a dependency on locking script A that is not yet known. This can be dealt with by having a determinable dependency, at least in one of the locking scripts.

As an example, a locking script A is dependent on a locking script X and locking script X is to be provided in an unlocking script A and a locking script B is dependent on a locking script Y that is to be provided in an unlocking script B. When an unlocking transaction is created, both locking script A and locking script B would be already known, thereby making it possible for unlocking script A of the unlocking transaction to contain the locking script B as its data, and for unlocking script B of the unlocking transaction to contain the locking script A as its data.

In some variations, for the unlocking transaction input to validate, its unlocking script must have references to Previous Tx 1 and Previous Tx 2. In other variations, it is sufficient that the unlocking script has references to any two (or more) previous transactions that have the same locking script as Previous Tx 1.

In some variations, instead of imposing a requirement that an unlocking script reference a particular previous transaction or a set of multiple previous transactions, the requirement might be exclusionary, in that the requirement may be that the unlocking script not reference a particular previous transaction or a set of multiple previous transactions. A combination of these variations may also be possible, effectively implementing Boolean logic on what previous transactions are referenced. For example, the requirement might be that, for the unlocking transaction input to validate, its unlocking script must have references to Previous Tx 1 and Previous Tx 2, not have a reference to Previous Tx A, and must have a reference either to Previous Tx B or to Previous Tx C. Other logical expressions may also be possible.

State Machines

Using the above techniques, state machines can be implemented using blockchain transactions, wherein transactions have state and are encoded with the state machine structure, such as by a transition matrix and allowed next states. An unlocking transaction can unlock an output of such a blockchain transaction, in effect causing a state transition of the state machine.

Figure 22:
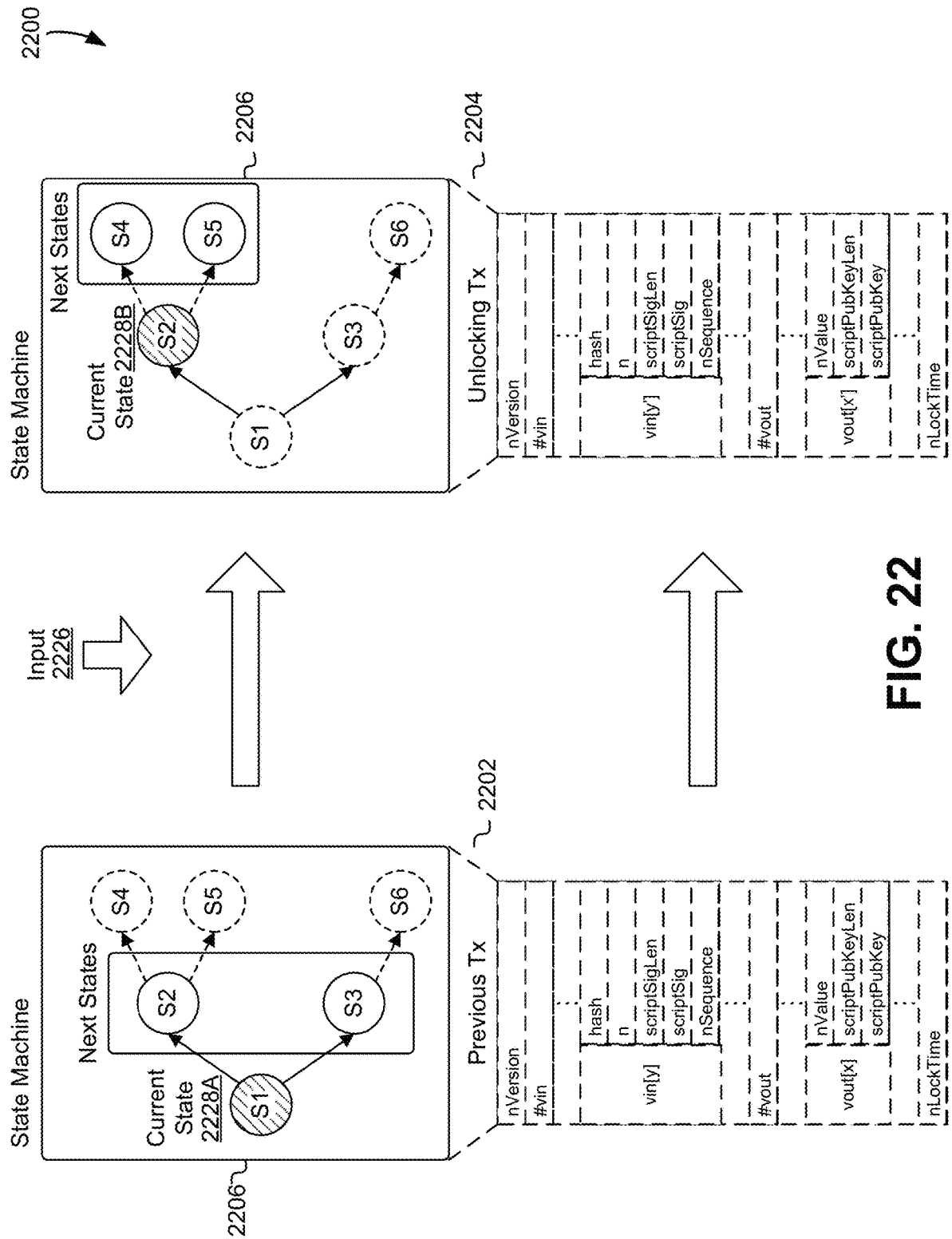
FIG. 22 illustrates an example of a state machine implemented using blockchain transactions.

FIG. 22 illustrates an example 2200 of a state machine implemented using blockchain transactions. Specifically, FIG. 22 depicts a state machine transitioning from a first state to a second state using blockchain transactions. In some examples, a state transition of a state machine is explained as determining a next state given (1) a current state, (2) one or more inputs 2226, and (3) a set of state rules 2206. The example 2200 of FIG. 22 illustrates a previous transaction 2202 with a set of state rules 2206 and a first state 2228A embedded in a parameter. In some embodiments, an unlocking transaction 2204 is created to accept input 2226 from a determined source. The input 2226, in combination with the first state 2228A, may be usable to determine, with reference to the set of state rules 2206, a second state 2228B embedded in a parameter of the unlocking transaction 2204.

In embodiments, the set of state rules 2206 includes a state-transaction matrix that can be represented by a constraint on the unlocking transaction 2204 imposed by a locking script. In such embodiments, the constraint might be parameterised by the current state and the input from which the next state is determined. The constraint can include checks to ensure that the unlocking transaction 2204 includes an output that includes the next state value in a particular field.

In embodiments, the current state is represented as a parameter embedded in a transaction, such as in part of a locking script of an output of that transaction, and the unlocking transaction 2204 may have the next state value also embedded in the unlocking transaction 2204. The next state value may be the current state relative to a set of field values of the unlocking transaction 2204, which as noted above, may be accessible when the unlocking transaction 2204 is created.

In some embodiments, at least one input is provided as external data in a parameter that is determined at the time the unlocking transaction 2204 is created. In order to be secure, such parameters come from a determined source. This can provide a deterministic state transition. Finally, by employing the scripts of a self-replicating locking script, an embodiment of a trustless, deterministic state machine can be created. By further allowing for different locking scripts to be imposed on different transaction inputs and outputs of a transaction, a concurrent trustless, deterministic state machine can be implemented.

Figure 23:
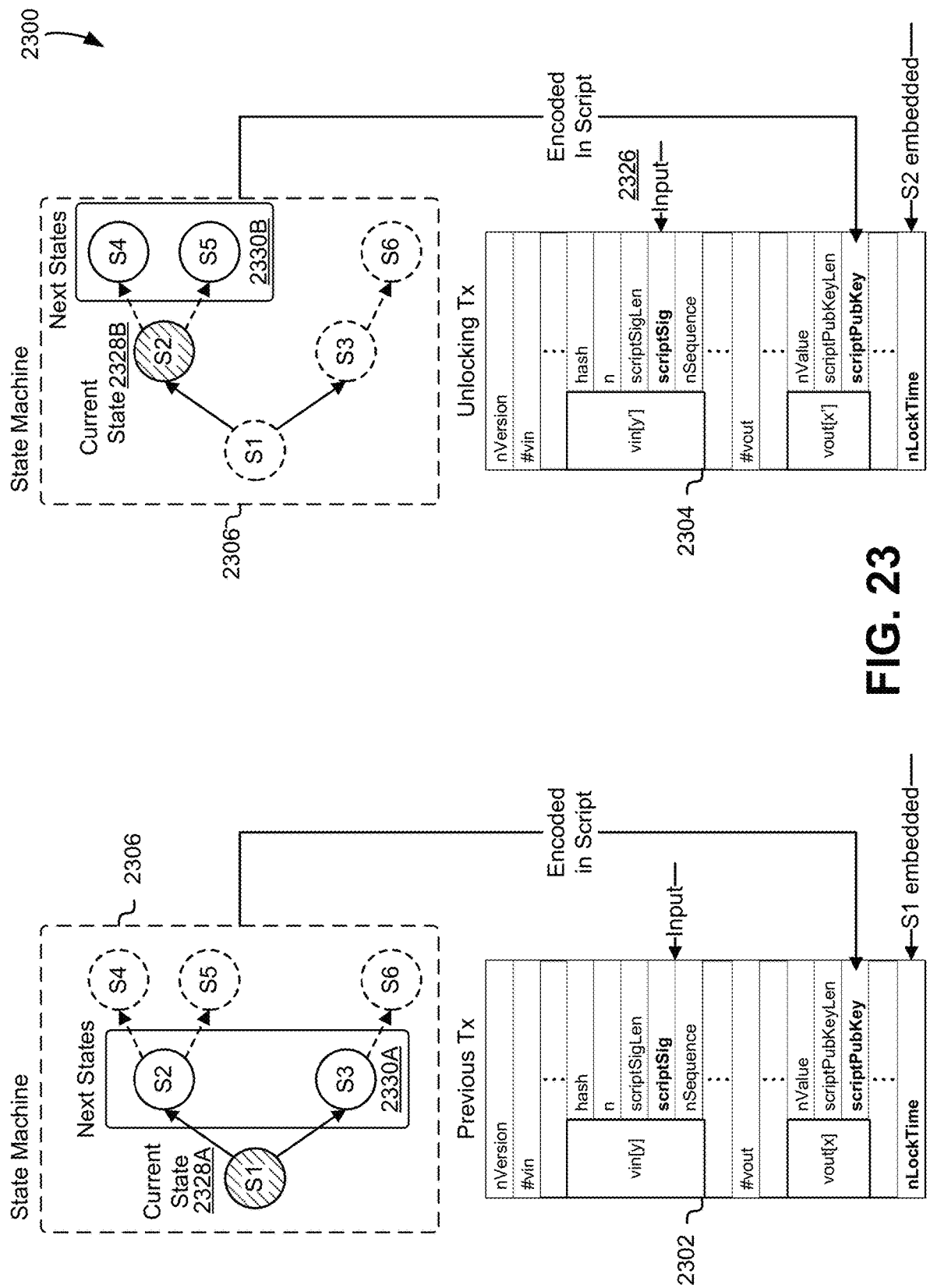
FIG. 23 illustrates an example of how state machine logic might be encoded in blockchain transactions.

FIG. 23 illustrates this point. In the example, a trustless deterministic state machine system 2300 may include a previous transaction 2302 at a first state 2328A ("S1") in a set of state rules 2306. The set of state rules 2306 offers two possible states 2330A ("S2" or "S3") for a next state. The set of state rules 2306 may be encoded in a locking script of an output of the previous transaction 2302. The current state 2328A might be embedded in a lock time field, or can be embedded in the locking script. The next state, S2 2328B in this example, is encoded in the locking script of an output of the unlocking transaction that unlocks the output of the previous transaction to effect a state transition.

As can be seen in the example 2300, an unlocking transaction 2304, taking, as input, the input 2326 in its unlocking script and the first state 2328A ("S1") embedded in the set of field values of the previous transaction 2302, determines the appropriate second state 2328B ("S2") from the set of state rules 2306. As further can be seen in the example 2300, the states-transition matrix now provides new states 2330B ("S4" or "S5") that are possible for a next state transition from the second state 2328B. Note that the set of state rules 2306 may be coded as a switch statement or other conditional statement (e.g., "if-then-else") parameterised by the current state and one or more inputs. The current state, S2 2328B, might be embedded in a lock time field, or can be embedded in the locking script. The next state, S2 2328B in this example, is encoded in the locking script of an output of the unlocking transaction that unlocks the output of the previous transaction to effect a state transition.

In embodiments, each possible state is represented in a set of rules for state changes, such as a state-transition matrix, in the self-replicating locking script, and a particular transaction output represents the state machine in a particular state. In such embodiments, the locking script of a transaction output is duplicated to every unlocking transaction that attempts to transfer control of the digital asset to a next transaction, which must be linked to the current transaction output. This process may replicate until the termination condition is fulfilled. Because the inputs are not fixed and can be undetermined data, the state of the state machine can be made to change based on the particular external inputs. Thus, the undetermined data provides the input that can affect the next state.

In an illustrative example, Alice loans Bob some money and Bob agrees to pay Alice back. A trustless, deterministic state machine, as described in the present disclosure, can be implemented as a smart contract to represent the payments that Bob makes to Alice. For example, the smart contract could be constructed such that Bob makes a payment to Alice every month for the next three months, and, if a payment is missed, Bob's debt goes into debt collection phase. Thus, as long as Bob makes his monthly payment, the current state remains in repayment state. However, if an external entity provides input that indicates that Bob has missed a payment, then the state branches to missed payment state. In the missed payment state, Alice can release the transaction and turn it over to a debt collector, whereupon the trustless deterministic state machine switches to a debt collection state. In the debt collection state, the debt collector will collect the debt from Bob. Such a smart contract can be created using variations on the scripts described herein.

In another example, Alice is a very charitable person who is giving away 1 unit of a digital asset every month. Her rules may be that anyone can claim the digital asset, but only 1 unit can be claimed per month. Alice creates a smart contract in the manner described in the present disclosure and seeds it with an initial pool of 3 units of the digital asset. Alice can construct a script that allows any entity to take 1 unit of the digital asset per month. The remaining portion of the digital asset is replicated to the succeeding smart contract.

FIG. 24 illustrates the unlocking script and locking script for an example trustless deterministic state machine script 2400 of the present disclosure.

Figure 25:
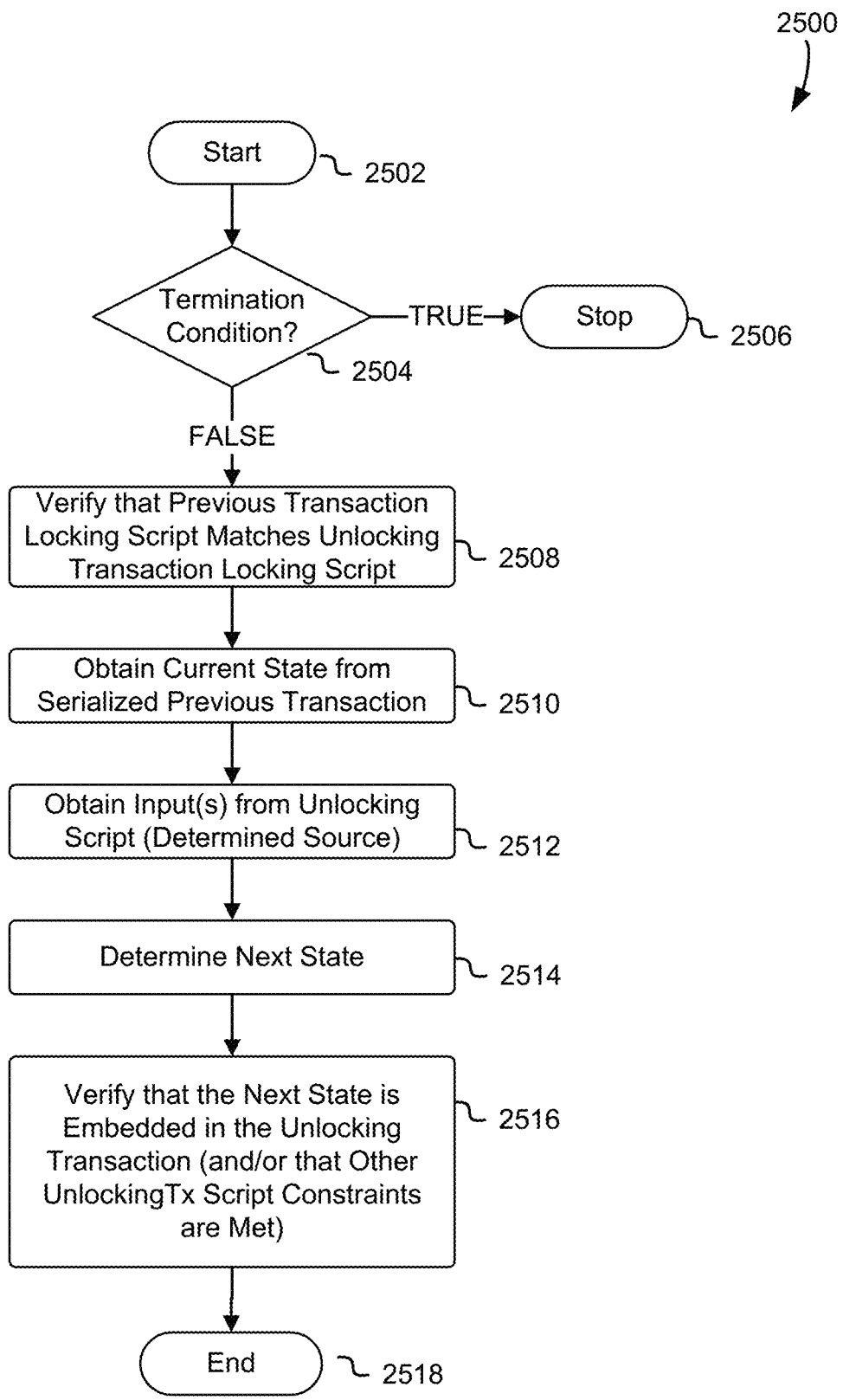
FIG. 25 is a flowchart illustrating an example of a process for a trustless, deterministic state machine in accordance with various embodiments.

FIG. 25 is a flowchart illustrating an example of a process 2500 for a trustless, deterministic state machine in accordance with various embodiments. An example script that implements this is that of FIG. 24. Some or all of the process 2500 (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory, computer-readable storage medium (e.g., a computer program persistently stored on magnetic, optical, or flash media). These instructions might be executed as part of a blockchain transaction verification process.

For example, some or all of process 2500 can be performed by a validation node in an example blockchain network, such as the example blockchain network 100 of FIG. 1. Such a validation node may comprise any suitable computing device (e.g., by a server in a data centre, by a client computing device, by multiple computing devices in a distributed system of a computing resource service provider, or by any suitable electronic client device). The process 2500 includes a series of operations wherein locking scripts of a self-replicating smart contract are verified, a current state may be obtained from a serialized previous transaction, inputs may be obtained from an unlocking script, and a next state may be determined based at least in part on a set of state rules.

In step 2502, the system receives an unlocking transaction. The system begins by running the unlocking script of an unlocking transaction input, which causes the serialized previous transaction and inputs embedded in the locking script to be placed in the stack. These inputs may be retrieved in 2512. In 2504, system performing the process 2500 determines whether a termination condition is fulfilled. In embodiments, the termination condition is a condition, which, upon fulfilment, causes the state-machine transitions to end. If the termination condition is fulfilled, the system performing the process 2500 proceeds to 2506, whereupon the trustless, deterministic state machine ceases self-replication and/or propagation of state.

In step 2508, the system verifies that the previous transaction output locking script matches an unlocking transaction output locking script. If the locking scripts are not a match, validation fails, and the unlocking transaction may not be validated. Otherwise, if the locking scripts match, in 2510 the system extracts the current state of a set of possible states from the serialized previous transaction. In 2512, the system obtains the input or inputs placed on the stack as a result of execution of the locking script. Then, in 2514, the system applies the set of state rules to determine, based on the current state and the input or inputs, the next state of the set of possible states for the trustless, deterministic state machine. In 2516, the system may verify that the next state (e.g., a state variable and other state-related data, if applicable) is embedded in the unlocking transaction. The system may also apply any remaining constraints, as specified in the locking script. After successful completion of the operations of 2502 through 2516, the process ends with 2518, whereupon the unlocking transaction can be considered valid by the system performing the process. Note that one or more of the operations performed in steps 2502 through 2518 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

State Machines as Blockchain Transactions

Using the techniques and apparatus described above, state machines can be implemented using blockchain transactions. State machines might be operated by having a state that changes from state to state along a state transition matrix. Some state diagrams can be quite complex and have multiple paths. In such cases, some of the computation that the state machine performs can be done concurrently with other computations. As will be explained herein, a state machine can operate using blockchain transactions and do so, in part, concurrently.

As will be explained in more detail, a trustless deterministic state machine might be implemented using locking scripts and unlocking scripts of blockchain transactions. A locking script contains constraints that may be imposed on an unlocking script and can thus require injection of certain data into a unlocking transaction input's unlocking script, such as serialized fields of the unlocking transaction itself, serialized fields of the previous transaction that contains the locking script being executed, a current state value, input from a determined source (optional), and a state transition matrix defining the set of flow conditions and operations of the state machine and specifies how to calculate a next state from the current state and other inputs. One locking script constraint on an unlocking transaction may be that the unlocking transaction must duplicate the locking script in one of its outputs, thus propagating the state machine.

Figure 26:
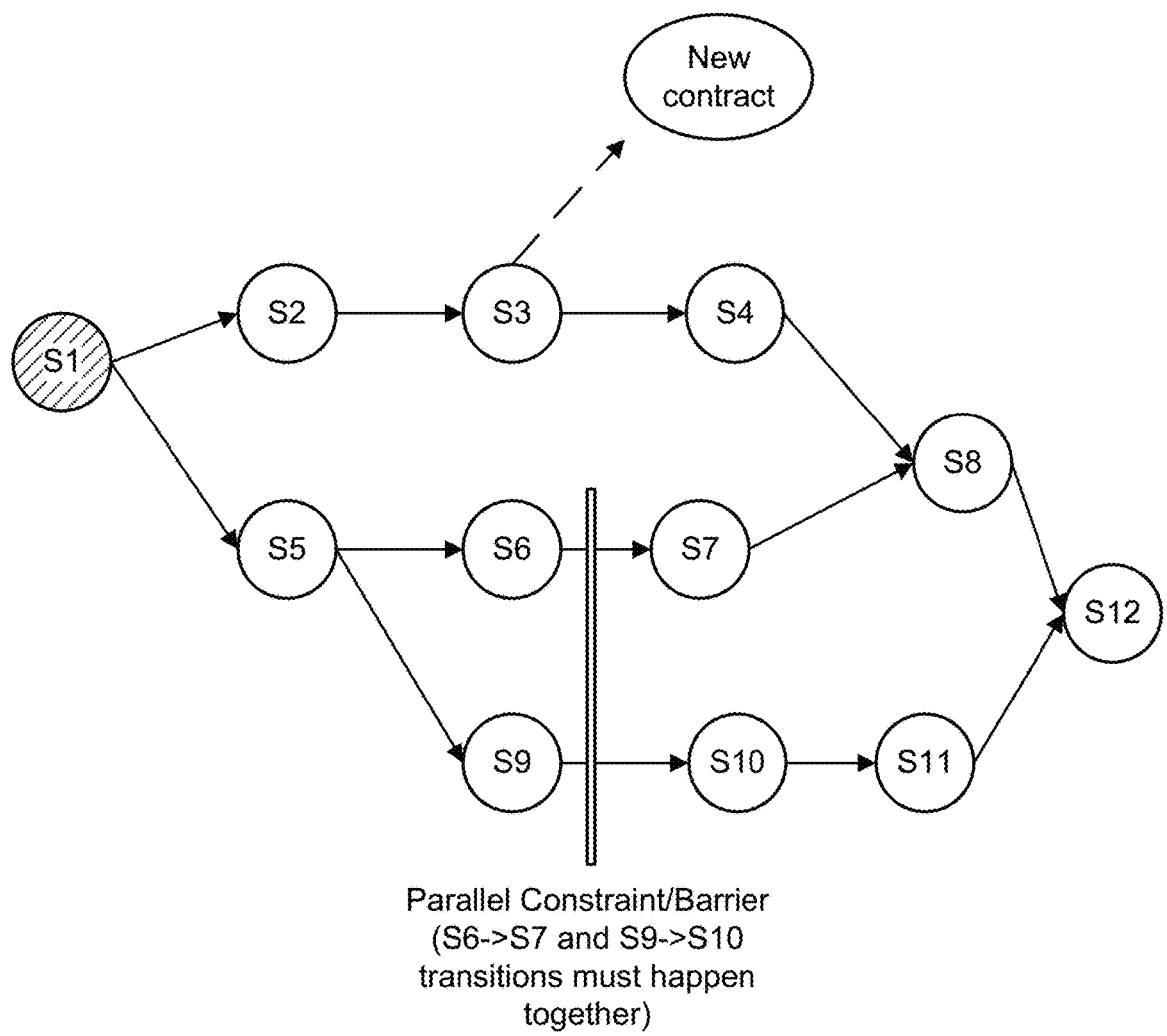
FIG. 26 illustrates a state machine that uses a state transition matrix that has certain features.

FIG. 26 illustrates a state machine that uses a state transition matrix 2600 that has certain features. The state S1 is highlighted to indicate a current state. The state machine can transition to any state along a state transition, which is indicated by arrows. In that state transition matrix, there may be possible transitions along S1-S2-S3-S4-S8-S12, but also the transition from state S1 might also need to be in state S5. Similarly, state S5 transitions to S6 and S9. The transition from state S9 to state S10 may be conditional, or have a barrier, in that the state transition may not occur until there is a transition from state S6 to state S7 that occurs at the same time. The transition to state S8 might occur as a merger from state S4 and state S7.

Each of these states might be entered by a state machine represented by blockchain transaction outputs and each transition handled by a single path of transaction outputs, with a state transition occurring, such as shown in FIG. 22 or FIG. 23, when an unlocking transaction input unlocks a previous transaction output. However, using the inputs and outputs of blockchain transactions, concurrent processing of states can be achieved. This might be useful where a smart contract needs to be executed in multiple concurrent steps. Over the course of a contract, tasks can sometimes be carried out concurrently in the course of contracting. For example, a contract to build a house might have various stages of completion for tile work and various stages of completion for landscaping, which might be doable in parallel. By allowing concurrency within a smart contract, different fragments of the contact can be executed independently of each other, in an asynchronous way.

FIG. 26 illustrates a number of needs for such processing. One is the creation of multiple paths from one state. This might be the forking of a smart contract. Suppose a smart contract begins in state S1. A forking of that smart contract might create two state machines, one in state S2 and one in state S5. Another need might be for a cloning of a smart contract, to have two identical state machines, each in the same state, running in parallel. For example, a smart contract might call for multiple instances of the steps of S2-S3-S4. This might also be the cloning of a smart contract, which is a special case of forking, with the two or more new transaction outputs having the same state.

Another useful feature is the spawning of a new contract. For example, a smart contract represented by the state transition matrix 2600 of FIG. 26 might be such that at state S3, some party to the smart contract is to create a separate contract that may be tied to the smart contract but may not be part of the smart contract and/or may be created after the smart contract is created. This may be referred to herein as spawning. The new contract can be different than an original smart contract that provided for the state transition diagram of FIG. 26 initially.

Merging is where two state machines or two smart contracts merge, as might be the case with states S4 and S7. As will be explained, different paths can be executed concurrently, such as S2-S3-S4 and S5-S6-S7. Using these elements, concurrent trustless deterministic state machines can be easily implemented in a blockchain environment.

Figure 27:
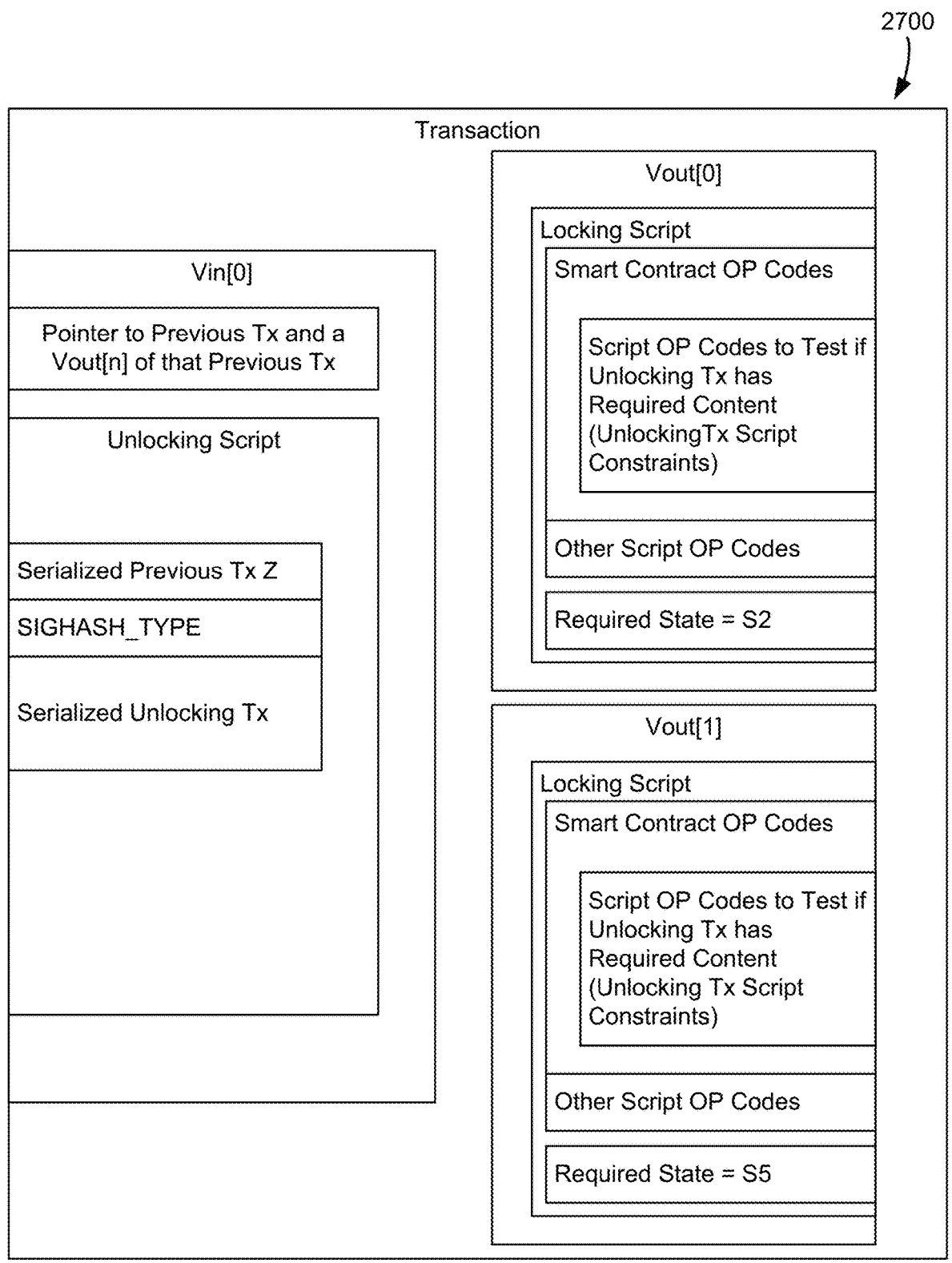
FIG. 27 illustrates an example of a transaction usable for implementing a state machine.

FIG. 27 illustrates an example of a transaction 2700 having one input, Vin[0], and two outputs, Vout[0] and Vout[1]. By unlocking the outputs of this transaction, two independent transactions would be then on the blockchain ledger, and the creators of these transactions would be compensated by some value (not shown) presented to them by this transaction. As illustrated, the locking script of the previous transaction output (the one pointed to by Vin[0]) requires that the unlocking transaction that unlocks that output contain states S2 and S5. In order to unlock the output (Vout[0] in FIG. 27) of the unlocking transaction that contains the state S2, a future unlocking transaction would be constrained to include the next state based on the current state being S2. Likewise, for the S5 state.

In this manner, transaction outputs can have states and impose constraints on what states unlocking transactions can be in. With this, blockchain transactions could implement processing according to a state diagram such as that shown in FIG. 26, and the unlocking of transaction outputs corresponds to state transitions of the state diagram. To avoid the case where someone creates one transaction that has multiple inputs and unlocks both the outputs of the transaction shown, the locking scripts can check for that and disallow it.

The rules of how a valid transaction can be generated, such as how many outputs are needed, can be encoded in the smart contract as a hardcoded value or a parameter that may be supplied after the smart contract is created.

Forking and Cloning a Smart Contract Using Blockchain Transactions

A fork may be used when a state needs to transition into two or more (not necessarily unique) next states simultaneously. Sometimes a smart contract can be processed without all possible concurrency, but where there is to be concurrency, a fork could start that. As explained above, a locking script of an output of a smart contract transaction on a blockchain ledger can "impose" requirements on the input of an unlocking transaction and/or a locking script of an output of the unlocking transaction that is on the blockchain ledger. Cloning may be a specific type of forking where the set of next states may be all of the same state. In terms of the unlocking transaction, multiple outputs may be constrained to duplicate the transition matrix and embed their respective next state.

Forking/cloning can be achieved by applying the constraints of a trustless deterministic state machine to a set of outputs. As discussed above, a set of indexes allows different constraints to be applied on different outputs. This set of indexes can be hardcoded inside the transition matrix or provided as part of inputs to the validation process.

Since a given unlocking transaction might have multiple outputs, some of which may be unrelated to the state machine, or related to multiple unrelated state machines, it might be more practical to embed a next state in a locking script of the transactions, rather than embedding it in a field common to all outputs, such as a lock time field. Constraining a subset of an output's locking script is described above.

Figure 28:
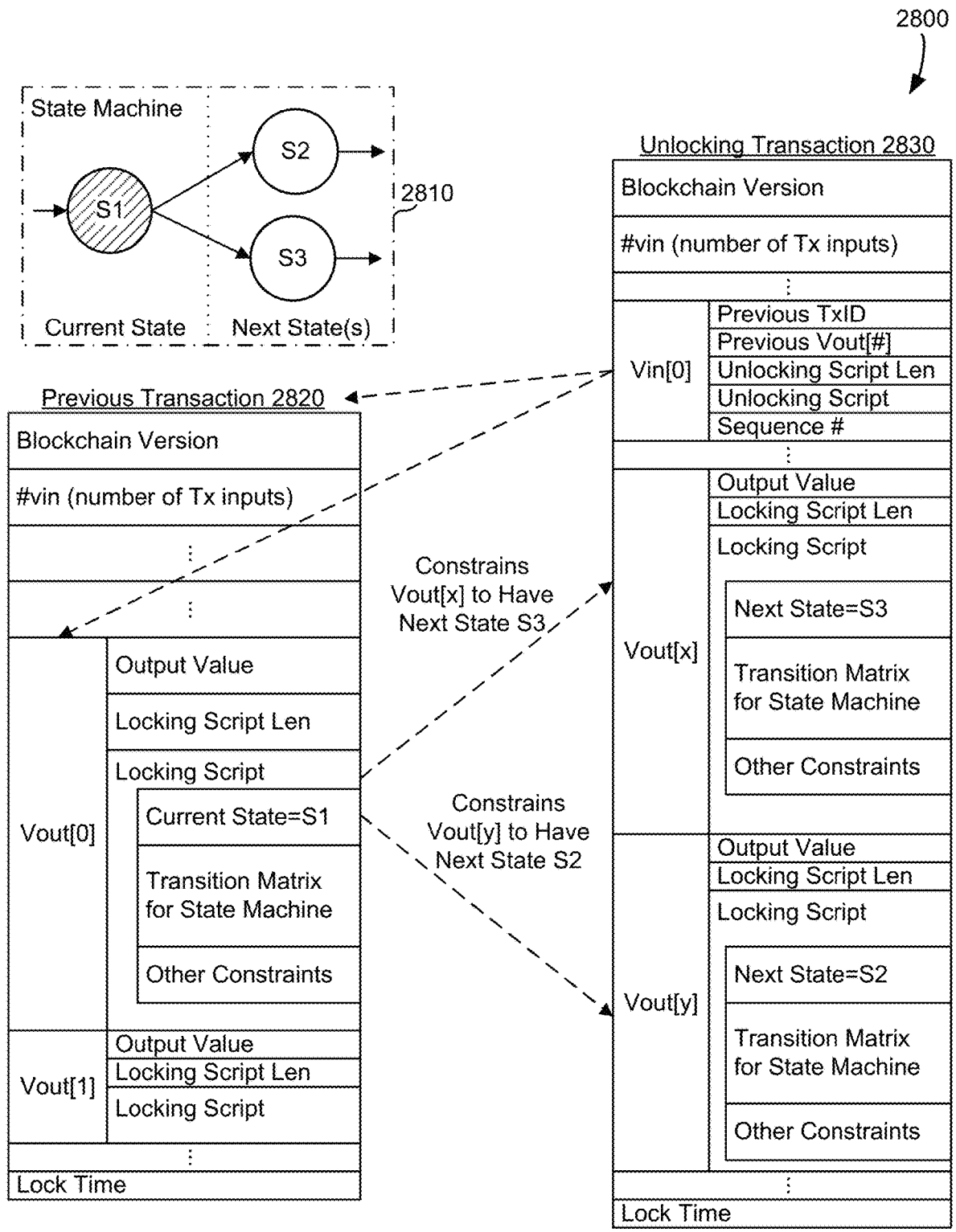
FIG. 28 illustrates an example of a forking of a portion of a smart contract using blockchain transactions.

FIG. 28 illustrates an example 2800 of how the scripts relate for a forking operation. As illustrated there, a state machine 2810 is implemented using a previous transaction 2820 and an unlocking transaction 2830. A locking script of the previous transaction 2820 constrains the unlocking transaction 2830 to have at least two outputs, each requiring subsequent unlocking transactions to have outputs in the specified state (and to be separate transactions). This may allow those states, S2, S3, to be executed independently and possibly concurrently.

With a state machine, subtasks can become useful for enabling faster, concurrent smart contracts. For dealing with subtasks, multiple states may be used and since one state machine may be normally only in a single state at once, concurrency may be provided by having separate threads of transactions. The state machines can be forked through the creation of multiple transaction locking scripts. Based on a current state from a previous transaction output, the unlocking transaction can be constrained to have two or more outputs with locking scripts as shown in FIG. 28. To prevent a fork becoming unredeemable, and halting early, each output value should be checked to ensure there are sufficient funds to continue that state machine.

As indicated by the dashed arrows, the input Vin[0] of the unlocking transaction 2830 points to the previous transaction 2820 and the output Vout[0] of that transaction. The locking script of Vout[0] includes a current state ("S1"), a transition matrix for the state machine, and constrains Vout[x] of the unlocking transaction 2830 to be in a next state ("S3") and Vout[y] of the unlocking transaction 2830 to be in another next state ("S2"), each also constrained to carry the state transition matrix, and possibly other constraints.

The locking script of an output of the previous transaction might comprise a concatenation of <Current State><Transition Matrix><other script>, while the locking script of an output of the unlocking transaction might comprise a concatenation of <Next State><Transition Matrix><other script>. Instead of duplicating the whole locking script, just a subset of the locking script might be duplicated, while the other subset may be constrained to contain the state.

Instead of storing the state in the locking script, the state of a state machine might be stored in a field of the transaction that may not be used for other purposes, such as the Lock Time field. In practice, a different unused transaction field could be used. This works with single states and also works where multiple states need to be stored, although that might be more complicated.

FIG. 29 shows example pseudocode that might be executed to implement a forking or cloning process state machine script 2900. This pseudocode might be implemented using the OP codes described herein. This pseudocode might be executed by a processor of a blockchain node that creates transactions and/or validates transactions. In some embodiments, part of the script is from an unlocking script and part of the script is from a locking script.

In the pseudocode of FIG. 29, the previous transaction, the unlocking transaction, and optional inputs are injected so the locking script has access to them. Then, there may be a check for a termination condition. If the smart contract has not terminated, then the processor extracts the previous transaction locking script and the previous transaction current state, which it can do using the techniques described herein. The processor then loops through the outputs of the unlocking transaction and for each of those, extracts its locking script and checks the transition matrix in the previous transaction locking script to determine if it matches the transition matrix in the locking script of the unlocking transaction output being processed. If they don't match, the processor treats that as a script failure and stops and does not validate the unlocking transaction. If they match, the processor determines the next state for the state machine from the extracted current state, the state transition matrix, optionally the input, and the output index value. Then the processor checks the next state that was determined against the next state in the unlocking transaction output being processed. If they don't match, the processor treats that as a script failure and stops and does not validate the unlocking transaction. If there are other, optional constraints to be checked, those can be checked at this point. If all the constraints are met, the script passes.

Worker Spawning Smart Contract

In the previous section, the ability to fork and clone a smart contract was described. This section details the ability to force new smart contacts to be present in the unlocking transaction, which can be another completely different state machine or a smart contract that may be not a state machine, but a completely different type of smart contract.

Figure 30:
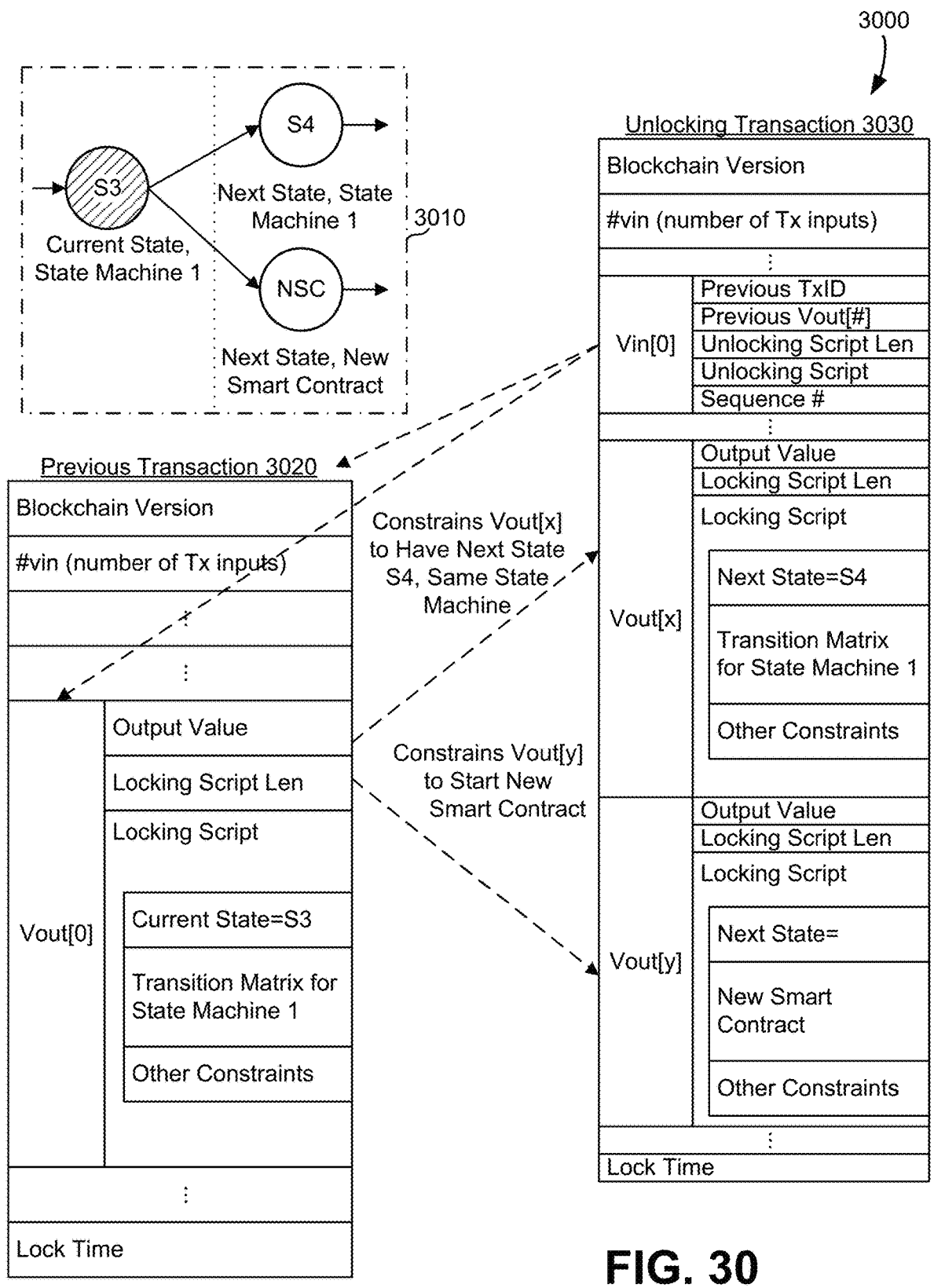
FIG. 30 illustrates an example of a creation of a new smart contract from a smart contract using blockchain transactions.

An example 3000 of constraints to force a new smart contract that is a state machine is illustrated in FIG. 30. As shown there, the locking script of an output of the previous transaction provides a constraint on an output of the unlocking transaction such that the output locking scripts of the unlocking transaction must equal the desired new smart contract scripts, or the hashes of the output locking scripts must equal the hashes of the desired new smart contract scripts. A new smart contract script or hash can be hardcoded in the locking script of an output of the previous transaction or securely provided as a parameter through the unlocking script of an input of the unlocking transaction. Multiple new smart contracts in the unlocking transaction outputs can be forced by having a corresponding constraint in the locking script as described above for each new smart contract.

As described, a new smart contract that may be a state machine is created. That can be the same state machine as for the previous transaction or another completely different state machine. The new state and the transition matrix can be checked. This could be done either separately (e.g., checking the new state, and then checking the transition matrix values) or done together.

Although not shown in FIG. 30, the new smart contract can be other than a state machine. In such a case, a next state value may or may not be required, but the new smart contract can be verified using an equality check of the script, or a hash thereof.

A new smart contract can be spawned with a transition from a current state in a previous transaction and new smart contract for an output of the unlocking transaction. In the example shown, a first set of outputs of an unlocking transaction are constrained to duplicate the state transition matrix and embed the next state(s), and a second set of outputs are constrained to contain the new smart contracts. An output of an unlocking transaction can be constrained to contain a new locking script, and by using multiple indexes, different constraints can be applied on different outputs. The set of new smart contracts can be hardcoded in the transition matrix or be provided as part of the inputs.

From the state machine perspective, a state machine can instantiate a new and different state machine to execute concurrently with the calling state machine. To apply this approach to state machines, the locking script for this operation may be similar to that of the fork/clone operation, but instead of each new state machine instance checked for equality in its locking script, it may be checked for existence of the new smart contract. The equality check can be carried out over a range of different values, including the serialized set of transaction fields for a transaction, locking script bytecode, or a hash of these.

FIG. 30 illustrates spawning a new smart contract. As illustrated there, a state machine 3010 is implemented using a previous transaction 3020 and an unlocking transaction 3030. A locking script of the output Vout[0] of the previous transaction 3020 constrains the unlocking transaction 3030 to have at least two outputs, Vout[x] and Vout[y], each requiring subsequent unlocking transactions to have outputs in the specified state (and to be separate transactions). Specifically, as shown, in order for input Vin[0] of the unlocking transaction 3030 to unlock Vout[0] of the previous transaction 3020, the unlocking transaction 3030 may be constrained to have Vout[x] have the transition matrix and be in state S4, while also constraining Vout[y] to have the new smart contract.

With this approach, the new smart contract can be processed in parallel with the state machine. Although not explicitly shown, the new smart contract can be a second state machine. As explained above, the new smart contract need not itself be a state machine, in which case the resulting smart contract might not have a field for a state value.

As indicated by the dashed arrows in FIG. 30, the input Vin[0] of the unlocking transaction 3030 points to the previous transaction 3020 and the output Vout[0] of that transaction. This might be in the form of a TxID of the previous transaction 3020 and an integer value set to "0" to point to the output Vout[0]. The locking script of Vout[0] includes a current state ("S3"), a transition matrix for the state machine, and constrains Vout[x] of the unlocking transaction 3030 to be the state machine in a next state ("S4") and Vout[y] of the unlocking transaction 3030 to be a new smart contract ("NSC"), and possibly other constraints.

As an example, pseudocode for an example script 3100 of a worker spawning process and a process for forcing new smart contacts to be present in an unlocking transaction might be as shown in FIG. 31.

Merging a Smart Contract

A merger or joining of states can be used where two or more states need to be merged into the same next state. In some cases, the state machines operating concurrently might find themselves in the same state, but not merge, if that is not required by the smart contract. For example, with the state diagram of FIG. 26, it might be possible for S4 and S7 to transition to S8 separately and remain as two separate transactions.

Figure 32:
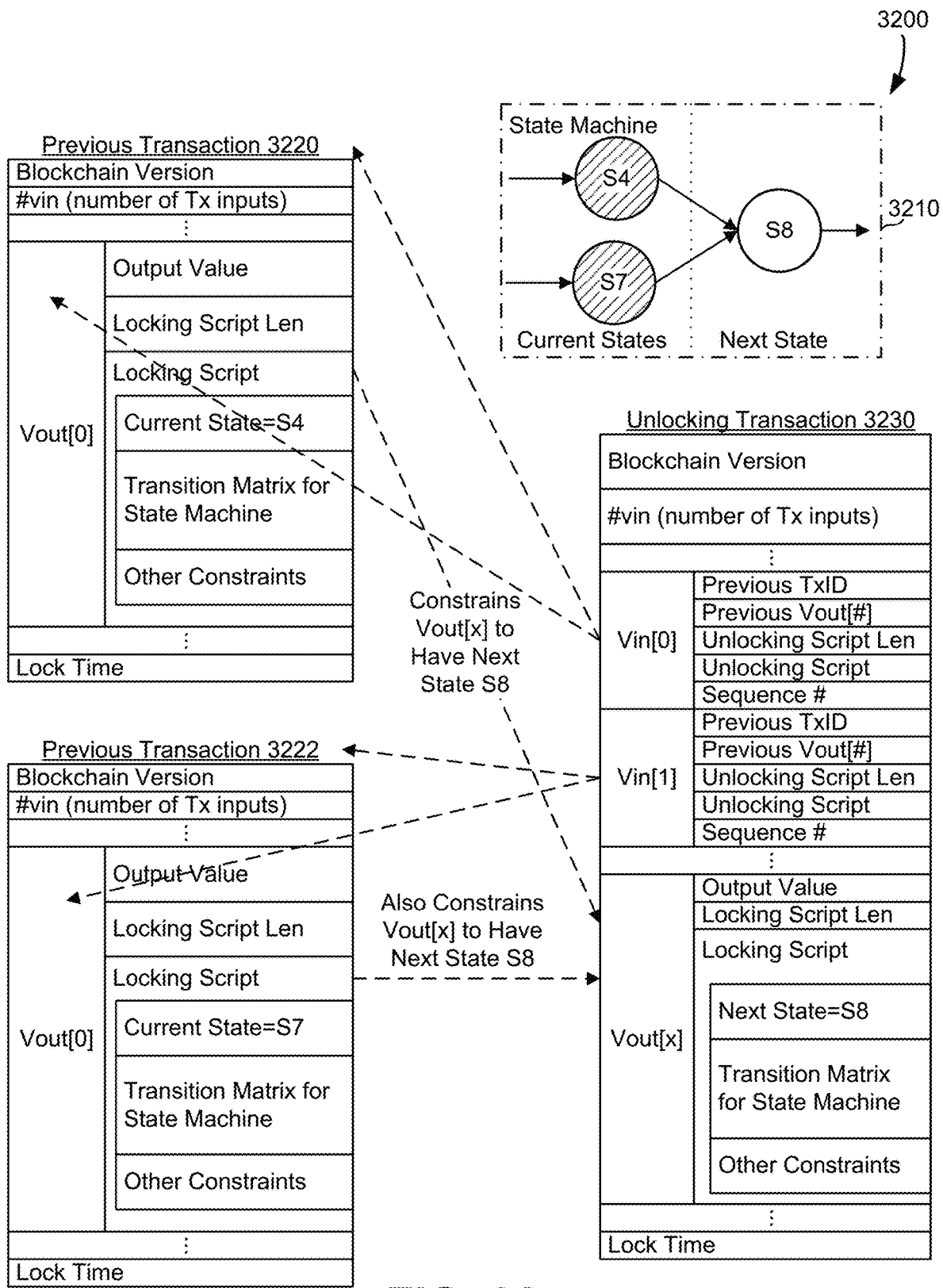
FIG. 32 illustrates an example of a merger operation for a smart contract using blockchain transactions.

FIG. 32 illustrates an example 3200 of a merger operation of state machine 3210. In this case, an unlocking transaction 3230 (with inputs Vin[0] and Vin[1] and output Vout[x]) unlocks outputs Vout[0] of both a previous transaction 3220 and a previous transaction 3222. Using these techniques, a smart contract can branch out by instantiating a new instance of itself or by instantiating a different smart contract, and multiple smart contracts, identical or not, can be merged to form a single smart contract via its corresponding state machine.

Each merging unlocking transaction may have one locking script. This locking script continues the execution of the single smart contract. This can be either one of the smart contracts being merged, or an entirely new smart contract. In any case, a number of checks may be performed. Each of the smart contracts may be checked as being valid inputs into the unlocking transaction. This can be carried out by validation that uses the previous transaction.

As shown in FIG. 32, Vin[0] points to the previous transaction 3220 and its output Vout[0], while Vin[1] points to the previous transaction 3222 and its output Vout[0]. The locking scripts of both Vout[0]'s constrains Vout[x] of the unlocking transaction 3230 to have the next state S8 and the state transition matrix. These constraints may be enforced by the locking script of the previous transaction 3222 checking that the new smart contract is an output of the unlocking transaction.

To achieve this with concurrent state machines, the transactions can use multiple inputs with an input for each state machine needing to be joined. Within the state machine transition matrix, a constraint can be added to check the states of all the joined independent state machines. If one of the joined state machines is not in a state that is allowed to converge, the transaction may be rejected. To ensure a join operation, a constraint can be added to the state machine, which based on the state in the unlocking transaction, to check that there are two unlocking scripts. For each script, a check can be carried out to ensure each is in the correct state required for the transition. As explained elsewhere herein, interdependent locking constraints might also be used.

FIG. 33 illustrates a pseudocode sequence as an example script 3300 of a process for merging smart contacts in an unlocking transaction with weak dependency. For merging, a transition occurs from a set of current states (not necessarily unique states) to a set of shared next states. In terms of the unlocking transaction, a set of its inputs may be unlocking a set of locking scripts that share a constraint that the same output has to duplicate the transition matrix and embed the same next state. For a weak dependency, there may be multiple state machines that so happen to have the same next state for the same output.

A merger according to FIG. 32 and FIG. 33 can occur with weak dependency. Locking scripts can contain other constraints such as interdependency, forking, spawning new smart contracts, etc. As an example of weak dependency, where a merge happens coincidentally, a locking script 1 may be a fork from state A to states X and Y and a locking script 2 may be a normal transition from state B to state X. Those two locking scripts just so happen to constrain the output of the unlocking transaction to contain state X.

In the pseudocode sequence of FIG. 33, a processor processing a script according to that pseudocode sequence might inject the previous transaction, the unlocking transaction, and optionally some input data, and check a termination condition before proceeding. Then the processor extracts the previous transaction locking script and the unlocking transaction locking script. Next, the processor may check that the transition matrix in the previous transaction locking script is equal to the transition matrix in the unlocking transaction locking script, aborting if not. From there, the processor extracts the previous transaction's current state value and from that, and from the transition matrix and input (if used), determines the next state and checks the next state to determine if it matches the next state in the unlocking transaction locking script. Optionally other constraints can be checked here.

FIG. 34 illustrates a pseudocode sequence as an example script 3400 of a process for merging smart contacts in an unlocking transaction with explicit (or strong) dependency. For an explicit dependency, there may be multiple state machines and it may not be enough that they happen to have the same next state for the same output, but in addition they may be specific distinct state machines. A merger according to FIG. 32 and FIG. 34 can occur by explicit dependency. With a strong constraint, the unlocking transaction may be required to point to two or more specific merging state machines.

In the pseudocode sequence of FIG. 34, a processor processing a script according to that pseudocode sequence might inject the previous transaction, the unlocking transaction, and optionally some input data, and check a termination condition before proceeding. Then the processor extracts the unlocking transaction locking script. Next, the processor may loop through a set of input indexes and extracts its corresponding previous transaction locking script and checks that the transition matrix in the corresponding previous transaction locking script is equal to the transition matrix in the unlocking transaction locking script, aborting if not. From there, the processor extracts the previous transaction's current state value and appends it to a list of current states and repeats for the other inputs. From the current states and from the transition matrix and input (if used), the processor determines the next state and checks the next state to determine if it matches the next state in the unlocking transaction locking script. Optionally other constraints can be checked here.

Parallel Smart Contract/Barriers

As explained above, two or more smart contracts can be merged into a single smart contract, with weak or strong constraints. It might also be useful to have two or more smart contracts that can execute in parallel together. This may be more than just concurrent processing, in that the constraint may be that the two concurrent paths have to pass through one unlocking transaction. This can also be used for a "barrier" in a concurrent state machine, wherein a particular transition may not be allowed to occur until another transition elsewhere in the state machine occurs.

Figure 35:
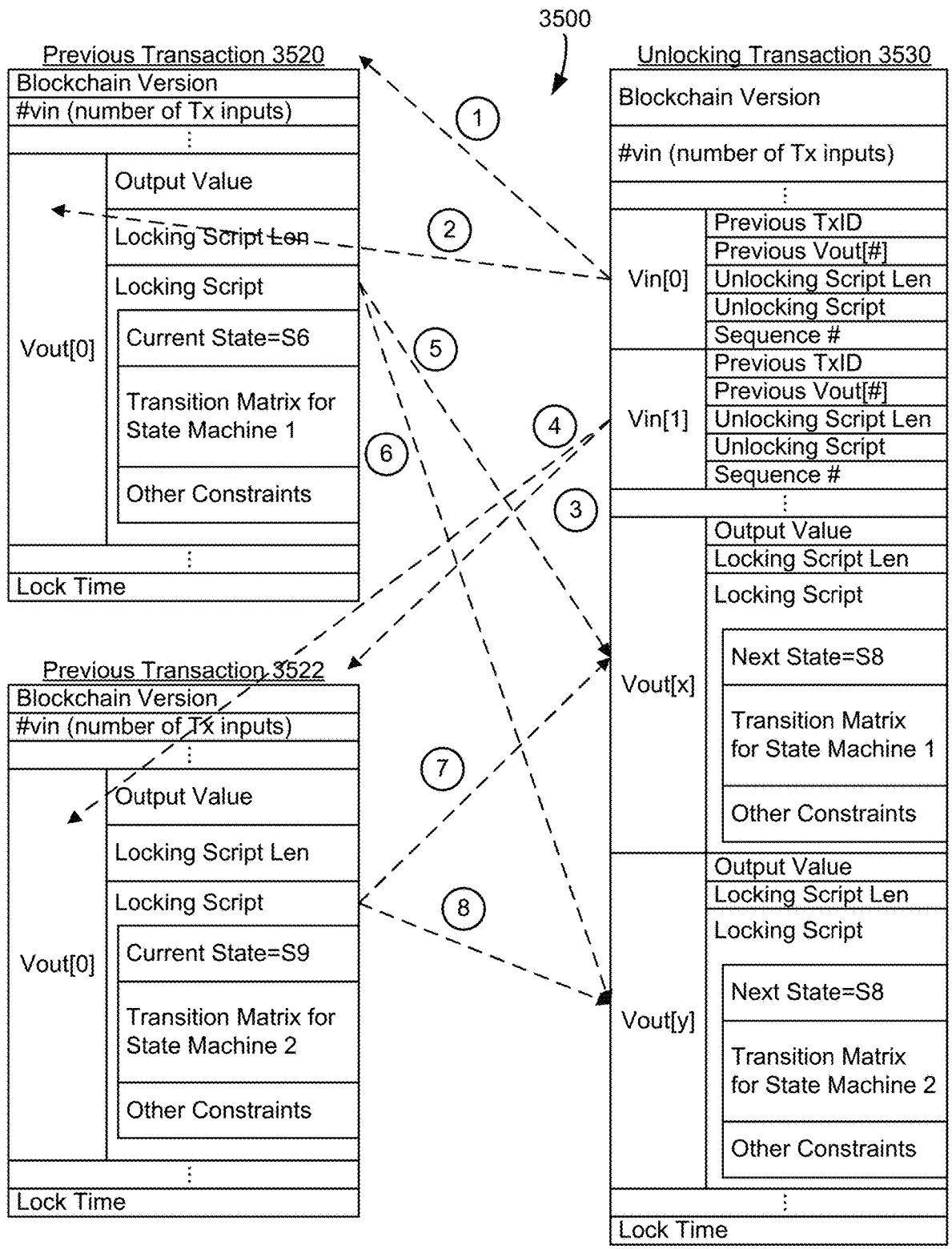
FIG. 35 illustrates an example of a parallel processing operation for a smart contract using blockchain transactions.

FIG. 35 illustrates an example 3500 of a parallel processing operation. In this case, an unlocking transaction 3530 has two inputs (Vin[0], Vin[1]), one for each of a previous transaction 3520 and a previous transaction 3530, and two outputs (Vout[x], Vout[y]), one each for continuing the separate smart contracts. The unlocking transaction 3530 contains an unlocking script containing each of the smart contracts' previous transactions. In addition, a locking script for each smart contract may be required to continue its execution. Using parallel smart contracts, each contract cannot transition independently, but instead all contracts (as defined in the locking script) need to happen simultaneously.

The prior examples provided for forking a smart contract, merging two smart contracts, and parallel operating of two (or more smart contracts). Those can be used in conjunction with the parallel smart contract. Barriers may be used when a state transition has a logical relationship with another. As an example, it may require the other state machine to be at a particular state, or require the input data from that state machine.

An unlocking transaction can be created to facilitate this functionality, which includes multiple inputs and outputs. Each of the state machines required in the barrier (either those transitioning, or those involved in a constraint) may be included in their own unlocking script. For each state machine undergoing a transition, a locking script may be used. In the example shown in FIG. 26, the transition from state S9 to S10 is allowed, but only if the transition from S6 to S7 occurs at the same time. For this in the unlocking transaction, there would be two unlocking scripts, one for the state machine at state S6, and one for the state machine at state S9. The unlocking transaction then has two locking scripts, one for a state machine still at S7, and one for the state machine now at S10.

FIG. 36 is a pseudocode sequence as an example script 3600 for using barriers in concurrent state machines that require parallel transaction inputs/outputs. In this example, a script according to that pseudocode sequence checks that each of the previous transactions has a locking script identical to one in the unlocking transaction. In this example, one locking script is set to match the first previous transaction, etc. Next, the script according to that pseudocode sequence extracts the current states from both previous transactions, reads the input for both state machines, and checks any barriers set for both state transitions.

Referring back to FIG. 35, the various dependencies are shown with dashed arrows and numbered circles. Dependency #1 may be that Vin[0] must refer to the previous transaction 3520, dependency #2 may be that Vin[0] must refer to the first output (Vout[0]) of the specified transaction (previous transaction 3520), dependency #3 may be that Vin[1] must refer to the previous transaction 3522, and dependency #4 may be that Vin[1] must refer to the first output (Vout[0]) of the specified transaction (previous transaction 3522). This might simply be two dependencies, a dependency that Vin[0] must refer to Vout[0] of transaction 3520 and a dependency that Vin[1] must refer to Vout[0] of transaction 3522.

The locking script of Vout[0] of the previous transaction 3520 imposes dependency #5 requiring that Vout[x] have state=S8 and have the transition matrix for a state machine 1, and imposes dependency #6 requiring that Vout[y] have state=S8 and have the transition matrix for a state machine 2. The locking script of Vout[0] of the previous transaction 3522 imposes dependencies #7 and #8 in a similar manner. In some examples, instead of the constraint of a state machine, it might be a constraint of some other form of smart contract. Since two (or more) previous transaction outputs constrain two (or more) unlocking transaction outputs, parallel smart contracting can be provided.

A barrier may be different from a merge. A barrier may be where a transition from a set of current states (not necessarily unique states) is constrained to occur simultaneously. In terms of the unlocking transaction, a set of its inputs may be unlocking a set of interdependent locking scripts, all of which may be applying their respective constraints to a set of outputs. Interdependent locking scripts may be a requirement and a set of shared next states, although possible, may not be required. Interdependent locking scripts can be embedded in the transition matrix such that certain transitions require this interdependency.

Figure 37:
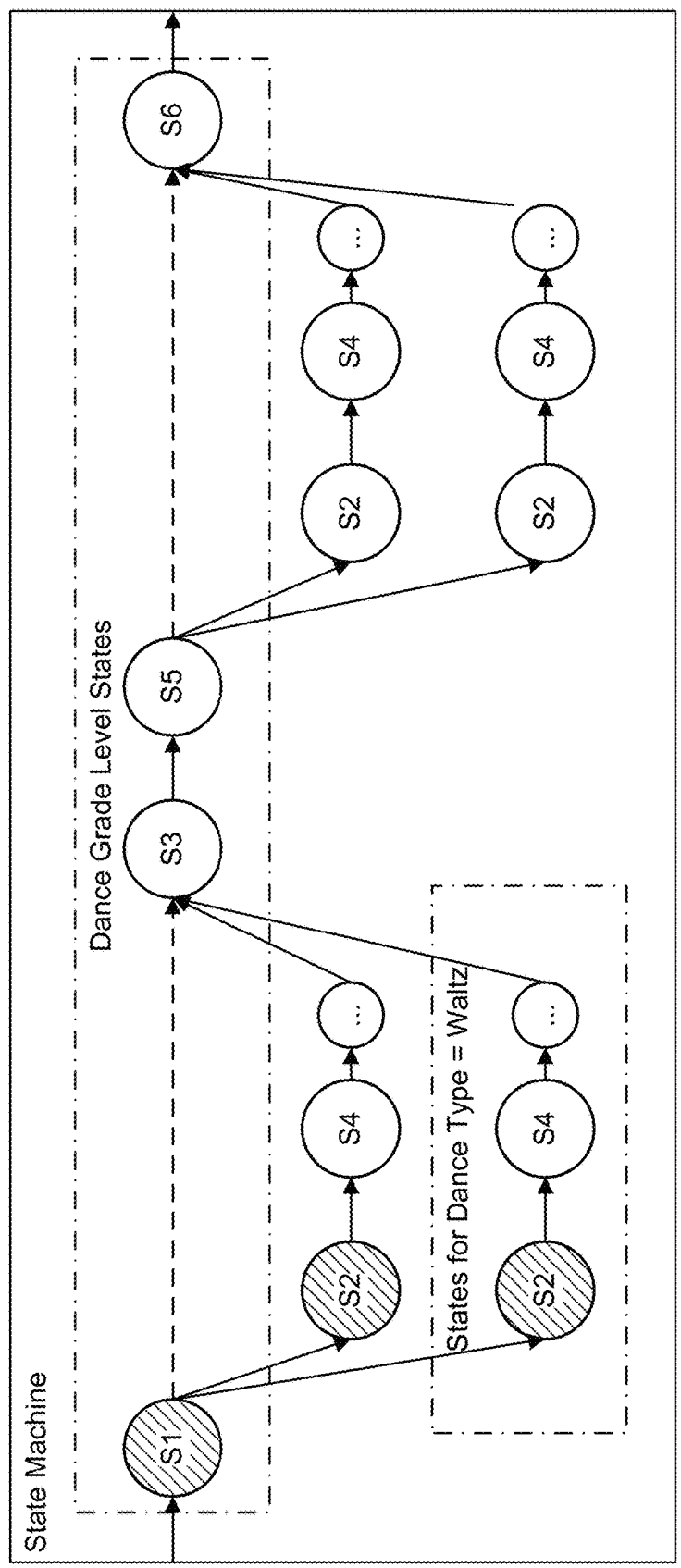
FIG. 37 illustrates an example of how portions of a smart contract might be executed in conformance with a contract barrier using blockchain transactions in concurrent paths.

FIG. 37 illustrates an example 3700 of a state diagram for a use case for barriers/parallel smart contracting. Suppose Alice and Bob are learning to dance and go to dancing lessons. As a way of keeping progress of the dance students, their progress may be logged with the use of state machines. First, there may be a state machine between grades, containing states in regard to their overall dancing competency of all dance types. This is represented in the states S1, S3, S5, and finally S6. These grade states progress sequentially, until the student reaches the highest grade supported at the dance club. To progress to the next grades (for example S1 to S3), students may be required to reach several dance types. Each dance type may be monitored using a smaller embed state machine (for example, S2 and S4). In this use case, there can be the following operations:

1) Fork or Clone—This may be used at the points S1 and S5, signalling the start of a new grade, whereby there may be a fork to multiple state machines, one for each dance type.
2) Worker Spawning—This may be used at some point where a specific dance type requires more lessons, or different assessment to the other dance types offered.
3) Merging—This process may be used at the points S3 and S6 when a student reaches a new grade. For a new grade, each student needs to be assessed at the final state, S4, of the embedded dance state machines.
4) Parallel Transactions/Barriers—This may be used to constrain a state transition in one state machine with another. In the case of this use case, we could assume that transitions between S2 and S4 need to happen together, as you cannot do a single dance type in a single lesson.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to, or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B or C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention, and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention, as defined by the appended claims. In the claims, any reference signs placed in parentheses shall not be construed as limiting the claims. The words "comprising", "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method, comprising:
creating an initial blockchain transaction that includes:
at least one initial locking script that includes a first set of constraints and a second set of constraints; and
at least one redeemable value;
creating an unlocking blockchain transaction that includes an input comprising an unlocking script, a first blockchain transaction output comprising a first locking script, and a second blockchain transaction output comprising a second locking script;
processing the unlocking script and the initial locking script to determine the first set of constraints and the second set of constraints;
verifying that the first locking script satisfies the first set of constraints and the second locking script satisfies the second set of constraints; and
causing the initial blockchain transaction to be validated at a node of a blockchain network.

2. The computer-implemented method according to claim 1, wherein the first locking script is a duplicate of the second locking script.

3. The computer-implemented method according to claim 1, wherein the first locking script is different from the second locking script.

4. The computer-implemented method according to claim 2, wherein the first locking script includes at least a portion of the at least one initial locking script.

5. The computer-implemented method according to claim 4, wherein execution of the at least one initial locking script selects the at least a portion from a plurality of portions of the at least one initial locking script.

6. The computer-implemented method according to claim 1, comprising the step of executing an unlocking script of the unlocking blockchain transaction, wherein execution of an unlocking script of the unlocking blockchain transaction results in the at least one initial locking script receiving data that corresponds to one of the first blockchain transaction output or the second blockchain transaction output.

7. The computer-implemented method according to claim 6, wherein:
the data is an index value;
on a condition that the index value is a first index value, execution of the at least one initial locking script determines whether the first set of constraints is satisfied; and
on a condition that the index value is a second index value, execution of the at least one initial locking script determines whether the second set of constraints is satisfied.

8. The computer-implemented method according to claim 6, wherein:
the data includes a new locking script; and
as a result of receiving the data, constrain the first blockchain transaction output to include the new locking script.

9. The computer-implemented method according to claim 6, wherein the at least one initial locking script includes a constraint of a source of the data.

10. The computer-implemented method according to claim 1, further comprising determining a redeemable value for the first blockchain transaction output.

11. The computer-implemented method according to claim 1, wherein the initial blockchain transaction encodes a contract having a plurality of states.

12. The computer-implemented method according to claim 11, wherein the unlocking blockchain transaction includes a plurality of input values corresponding to the plurality of states.

13. The computer-implemented method according to claim 12, wherein:
the first set of constraints constrains the first blockchain transaction output to have a first state; and
the second set of constraints constrains the second blockchain transaction output to have a second state.

14. A system, comprising:
a processor; and
memory including executable instructions that, as a result of execution by the processor, causes the system to perform the computer-implemented method according to claim 1.

15. A non-transitory computer-readable storage medium having stored thereon executable instructions that, as a result of being executed by a processor of a computer system, cause the computer system to at least perform the computer-implemented method according to claim 1.

16. A system, comprising:
a processor; and
memory including executable instructions that, as a result of execution by the processor, causes the system to perform the computer-implemented method according to claim 2.

17. A system comprising:
a processor; and
memory including executable instructions that, as a result of execution by the processor, causes the system to perform the computer-implemented method according to claim 3.

18. A system, comprising:
a processor; and
memory including executable instructions that, as a result of execution by the processor, causes the system to perform the computer-implemented method according to claim 4.

19. A system, comprising:
a processor; and
memory including executable instructions that, as a result of execution by the processor, causes the system to perform the computer-implemented method according to claim 5.

20. A system, comprising:
a processor; and
memory including executable instructions that, as a result of execution by the processor, causes the system to perform the computer-implemented method according to claim 6.

* * * * *